United States Patent
Kim et al.

(10) Patent No.: US 11,635,911 B2
(45) Date of Patent: Apr. 25, 2023

(54) PROCESSING-IN-MEMORY (PIM) SYSTEM AND OPERATING METHODS OF THE PIM SYSTEM

(71) Applicant: SK hynix Inc., Icheon-si (KR)

(72) Inventors: Se Ho Kim, Icheon-si (KR); Choung Ki Song, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 39 days.

(21) Appl. No.: 17/147,278

(22) Filed: Jan. 12, 2021

(65) Prior Publication Data

US 2021/0208811 A1 Jul. 8, 2021

Related U.S. Application Data

(63) Continuation-in-part of application No. 17/027,276, filed on Sep. 21, 2020.

(60) Provisional application No. 62/960,542, filed on Jan. 13, 2020, provisional application No. 62/958,226, filed on Jan. 7, 2020.

(30) Foreign Application Priority Data

Jan. 17, 2020 (KR) .................. 10-2020-0006903

(51) Int. Cl.
*G06F 3/06* (2006.01)
*G06F 7/50* (2006.01)
*G06F 7/523* (2006.01)

(52) U.S. Cl.
CPC .......... *G06F 3/0655* (2013.01); *G06F 3/0604* (2013.01); *G06F 3/0673* (2013.01); *G06F 7/50* (2013.01); *G06F 7/523* (2013.01)

(58) Field of Classification Search
CPC .... G06F 3/0655; G06F 3/0604; G06F 3/0673; G06F 7/50; G06F 7/523; G06F 3/061; G06F 3/0679; G06F 3/0658
See application file for complete search history.

(56) References Cited

U.S. PATENT DOCUMENTS

| | | | |
|---|---|---|---|
| 8,819,686 B2 | 8/2014 | Memik et al. | |
| 10,042,639 B2 | 8/2018 | Gopal et al. | |
| 2017/0068464 A1* | 3/2017 | Crawford, Jr. | ........ G06F 3/0653 |
| 2017/0344365 A1* | 11/2017 | Nakamoto | .............. G06F 17/11 |
| 2019/0114265 A1 | 4/2019 | Chang | ................. G06F 12/0875 |
| 2020/0089426 A1* | 3/2020 | Shirota | ................. G06F 3/0679 |
| 2020/0089472 A1 | 3/2020 | Pareek et al. | |
| 2020/0174749 A1 | 6/2020 | Kang et al. | |
| 2021/0072986 A1 | 3/2021 | Yudanov et al. | |
| 2021/0208880 A1* | 7/2021 | Song | ................... G06F 9/30043 |
| 2021/0382622 A1* | 12/2021 | Kondo | .................. G06F 3/0673 |
| 2022/0020406 A1* | 1/2022 | Song | .................... G11C 7/1069 |

FOREIGN PATENT DOCUMENTS

KR 1020090001063 A 1/2009

* cited by examiner

*Primary Examiner* — Zhuo H Li
(74) *Attorney, Agent, or Firm* — William Park & Associates Ltd.

(57) ABSTRACT

A processing-in-memory (PIM) system includes a PIM device and a controller. The PIM device includes a data storage region and an arithmetic circuit for performing an arithmetic operation for data outputted from the data storage region. The controller is configured to control the PIM device. The PIM device is configured to transmit arithmetic quantity data of the arithmetic circuit to the controller in response to a request of the controller.

20 Claims, 47 Drawing Sheets

PROCESSING-IN-MEMORY (PIM) SYSTEM AND OPERATING METHODS OF THE PIM SYSTEM

CROSS-REFERENCE TO RELATED APPLICATIONS

This is a continuation-in-part of U.S. patent application Ser. No. 17/027,276, filed Sep. 21, 2020, which claims the priority of provisional application No. 62/958,226, filed on Jan. 7, 2020, and Korean Application No. 10-2020-0006903, filed on Jan. 17, 2020, which are incorporated herein by reference in their entirety. This application claims the provisional application No. 62/960,542, filed on Jan. 13, 2020, which is incorporated herein by reference in its entirety.

BACKGROUND

1. Technical Field

Various embodiments of the present disclosure relate to processing-in-memory (PIM) systems and, more particularly, to PIM systems including a PIM device and a controller and methods of operating the PIM systems.

2. Related Art

Recently, interest in artificial intelligence (AI) has been increasing not only in the information technology industry but also in the financial and medical industries. Accordingly, in various fields, artificial intelligence, more precisely, the introduction of deep learning, is considered and prototyped. In general, techniques for effectively learning deep neural networks (DNNs) or deep networks having increased layers as compared with general neural networks to utilize the deep neural networks (DNNs) or the deep networks in pattern recognition or inference are commonly referred to as deep learning.

One cause of this widespread interest may be the improved performance of processors performing arithmetic operations. To improve the performance of artificial intelligence, it may be necessary to increase the number of layers constituting a neural network in the artificial intelligence to educate the artificial intelligence. This trend has continued in recent years, which has led to an exponential increase in the amount of computation required for the hardware that actually does the computation. Moreover, if the artificial intelligence employs a general hardware system including memory and a processor which are separated from each other, the performance of the artificial intelligence may be degraded due to limitation of the amount of data communication between the memory and the processor. In order to solve this problem, a PIM device in which a processor and memory are integrated in one semiconductor chip has been used as a neural network computing device. Because the PIM device directly performs arithmetic operations internally, data processing speed in the neural network may be improved.

SUMMARY

According to an embodiment, a processing-in-memory (PIM) system includes a PIM device and a controller. The PIM device includes a data storage region and an arithmetic circuit for performing an arithmetic operation for data outputted from the data storage region. The controller is configured to control the PIM device. The PIM device is configured to transmit arithmetic quantity data of the arithmetic circuit to the controller in response to a request of the controller.

According to another embodiment, a controller includes a command generator, an operation mode determining part, and a scheduler. The command generator is configured to output commands to a PIM device to control the PIM device. The operation mode determining part is configured to receive arithmetic quantity data from the PIM device to generate a control mode signal. The scheduler is configured to receive the control mode signal to perform a scheduling operation for adjusting a time interval between the commands outputted from the command generator.

According to yet another embodiment, a controller includes an operation mode determining part and a clock division control circuit. The operation mode determining part is configured to receive arithmetic quantity data from a PIM device and is configured to generate a control mode signal corresponding to a slow control mode signal when a temperature corresponding to the arithmetic quantity data is the same as or higher than a predetermined temperature. The clock division control circuit is configured to reduce a frequency of a clock signal supplied into the PIM device in response to the slow control mode signal.

According to still another embodiment, a controller includes an operation mode determining part and an address re-mapper. The operation mode determining part is configured to receive arithmetic quantity data for a first region of a PIM device and is configured to generate a slow control mode signal when a temperature corresponding to the arithmetic quantity data is the same as or higher than a predetermined temperature. The address re-mapper is configured to perform an address remapping operation for the first region in response to the slow control mode signal.

According to yet still another embodiment, a processing-in-memory (PIM) system includes a PIM device and a controller. The PIM device includes a data storage region and an arithmetic circuit. The PIM device is configured to output an interrupt signal when a temperature corresponding to arithmetic quantity data of the arithmetic circuit is the same as or higher than a predetermined temperature. The controller is configured to control the PIM device in response to the interrupt signal to operate in a slow control mode.

BRIEF DESCRIPTION OF THE DRAWINGS

Certain features of the disclosed technology are illustrated in various embodiments with reference to the attached drawings.

DETAILED DESCRIPTION OF THE EMBODIMENTS

In the following description of embodiments, it will be understood that the terms "first" and "second" are intended to identify elements, but not used to define a particular number or sequence of elements. In addition, when an element is referred to as being located "on," "over," "above," "under," or "beneath" another element, it is intended to mean a relative positional relationship, but not used to limit certain cases in which the element directly contacts the other element, or at least one intervening element is present therebetween. Accordingly, the terms such as "on," "over," "above," "under," "beneath," "below," and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may be electrically or mechanically connected or coupled to the other element indirectly with one or more additional elements therebetween.

Various embodiments are directed to PIM systems and methods of operating the PIM systems.

Figure 1:
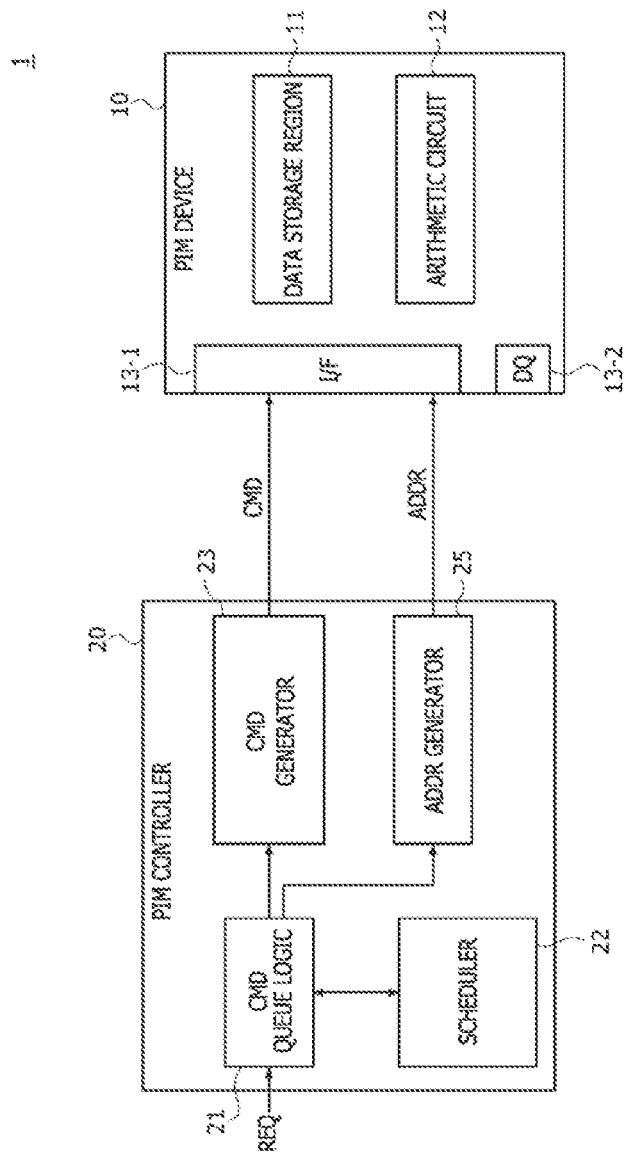
FIG. 1 is a block diagram illustrating a PIM system according to an embodiment of the present disclosure.

FIG. 1 is a block diagram illustrating a PIM system according to an embodiment of the present disclosure. As illustrated in FIG. 1, the PIM system 1 may include a PIM device 10 and a PIM controller 20. The PIM device 10 may include a data storage region 11, an arithmetic circuit 12, an interface (I/F) 13-1, and a data (DQ) input/output (I/O) pad 13-2. The data storage region 11 may include a first storage region and a second storage region. In an embodiment, the first storage region and the second storage region may be a first memory bank and a second memory bank, respectively. In another embodiment, the first data storage region and the second storage region may be a memory bank and buffer memory, respectively. The data storage region 11 may include a volatile memory element or a non-volatile memory element. For an embodiment, the data storage region 11 may include both a volatile memory element and a non-volatile memory element.

The arithmetic circuit 12 may perform an arithmetic operation on the data transferred from the data storage region 11. In an embodiment, the arithmetic circuit 12 may include a multiplying-and-accumulating (MAC) operator. The MAC operator may perform a multiplying calculation on the data transferred from the data storage region 11 and perform an accumulating calculation on the multiplication result data. After MAC operations, the MAC operator may output MAC result data. The MAC result data may be stored in the data storage region 11 or output from the PIM device through the data I/O pad 13-2.

The interface 13-1 of the PIM device 10 may receive a command CMD and address ADDR from the PIM controller 20. The interface 13-1 may output the command CMD to the data storage region 11 or the arithmetic circuit 12 in the PIM device 10. The interface 13-1 may output the address ADDR to the data storage region 11 in the PIM device 10. The data I/O pad 13-2 of the PIM device 10 may function as a data communication terminal between a device external to the PIM device 10, for example the PIM controller 20, and the data storage region 11 included in the PIM device 10. The external device to the PIM device 10 may correspond to the PIM controller 20 of the PIM system 1 or a host located outside the PIM system 1. Accordingly, data outputted from the host or the PIM controller 20 may be inputted into the PIM device 10 through the data I/O pad 13-2.

The PIM controller 20 may control operations of the PIM device 10. In an embodiment, the PIM controller 20 may control the PIM device 10 such that the PIM device 10 operates in a memory mode or an arithmetic mode. In the event that the PIM controller controls the PIM device 10 such that the PIM device 10 operates in the memory mode, the PIM device 10 may perform a data read operation or a data write operation for the data storage region 11. In the event that the PIM controller 20 controls the PIM device 10 such that the PIM device 10 operates in the arithmetic mode, the arithmetic circuit 12 of the PIM device 10 may receive first data and second data from the data storage region 11 to perform an arithmetic operation. In the event that the PIM controller 20 controls the PIM device 10 such that the PIM device 10 operates in the arithmetic mode, the PIM device 10 may also perform the data read operation and the data write operation for the data storage region 11 to execute the arithmetic operation. The arithmetic operation may be a deterministic arithmetic operation performed during a predetermined fixed time. The word "predetermined" as used herein with respect to a parameter, such as a predetermined fixed time or time period, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

The PIM controller 20 may be configured to include command queue logic 21, a scheduler 22, a command (CMD) generator 23, and an address (ADDR) generator 25. The command queue logic 21 may receive a request REQ from an external device (e.g., a host of the PIM system 1) and store the command queue corresponding to the request REQ in the command queue logic 21. The command queue logic 21 may transmit information on a storage status of the command queue to the scheduler 22 whenever the command queue logic 21 stores the command queue. The command queue stored in the command queue logic 21 may be transmitted to the command generator 23 according to a sequence determined by the scheduler 22. The command queue logic 21, and also the command queue logic 210 of FIGS. 2 and 20, may be implemented as hardware, software, or a combination of hardware and software. For example, the command queue logic 21 and/or 210 may be a command queue logic circuit operating in accordance with an algorithm and/or a processor executing command queue logic code.

The scheduler 22 may adjust a sequence of the command queue when the command queue stored in the command queue logic 21 is outputted from the command queue logic 21. In order to adjust the output sequence of the command queue stored in the command queue logic 21, the scheduler 22 may analyze the information on the storage status of the command queue provided by the command queue logic 21 and may readjust a process sequence of the command queue so that the command queue is processed according to a proper sequence.

The command generator 23 may receive the command queue related to the memory mode of the PIM device 10 and the MAC mode of the PIM device 10 from the command queue logic 21. The command generator 23 may decode the command queue to generate and output the command CMD. The command CMD may include a memory command for the memory mode or an arithmetic command for the arithmetic mode. The command CMD outputted from the command generator 23 may be transmitted to the PIM device 10.

The command generator 23 may be configured to generate and transmit the memory command to the PIM device 10 in the memory mode. The command generator 23 may be configured to generate and transmit a plurality of arithmetic commands to the PIM device 10 in the arithmetic mode. In one example, the command generator 23 may be configured to generate and output first to fifth arithmetic commands with predetermined time intervals in the arithmetic mode. The first arithmetic command may be a control signal for reading the first data out of the data storage region 11. The second arithmetic command may be a control signal for reading the second data out of the data storage region 11. The third arithmetic command may be a control signal for latching the first data in the arithmetic circuit 12. The fourth arithmetic command may be a control signal for latching the second data in the arithmetic circuit 12. And the fifth MAC command may be a control signal for latching arithmetic result data of the arithmetic circuit 12.

The address generator 25 may receive address information from the command queue logic 21 and generate the address ADDR for accessing a region in the data storage region 11. In an embodiment, the address ADDR may include a bank address, a row address, and a column address. The address ADDR outputted from the address generator 25 may be inputted to the data storage region 11 through the interface (I/F) 13-1.

Figure 2:
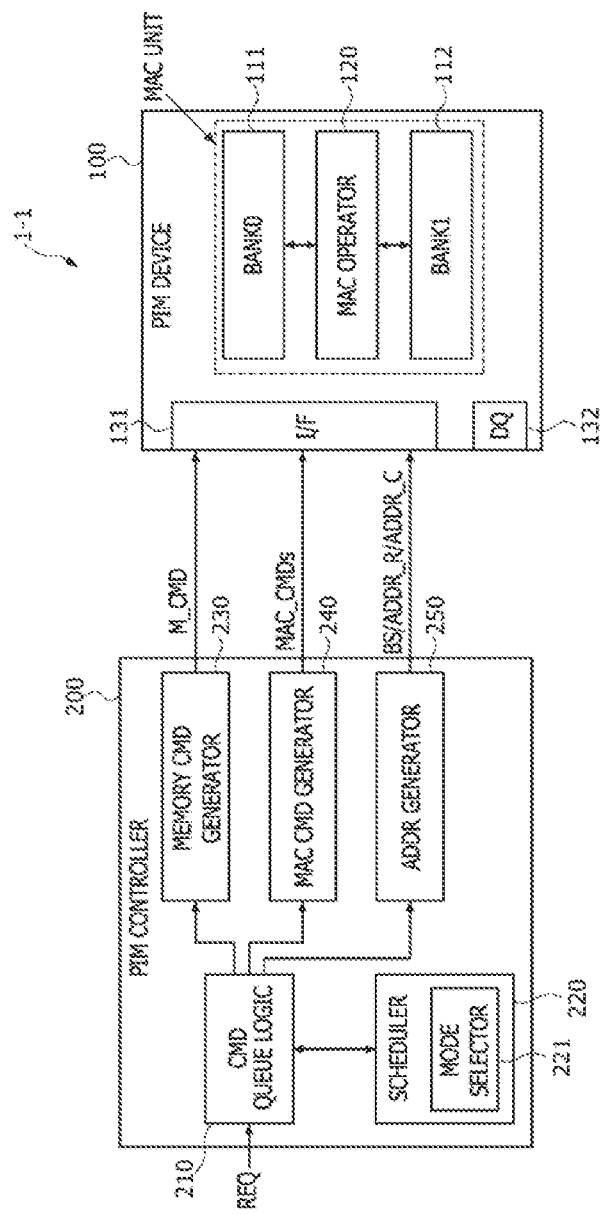
FIG. 2 is a block diagram illustrating a PIM system according to a first embodiment of the present disclosure.

FIG. 2 is a block diagram illustrating a PIM system 1-1 according to a first embodiment of the present disclosure. As illustrated in FIG. 2, the PIM system 1-1 may include a PIM device 100 and a PIM controller 200. The PIM device 100 may include a first memory bank (BANK0) 111, a second memory bank (BANK1) 112, a MAC operator 120, an interface (I/F) 131, and a data input/output (I/O) pad 132.

For an embodiment, the MAC operator 120 represents a MAC operator circuit. The first memory bank (BANK0) 111, the second memory bank (BANK1) 112, and the MAC operator 120 included in the PIM device 100 may constitute one MAC unit. In another embodiment, the PIM device 100 may include a plurality of MAC units. The first memory bank (BANK0) 111 and the second memory bank (BANK1) 112 may represent a memory region for storing data, for example, a DRAM device. Each of the first memory bank (BANK0) 111 and the second memory bank (BANK1) 112 may be a component unit which is independently activated and may be configured to have the same data bus width as data I/O lines in the PIM device 100. In an embodiment, the first and second memory banks 111 and 112 may operate through interleaving such that an active operation of the first and second memory banks 111 and 112 is performed in parallel while another memory bank is selected. Each of the first and second memory banks 111 and 112 may include at least one cell array which includes memory unit cells located at cross points of a plurality of rows and a plurality of columns.

Although not shown in the drawings, a core circuit may be disposed adjacent to the first and second memory banks 111 and 112. The core circuit may include X-decoders XDECs and Y-decoders/IO circuits YDEC/IOs. An X-decoder XDEC may also be referred to as a word line decoder or a row decoder. The X-decoder XDEC may receive a row address ADD_R from the PIM controller 200 and may decode the row address ADD_R to select and enable one of the rows (i.e., word lines) coupled to the selected memory bank. Each of the Y-decoders/IO circuits YDEC/IOs may include a Y-decoder YDEC and an I/O circuit IO. The Y-decoder YDEC may also be referred to as a bit line decoder or a column decoder. The Y-decoder YDEC may receive a column address ADDR_C from the PIM controller 200 and may decode the column address ADDR_C to select and enable at least one of the columns (i.e., bit lines) coupled to the selected memory bank. Each of the I/O circuits may include an I/O sense amplifier for sensing and amplifying a level of a read datum outputted from the corresponding memory bank during a read operation for the first and second memory banks 111 and 112. In addition, the I/O circuit may include a write driver for driving a write datum during a write operation for the first and second memory banks 111 and 112.

The interface 131 of the PIM device 100 may receive a memory command M_CMD, MAC commands MAC_CMDs, a bank selection signal BS, and the row/column addresses ADDR_R/ADDR_C from the PIM controller 200. The interface 131 may output the memory command M_CMD, together with the bank selection signal BS and the row/column addresses ADDR_R/ADDR_C, to the first memory bank 111 or the second memory bank 112. The interface 131 may output the MAC commands MAC_CMDs to the first memory bank 111, the second memory bank 112, and the MAC operator 120. In such a case, the interface 131 may output the bank selection signal BS and the row/column addresses ADDR_R/ADDR_C to both of the first memory bank 111 and the second memory bank 112. The data I/O pad 132 of the PIM device 100 may function as a data communication terminal between a device external to the PIM device 100 and the MAC unit (which includes the first and second memory banks 111 and 112 and the MAC operator 120) included in the PIM device 100. The external device to the PIM device 100 may correspond to the PIM controller 200 of the PIM system 1-1 or a host located outside the PIM system 1-1. Accordingly, data outputted from the host or the PIM controller 200 may be inputted into the PIM device 100 through the data I/O pad 132.

The PIM controller 200 may control operations of the PIM device 100. In an embodiment, the PIM controller 200 may control the PIM device 100 such that the PIM device 100 operates in a memory mode or a MAC mode. In the event that the PIM controller 200 controls the PIM device 100 such that the PIM device 100 operates in the memory mode, the PIM device 100 may perform a data read operation or a data write operation for the first memory bank 111 and the second memory bank 112. In the event that the PIM controller 200 controls the PIM device 100 such that the PIM device 100 operates in the MAC mode, the PIM device 100 may perform a MAC arithmetic operation for the MAC operator 120. In the event that the PIM controller 200 controls the PIM device 100 such that the PIM device 100 operates in the MAC mode, the PIM device 100 may also perform the data read operation and the data write operation for the first and second memory banks 111 and 112 to execute the MAC arithmetic operation.

The PIM controller 200 may be configured to include command queue logic 210, a scheduler 220, a memory command generator 230, a MAC command generator 240, and an address generator 250. The command queue logic 210 may receive a request REQ from an external device (e.g., a host of the PIM system 1-1) and store a command queue corresponding to the request REQ in the command queue logic 210. The command queue logic 210 may transmit information on a storage status of the command queue to the scheduler 220 whenever the command queue logic 210 stores the command queue. The command queue stored in the command queue logic 210 may be transmitted to the memory command generator 230 or the MAC command generator 240 according to a sequence determined by the scheduler 220. When the command queue outputted from the command queue logic 210 includes command information requesting an operation in the memory mode of the PIM device 100, the command queue logic 210 may transmit the command queue to the memory command generator 230. On the other hand, when the command queue outputted from the command queue logic 210 is command information requesting an operation in the MAC mode of the PIM device 100, the command queue logic 210 may transmit the command queue to the MAC command generator 240. Information on whether the command queue relates to the memory mode or the MAC mode may be provided by the scheduler 220.

The scheduler 220 may adjust a timing of the command queue when the command queue stored in the command queue logic 210 is outputted from the command queue logic 210. In order to adjust the output timing of the command queue stored in the command queue logic 210, the scheduler 220 may analyze the information on the storage status of the command queue provided by the command queue logic 210 and may readjust a process sequence of the command queue such that the command queue is processed according to a proper sequence. The scheduler 220 may output and transmit to the command queue logic 210 information on whether the command queue outputted from the command queue logic 210 relates to the memory mode of the PIM device 100 or relates to the MAC mode of the PIM device 100. In order to obtain the information on whether the command queue outputted from the command queue logic 210 relates to the memory mode or the MAC mode, the scheduler 220 may include a mode selector 221. The mode selector 221 may generate a mode selection signal including information on whether the command queue stored in the command queue logic 210 relates to the memory mode or the MAC mode, and the scheduler 220 may transmit the mode selection signal to the command queue logic 210.

The memory command generator 230 may receive the command queue related to the memory mode of the PIM device 100 from the command queue logic 210. The memory command generator 230 may decode the command queue to generate and output the memory command M_CMD. The memory command M_CMD outputted from the memory command generator 230 may be transmitted to the PIM device 100. In an embodiment, the memory command M_CMD may include a memory read command and a memory write command. When the memory read command is outputted from the memory command generator 230, the PIM device 100 may perform the data read operation for the first memory bank 111 or the second memory bank 112. Data which are readout of the PIM device 100 may be transmitted to an external device through the data I/O pad 132. The read data outputted from the PIM device 100 may be transmitted to a host through the PIM controller 200. When the memory write command is outputted from the memory command generator 230, the PIM device 100 may perform the data write operation for the first memory bank 111 or the second memory bank 112. In such a case, data to be written into the PIM device 100 may be transmitted from the host to the PIM device 100 through the PIM controller 200. The write data inputted to the PIM device 100 may be transmitted to the first memory bank 111 or the second memory bank 112 through the data I/O pad 132.

The MAC command generator 240 may receive the command queue related to the MAC mode of the PIM device 100 from the command queue logic 210. The MAC command generator 240 may decode the command queue to generate and output the MAC commands MAC_CMDs. The MAC commands MAC_CMDs outputted from the MAC command generator 240 may be transmitted to the PIM device 100. The data read operation for the first memory bank 111 and the second memory bank 112 of the PIM device 100 may be performed by the MAC commands MAC_CMDs outputted from the MAC command generator 240, and the MAC arithmetic operation of the MAC operator 120 may also be performed by the MAC commands MAC_CMDs outputted from the MAC command generator 240. The MAC commands MAC_CMDs and the MAC arithmetic operation of the PIM device 100 according to the MAC commands MAC_CMDs will be described in detail with reference to FIG. 3.

The address generator 250 may receive address information from the command queue logic 210. The address generator 250 may generate the bank selection signal BS for selecting one of the first and second memory banks 111 and 112 and may transmit the bank selection signal BS to the PIM device 100. In addition, the address generator 250 may generate the row address ADDR_R and the column address ADDR_C for accessing a region (e.g., memory cells) in the first or second memory bank 111 or 112 and may transmit the row address ADDR_R and the column address ADDR_C to the PIM device 100.

Figure 3:
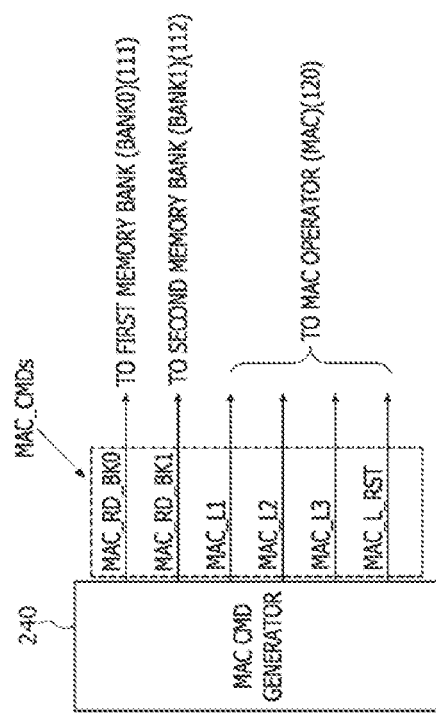
FIG. 3 illustrates MAC commands outputted from a MAC command generator of a PIM controller included in a PIM system according to a first embodiment of the present disclosure.

FIG. 3 illustrates the MAC commands MAC_CMDs outputted from the MAC command generator 240 included in the PIM system 1-1 according to the first embodiment of the present disclosure. As illustrated in FIG. 3, the MAC commands MAC_CMDs may include first to sixth MAC command signals. In an embodiment, the first MAC command signal may be a first MAC read signal MAC_RD_BK0, the second MAC command signal may be a second MAC read signal MAC_RD_BK1, the third MAC command signal may be a first MAC input latch signal MAC_L1, the fourth MAC command signal may be a second MAC input latch signal MAC_L2, the fifth MAC command signal may be a MAC output latch signal MAC_L3, and the sixth MAC command signal may be a MAC latch reset signal MAC_L_RST.

The first MAC read signal MAC_RD_BK0 may control an operation for reading first data (e.g., weight data) out of the first memory bank 111 to transmit the first data to the MAC operator 120. The second MAC read signal MAC_RD_BK1 may control an operation for reading second data (e.g., vector data) out of the second memory bank 112 to transmit the second data to the MAC operator 120. The first MAC input latch signal MAC_L1 may control an input latch operation of the weight data transmitted from the first memory bank 111 to the MAC operator 120. The second MAC input latch signal MAC_L2 may control an input latch operation of the vector data transmitted from the second memory bank 112 to the MAC operator 120. If the input latch operations of the weight data and the vector data are performed, the MAC operator 120 may perform the MAC arithmetic operation to generate MAC result data corresponding to the result of the MAC arithmetic operation. The MAC output latch signal MAC_L3 may control an output latch operation of the MAC result data generated by the MAC operator 120. And, the MAC latch reset signal MAC_L_RST may control an output operation of the MAC result data generated by the MAC operator 120 and a reset operation of an output latch included in the MAC operator 120.

The PIM system 1-1 according to the present embodiment may be configured to perform a deterministic MAC arithmetic operation. The term "deterministic MAC arithmetic operation" used in the present disclosure may be defined as the MAC arithmetic operation performed in the PIM system 1-1 during a predetermined fixed time. Thus, the MAC commands MAC_CMDs transmitted from the PIM controller 200 to the PIM device 100 may be sequentially generated with fixed time intervals. Accordingly, the PIM controller 200 does not require any extra end signals of various operations executed for the MAC arithmetic operation to generate the MAC commands MAC_CMDs for controlling the MAC arithmetic operation. In an embodiment, latencies of the various operations executed by MAC commands MAC_CMDs for controlling the MAC arithmetic operation may be set to have fixed values in order to perform the deterministic MAC arithmetic operation. In such a case, the MAC commands MAC_CMDs may be sequentially outputted from the PIM controller 200 with fixed time intervals corresponding to the fixed latencies.

For example, the MAC command generator 240 is configured to output the first MAC command at a first point in time. The MAC command generator 240 is configured to output the second MAC command at a second point in time when a first latency elapses from the first point in time. The first latency is set as the time it takes to read the first data out of the first storage region based on the first MAC command and to output the first data to the MAC operator. The MAC command generator 240 is configured to output the third MAC command at a third point in time when a second latency elapses from the second point in time. The second latency is set as the time it takes to read the second data out of the second storage region based on the second MAC command and to output the second data to the MAC operator. The MAC command generator 240 is configured to output the fourth MAC command at a fourth point in time when a third latency elapses from the third point in time. The third latency is set as the time it takes to latch the first data in the MAC operator based on the third MAC command. The MAC command generator 240 is configured to output the fifth MAC command at a fifth point in time when a fourth latency elapses from the fourth point in time. The fourth latency is set as the time it takes to latch the second data in the MAC operator based on the fourth MAC command and to perform the MAC arithmetic operation of the first and second data which are latched in the MAC operator. The MAC command generator 240 is configured to output the sixth MAC command at a sixth point in time when a fifth latency elapses from the fifth point in time. The fifth latency is set as the time it takes to perform an output latch operation of MAC result data generated by the MAC arithmetic operation.

Figure 4:
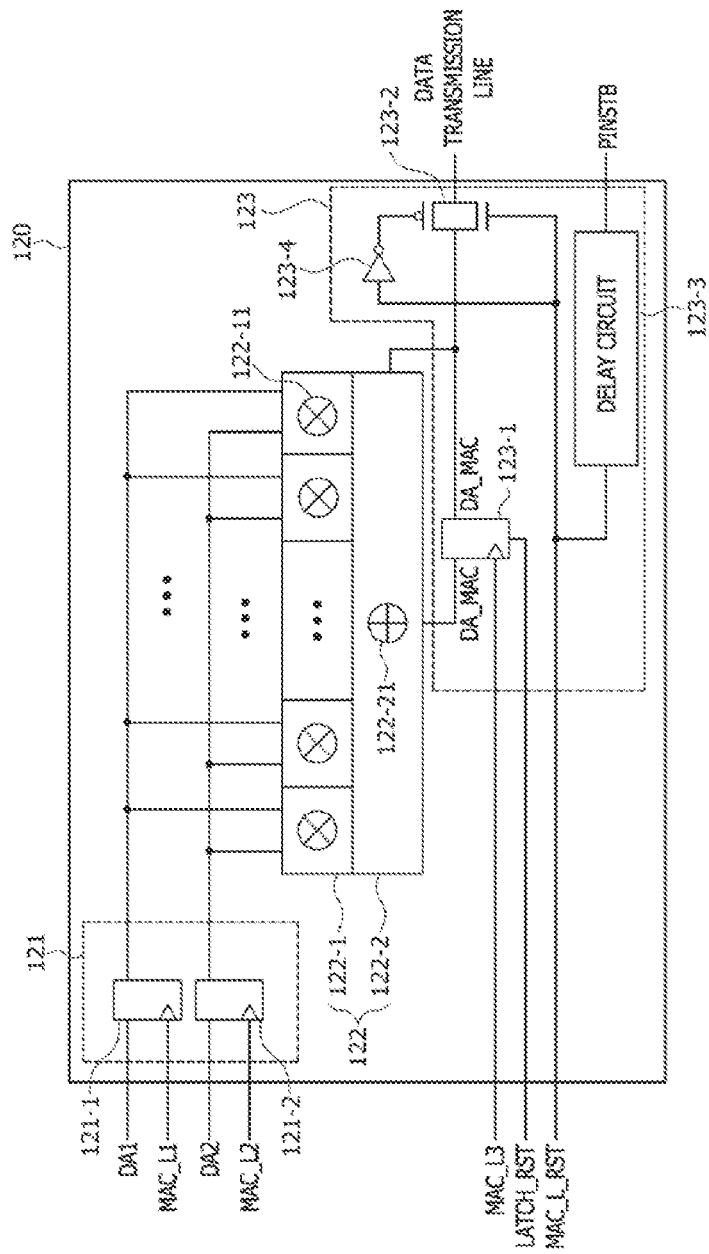
FIG. 4 is a block diagram illustrating an example of a configuration of a MAC operator of a PIM device included in a PIM system according to a first embodiment of the present disclosure.

FIG. 4 illustrates an example of the MAC operator 120 of the PIM device 100 included in the PIM system 1-1 according to the first embodiment of the present disclosure. Referring to FIG. 4, MAC operator 120 may be configured to include a data input circuit 121, a MAC circuit 122, and a data output circuit 123. The data input circuit 121 may include a first input latch 121-1 and a second input latch 121-2. The MAC circuit 122 may include a multiplication logic circuit 122-1 and an addition logic circuit 122-2. The data output circuit 123 may include an output latch 123-1, a transfer gate 123-2, a delay circuit 123-3, and an inverter 123-4. In an embodiment, the first input latch 121-1, the second input latch 121-2, and the output latch 123-1 may be realized using flip-flops.

The data input circuit 121 of the MAC operator 120 may be synchronized with the first MAC input latch signal MAC_L1 to latch first data DA1 transferred from the first memory bank 111 to the MAC circuit 122 through an internal data transmission line. In addition, the data input circuit 121 of the MAC operator 120 may be synchronized with the second MAC input latch signal MAC_L2 to latch second data DA2 transferred from the second memory bank 112 to the MAC circuit 122 through another internal data transmission line. Because the first MAC input latch signal MAC_L1 and the second MAC input latch signal MAC_L2 are sequentially transmitted from the MAC command generator 240 of the PIM controller 200 to the MAC operator 120 of the PIM device 100 with a predetermined time interval, the second data DA2 may be inputted to the MAC circuit 122 of the MAC operator 120 after the first data DA1 is inputted to the MAC circuit 122 of the MAC operator 120.

The MAC circuit 122 may perform the MAC arithmetic operation of the first data DA1 and the second data DA2 inputted through the data input circuit 121. The multiplication logic circuit 122-1 of the MAC circuit 122 may include a plurality of multipliers 122-11. Each of the multipliers 122-11 may perform a multiplying calculation of the first data DA1 outputted from the first input latch 121-1 and the second data DA2 outputted from the second input latch 121-2 and may output the result of the multiplying calculation. Bit values constituting the first data DA1 may be separately inputted to the multipliers 122-11. Similarly, bit values constituting the second data DA2 may also be separately inputted to the multipliers 122-11. For example, if the first data DA1 is represented by an 'N'-bit binary stream, the second data DA2 is represented by an 'N'-bit binary stream, and the number of the multipliers 122-11 is 'M', then 'N/M'-bit portions of the first data DA1 and 'N/M'-bit portions of the second data DA2 may be inputted to each of the multipliers 122-11.

The addition logic circuit 122-2 of the MAC circuit 122 may include a plurality of adders 122-21. Although not shown in the drawings, the plurality of adders 122-21 may be disposed to provide a tree structure including a plurality of stages. Each of the adders 122-21 disposed at a first stage may receive two sets of multiplication result data from two of the multipliers 122-11 included in the multiplication logic circuit 122-1 and may perform an adding calculation of the two sets of multiplication result data to output the addition result data. Each of the adders 122-21 disposed at a second stage may receive two sets of addition result data from two of the adders 122-21 disposed at the first stage and may perform an adding calculation of the two sets of addition result data to output the addition result data. The adder 122-21 disposed at a last stage may receive two sets of addition result data from two adders 122-21 disposed at the previous stage and may perform an adding calculation of the two sets of addition result data to output the addition result data. Although not shown in the drawings, the addition logic circuit 122-2 may further include an additional adder for performing an accumulative adding calculation of MAC result data DA_MAC outputted from the adder 122-21 disposed at the last stage and previous MAC result data DA_MAC stored in the output latch 123-1 of the data output circuit 123.

The data output circuit 123 may output the MAC result data DA_MAC outputted from the MAC circuit 122 to a data transmission line. Specifically, the output latch 123-1 of the data output circuit 123 may be synchronized with the MAC output latch signal MAC_L3 to latch the MAC result data DA_MAC outputted from the MAC circuit 122 and to output the latched data of the MAC result data DA_MAC. The MAC result data DA_MAC outputted from the output latch 123-1 may be fed back to the MAC circuit 122 for the accumulative adding calculation. In addition, the MAC result data DA_MAC may be inputted to the transfer gate 123-2. The output latch 123-1 may be initialized if a latch reset signal LATCH_RST is inputted to the output latch 123-1. In such a case, all of data latched by the output latch 123-1 may be removed. In an embodiment, the latch reset signal LATCH_RST may be activated by generation of the MAC latch reset signal MAC_L_RST and may be inputted to the output latch 123-1.

The MAC latch reset signal MAC_L_RST outputted from the MAC command generator 240 may be inputted to the transfer gate 123-2, the delay circuit 123-3, and the inverter 123-4. The inverter 123-4 may inversely buffer the MAC latch reset signal MAC_L_RST to output the inversely buffered signal of the MAC latch reset signal MAC_L_RST to the transfer gate 123-2. The transfer gate 123-2 may transfer the MAC result data DA_MAC from the output latch 123-1 to the data transmission line in response to the MAC latch reset signal MAC_L_RST. The delay circuit 123-3 may delay the MAC latch reset signal MAC_L_RST by a certain time to generate and output a latch control signal PINSTB.

Figure 5:
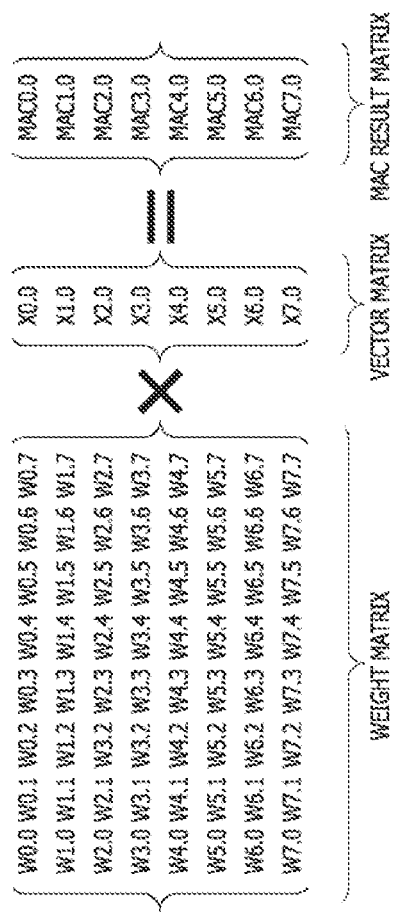
FIG. 5 illustrates an example of a MAC arithmetic operation performed in a PIM system according to a first embodiment of the present disclosure.

FIG. 5 illustrates an example of the MAC arithmetic operation performed in the PIM system 1-1 according to the first embodiment of the present disclosure. As illustrated in FIG. 5, the MAC arithmetic operation performed by the PIM system 1-1 may be executed though a matrix calculation. Specifically, the PIM device 100 may execute a matrix multiplying calculation of an 'M×N' weight matrix (e.g., '8×8' weight matrix) and a 'N×1' vector matrix (e.g., '8×1' vector matrix) according to control of the PIM controller 200 (where, 'M' and 'N' are natural numbers). Elements W0.0, . . . , and W7.7 constituting the weight matrix may correspond to the first data DA1 inputted to the MAC operator 120 from the first memory bank 111. Elements X0.0, . . . , and X7.0 constituting the vector matrix may correspond to the second data DA2 inputted to the MAC operator 120 from the second memory bank 112. Each of the elements W0.0, . . . , and W7.7 constituting the weight matrix may be represented by a binary stream having a plurality of bit values. In addition, each of the elements X0.0, . . . , and X7.0 constituting the vector matrix may also be represented by a binary stream having a plurality of bit values. The number of bits included in each of the elements W0.0, . . . , and W7.7 constituting the weight matrix may be equal to the number of bits included in each of the elements X0.0, . . . , and X7.0 constituting the vector matrix.

The matrix multiplying calculation of the weight matrix and the vector matrix may be appropriate for a multilayer perceptron-type neural network structure (hereinafter, referred to as an 'MLP-type neural network'). In general, the MLP-type neural network for executing deep learning may include an input layer, a plurality of hidden layers (e.g., at least three hidden layers), and an output layer. The matrix multiplying calculation (i.e., the MAC arithmetic operation) of the weight matrix and the vector matrix illustrated in FIG. 5 may be performed in one of the hidden layers. In a first hidden layer of the plurality of hidden layers, the MAC arithmetic operation may be performed using vector data inputted to the first hidden layer. However, in each of second to last hidden layers among the plurality of hidden layers, the MAC arithmetic operation may be performed using a calculation result of the previous hidden layer as the vector data.

Figure 6:
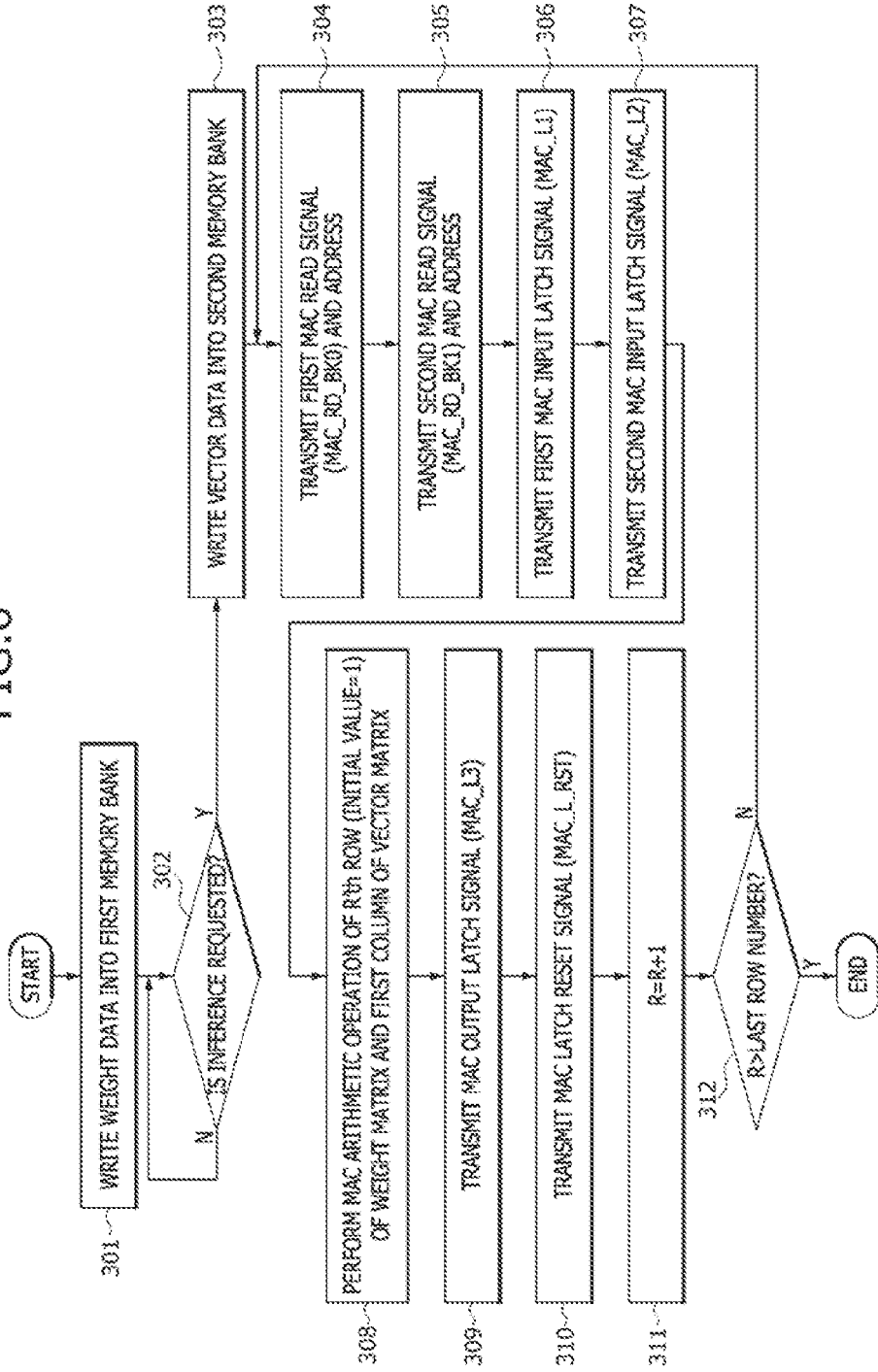
FIG. 6 is a flowchart illustrating processes of the MAC arithmetic operation illustrated in FIG. 5 in a PIM system according to a first embodiment of the present disclosure.

FIG. 6 is a flowchart illustrating processes of the MAC arithmetic operation described with reference to FIG. 5, which are performed in the PIM system 1-1 according to the first embodiment of the present disclosure. In addition, FIGS. 7 to 13 are block diagrams illustrating the processes of the MAC arithmetic operation illustrated in FIG. 5, which are performed in the PIM system 1-1 according to the first embodiment of the present disclosure. Referring to FIGS. 6 to 13, before the MAC arithmetic operation is performed, the first data (i.e., the weight data) may be written into the first memory bank 111 at a step 301. Thus, the weight data may be stored in the first memory bank 111 of the PIM device 100. In the present embodiment, it may be assumed that the weight data are the elements W0.0, . . . , and W7.7 constituting the weight matrix of FIG. 5. The integer before the decimal point is one less than a row number, and the integer after the decimal point is one less than a column number. Thus, for example, the weight W0.0 represents the element of the first row and the first column of the weight matrix.

At a step 302, whether an inference is requested may be determined. An inference request signal may be transmitted from an external device located outside of the PIM system 1-1 to the PIM controller 200 of the PIM system 1-1. An inference request, in some instances, may be based on user input. An inference request may initiate a calculation performed by the PIM system 1-1 to reach a determination based on input data. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 5. If the inference request signal is transmitted to the PIM controller 200 at the step 302, then the PIM controller 200 may write the vector data transmitted with the inference request signal into the second memory bank 112 at a step 303. Accordingly, the vector data may be stored in the second memory bank 112 of the PIM device 100.

Figure 7:
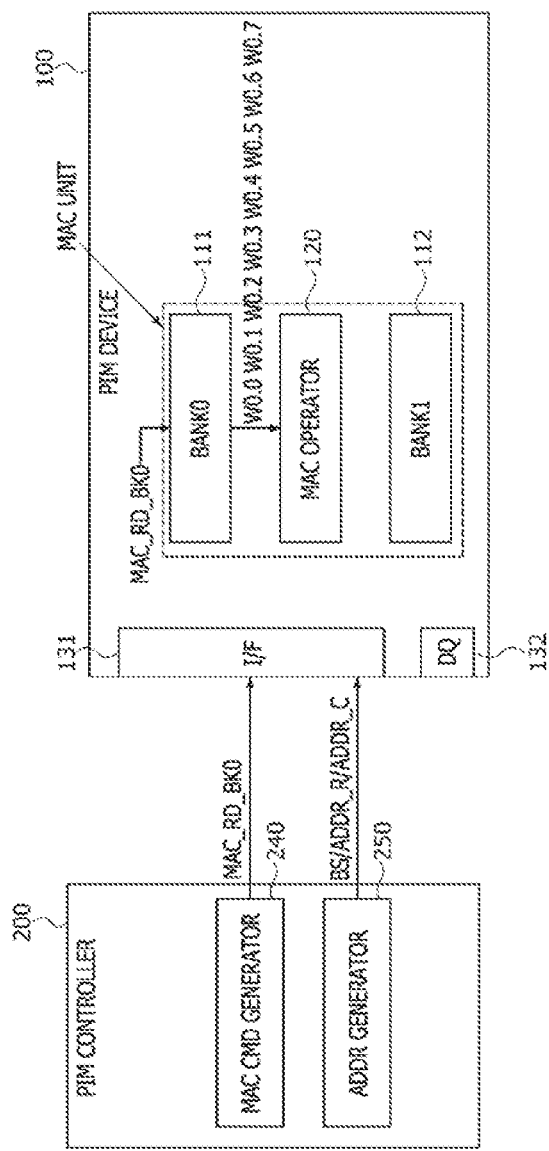
FIGS. 7 to 13 are block diagrams illustrating processes of the MAC arithmetic operation illustrated in FIG. 5 in a PIM system according to a first embodiment of the present disclosure.

At a step 304, the MAC command generator 240 of the PIM controller 200 may generate and transmit the first MAC read signal MAC_RD_BK0 to the PIM device 100, as illustrated in FIG. 7. In such a case, the address generator 250 of the PIM controller 200 may generate and transmit the bank selection signal BS and the row/column address ADDR_R/ADDR_C to the PIM device 100. The bank selection signal BS may be generated to select the first memory bank 111 of the first and second memory banks 111 and 112. Thus, the first MAC read signal MAC_RD_BK0 may control the data read operation for the first memory bank 111 of the PIM device 100. The first memory bank 111 may output and transmit the elements W0.0, . . . , and W0.7 in the first row of the weight matrix of the weight data stored in a region of the first memory bank 111, which is selected by the row/column address ADDR_R/ADDR_C, to the MAC operator 120 in response to the first MAC read signal MAC_RD_BK0. In an embodiment, the data transmission from the first memory bank 111 to the MAC operator 120 may be executed through a global input/output (hereinafter, referred to as 'GIO') line which is provided as a data transmission path in the PIM device 100. Alternatively, the data transmission from the first memory bank 111 to the MAC operator 120 may be executed through a first bank input/output (hereinafter, referred to as 'BIO') line which is provided specifically for data transmission between the first memory bank 111 and the MAC operator 120.

Figure 8:
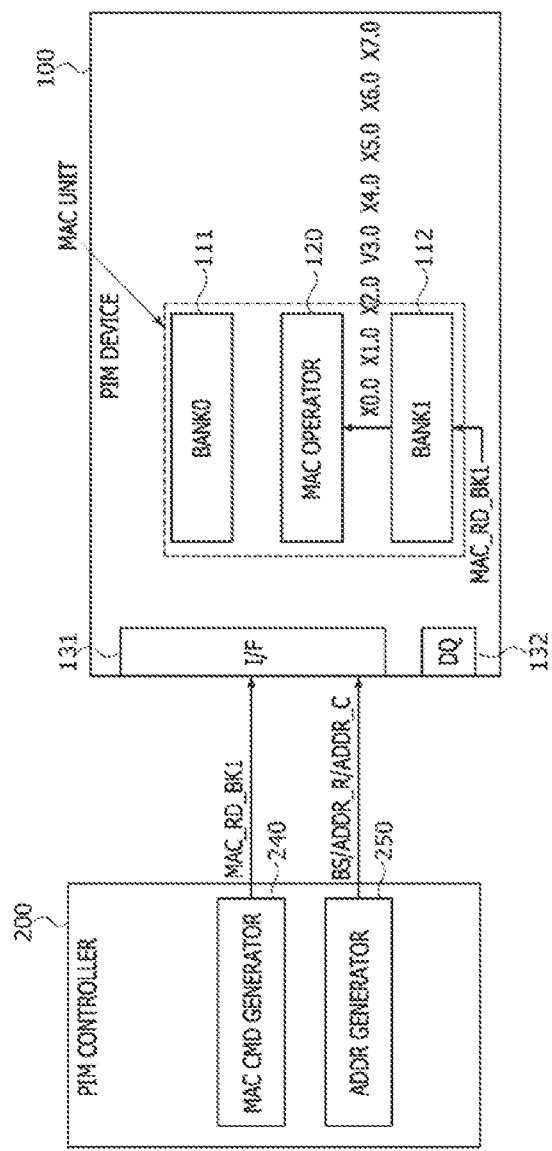

At a step 305, the MAC command generator 240 of the PIM controller 200 may generate and transmit the second MAC read signal MAC_RD_BK1 to the PIM device 100, as illustrated in FIG. 8. In such a case, the address generator 250 of the PIM controller 200 may generate and transmit the bank selection signal BS for selecting the second memory bank 112 and the row/column address ADDR_R/ADDR_C to the PIM device 100. The second MAC read signal MAC_RD_BK1 may control the data read operation for the second memory bank 112 of the PIM device 100. The second memory bank 112 may output and transmit the elements X0.0, . . . , and X7.0 in the first column of the vector matrix corresponding to the vector data stored in a region of the second memory bank 112, which is selected by the row/column address ADDR_R/ADDR_C, to the MAC operator 120 in response to the second MAC read signal MAC_RD_BK1. In an embodiment, the data transmission from the second memory bank 112 to the MAC operator 120 may be executed through the GIO line in the PIM device 100. Alternatively, the data transmission from the second memory bank 112 to the MAC operator 120 may be executed through a second BIO line which is provided specifically for data transmission between the second memory bank 112 and the MAC operator 120.

Figure 9:
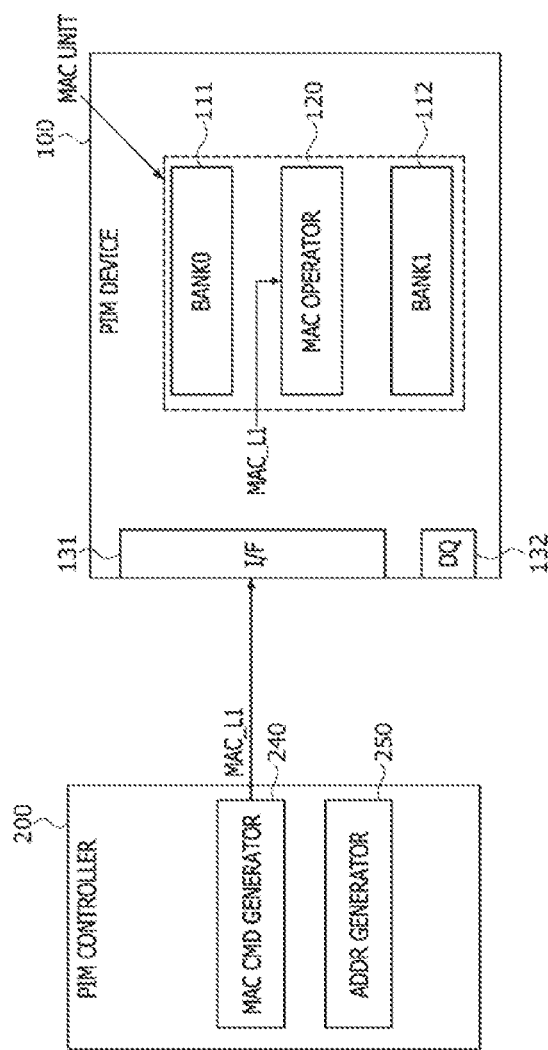
Figure 11:
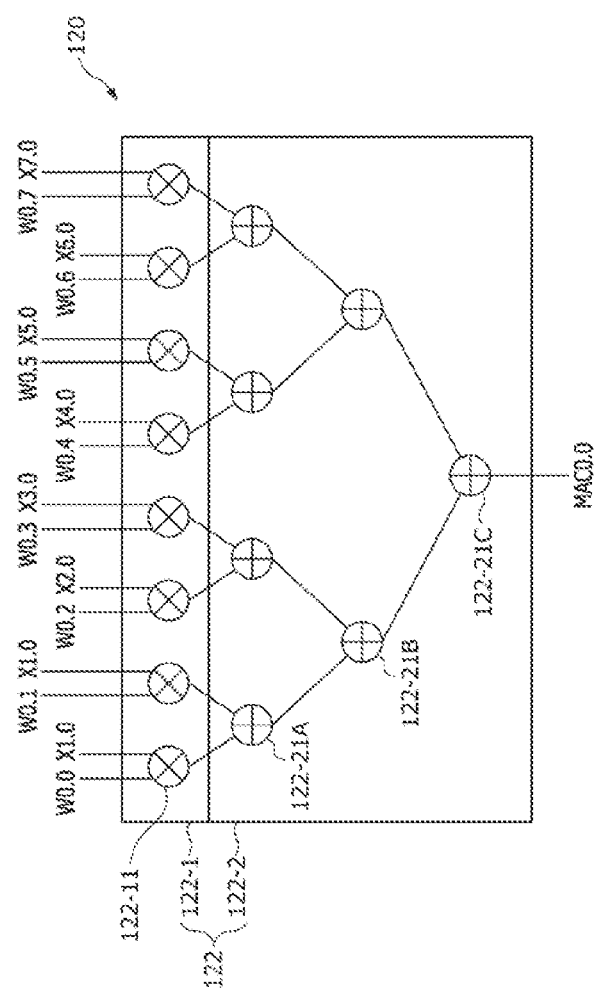

At a step 306, the MAC command generator 240 of the PIM controller 200 may generate and transmit the first MAC input latch signal MAC_1 to the PIM device 100, as illustrated in FIG. 9. The first MAC input latch signal MAC_1 may control the input latch operation of the first data for the MAC operator 120 of the PIM device 100. The elements W0.0, . . . , and W0.7 in the first row of the weight matrix may be inputted to the MAC circuit 122 of the MAC operator 120 by the input latch operation, as illustrated in FIG. 11. The MAC circuit 122 may include the plurality of multipliers 122-11 (e.g., eight multipliers 122-11), the number of which is equal to the number of columns of the weight matrix. In such a case, the elements W0.0, . . . , and W0.7 in the first row of the weight matrix may be inputted to the eight multipliers 122-11, respectively.

Figure 10:
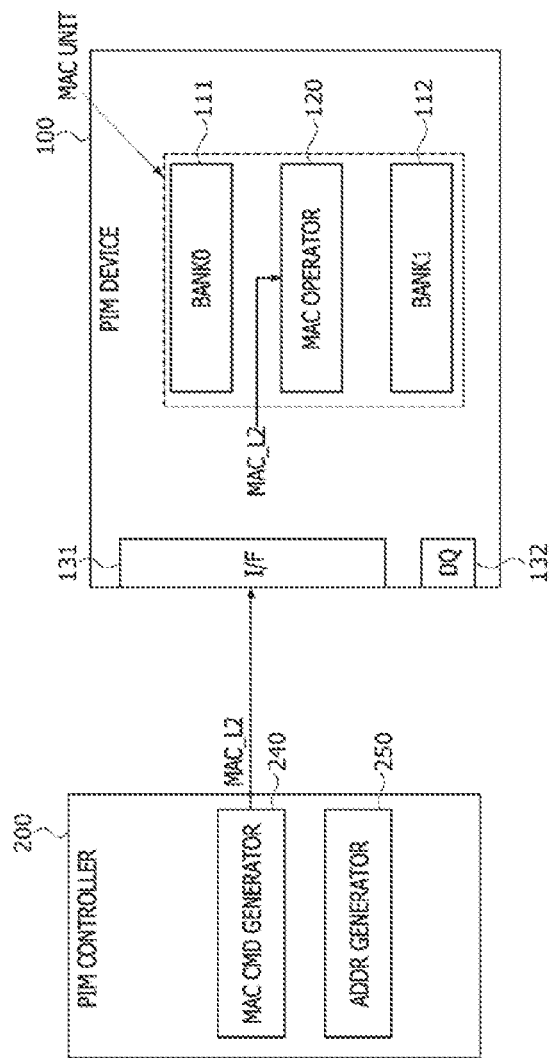

At a step 307, the MAC command generator 240 of the PIM controller 200 may generate and transmit the second MAC input latch signal MAC_L2 to the PIM device 100, as illustrated in FIG. 10. The second MAC input latch signal MAC_L2 may control the input latch operation of the second data for the MAC operator 120 of the PIM device 100. The elements X0.0, . . . , and X7.0 in the first column of the vector matrix may be inputted to the MAC circuit 122 of the MAC operator 120 by the input latch operation, as illustrated in FIG. 11. In such a case, the elements X0.0, . . . , and X7.0 in the first column of the vector matrix may be inputted to the eight multipliers 122-11, respectively.

At a step 308, the MAC circuit 122 of the MAC operator 120 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. For example, the scalar product is calculated of the Rth '1×N' row vector of the 'M×N' weight matrix and the 'N×1' vector matrix as an 'R×1' element of the 'M×1' MAC result matrix. For R=1, the scalar product of the first row of the weight matrix and the first column of the vector matrix shown in FIG. 5 is W0.0*X0.0+W0.1*X1.0+W0.2*X2.0+W0.3*X3.0+W0.4*X4.0+W0.5*X5.0+W0.6*X6.0+W0.7*X7.0. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2, as illustrated in FIG. 11, may include four adders 122-21A disposed at a first stage, two adders 122-21B disposed at a second stage, and an adder 122-21C disposed at a third stage.

Each of the adders 122-21A disposed at the first stage may receive output data of two of the multipliers 122-11 and may perform an adding calculation of the output data of the two multipliers 122-11 to output the result of the adding calculation. Each of the adders 122-21B disposed at the second stage may receive output data of two of the adders 122-21A disposed at the first stage and may perform an adding calculation of the output data of the two adders 122-21A to output the result of the adding calculation. The adder 122-21C disposed at the third stage may receive output data of two of the adders 122-21B disposed at the second stage and may perform an adding calculation of the output data of the two adders 122-21B to output the result of the adding calculation. The output data of the addition logic circuit 122-2 may correspond to result data (i.e., MAC result data) of the MAC arithmetic operation of the first row included in the weight matrix and the column included in the vector matrix. Thus, the output data of the addition logic circuit 122-2 may correspond to an element MAC0.0 located at a first row of an '8×1' MAC result matrix having eight elements of MAC0.0, . . . , and MAC7.0, as illustrated in FIG. 5. The output data MAC0.0 of the addition logic circuit 122-2 may be inputted to the output latch 123-1 disposed in the data output circuit 123 of the MAC operator 120, as described with reference to FIG. 4.

Figure 12:
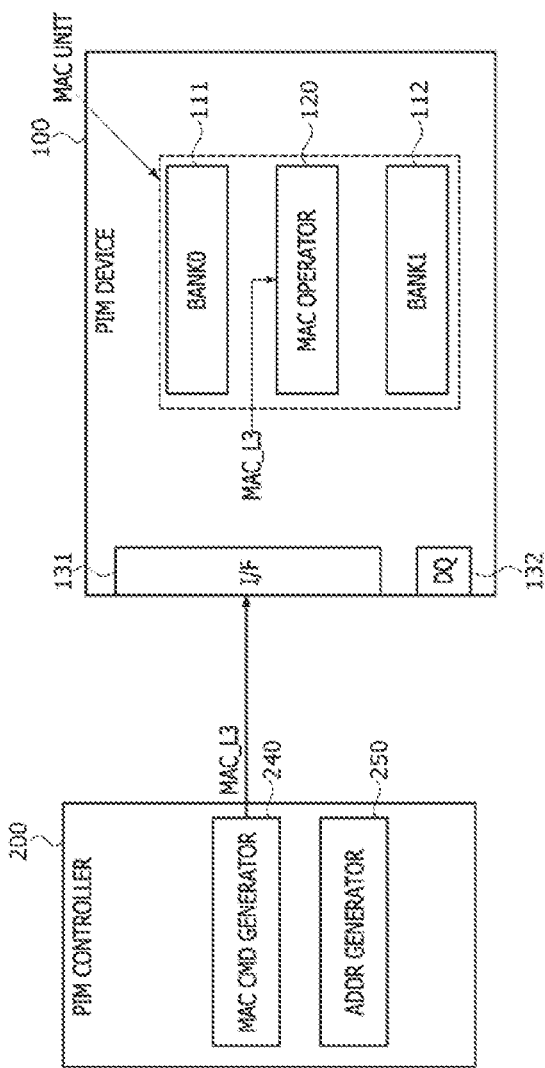

At a step 309, the MAC command generator 240 of the PIM controller 200 may generate and transmit the MAC output latch signal MAC_L3 to the PIM device 100, as illustrated in FIG. 12. The MAC output latch signal MAC_L3 may control the output latch operation of the MAC result data MAC0.0 performed by the MAC operator 120 of the PIM device 100. The MAC result data MAC0.0 inputted from the MAC circuit 122 of the MAC operator 120 may be outputted from the output latch 123-1 in synchronization with the MAC output latch signal MAC_L3, as described with reference to FIG. 4. The MAC result data MAC0.0 outputted from the output latch 123-1 may be inputted to the transfer gate 123-2 of the data output circuit 123.

Figure 13:
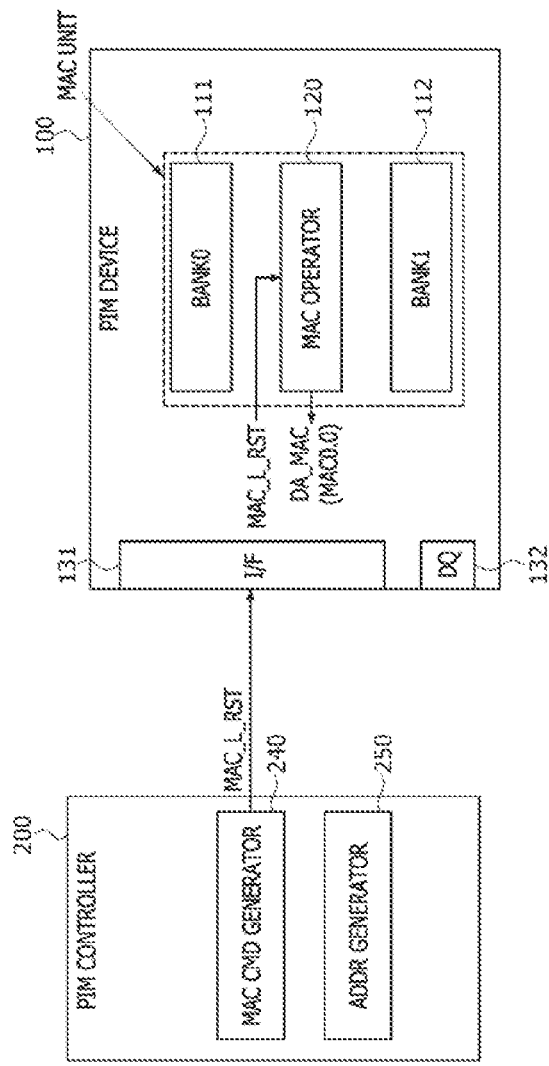

At a step 310, the MAC command generator 240 of the PIM controller 200 may generate and transmit the MAC latch reset signal MAC_L_RST to the PIM device 100, as illustrated in FIG. 13. The MAC latch reset signal MAC_L_RST may control an output operation of the MAC result data MAC0.0 generated by the MAC operator 120 and a reset operation of the output latch included in the MAC operator 120. As described with reference to FIG. 4, the transfer gate 123-2 receiving the MAC result data MAC0.0 from the output latch 123-1 of the MAC operator 120 may be synchronized with the MAC latch reset signal MAC_L_RST to output the MAC result data MAC0.0. In an embodiment, the MAC result data MAC0.0 outputted from the MAC operator 120 may be stored into the first memory bank 111 or the second memory bank 112 through the first BIO line or the second BIO line in the PIM device 100.

At a step 311, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 311. At a step 312, whether the row number changed at the step 311 is greater than the row number of the last row (i.e., the eighth row of the current example) of the weight matrix may be determined. Because the row number of the weight matrix is changed to '2' at the step 311, a process of the MAC arithmetic operation may be fed back to the step 304.

If the process of the MAC arithmetic operation is fed back to the step 304 from the step 312, then the same processes as described with reference to the steps 304 to 310 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 304 at the step 312, then the processes from the step 304 to the step 311 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 311, the MAC arithmetic operation may terminate because the row number of '9' is greater than the last row number of '8' at the step 312.

Figure 14:
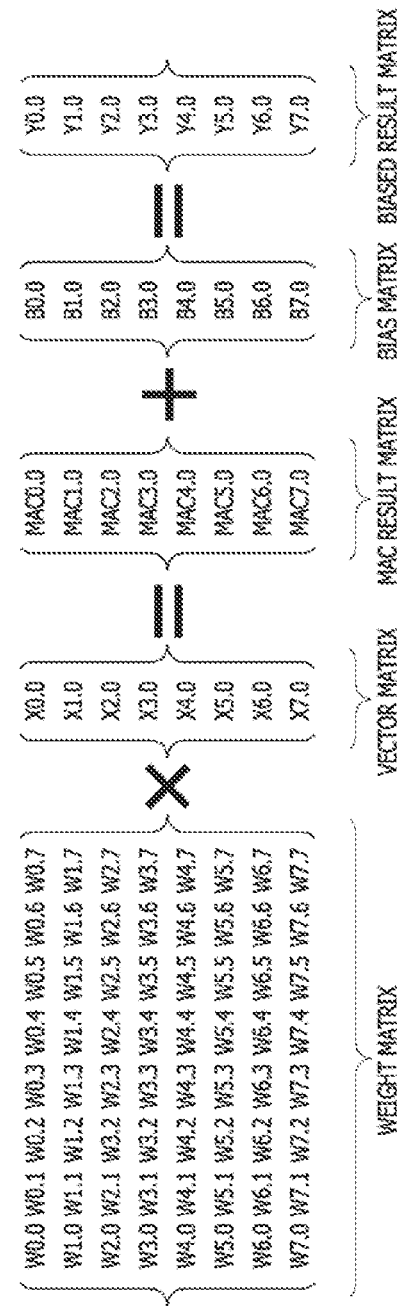
FIG. 14 illustrates another example of a MAC arithmetic operation performed in a PIM system according to a first embodiment of the present disclosure.

FIG. 14 illustrates another example of a MAC arithmetic operation performed in the PIM system 1-1 according to the first embodiment of the present disclosure. As illustrated in FIG. 14, the MAC arithmetic operation performed by the PIM system 1-1 may further include an adding calculation of the MAC result matrix and a bias matrix. Specifically, as described with reference to FIG. 5, the PIM device 100 may execute the matrix multiplying calculation of the '8×8' weight matrix and the '8×1' vector matrix according to control of the PIM controller 200. As a result of the matrix multiplying calculation of the '8×8' weight matrix and the '8×1' vector matrix, the '8×1' MAC result matrix having the eight elements MAC0.0, . . . , and MAC7.0 may be generated. The '8×1' MAC result matrix may be added to a '8×1' bias matrix. The '8×1' bias matrix may have elements B0.0, . . . , and B7.0 corresponding to bias data. The bias data may be set to reduce an error of the MAC result matrix. As a result of the adding calculation of the MAC result matrix and the bias matrix, a '8×1' biased result matrix having eight elements Y0.0, . . . , and Y7.0 may be generated.

Figure 15:
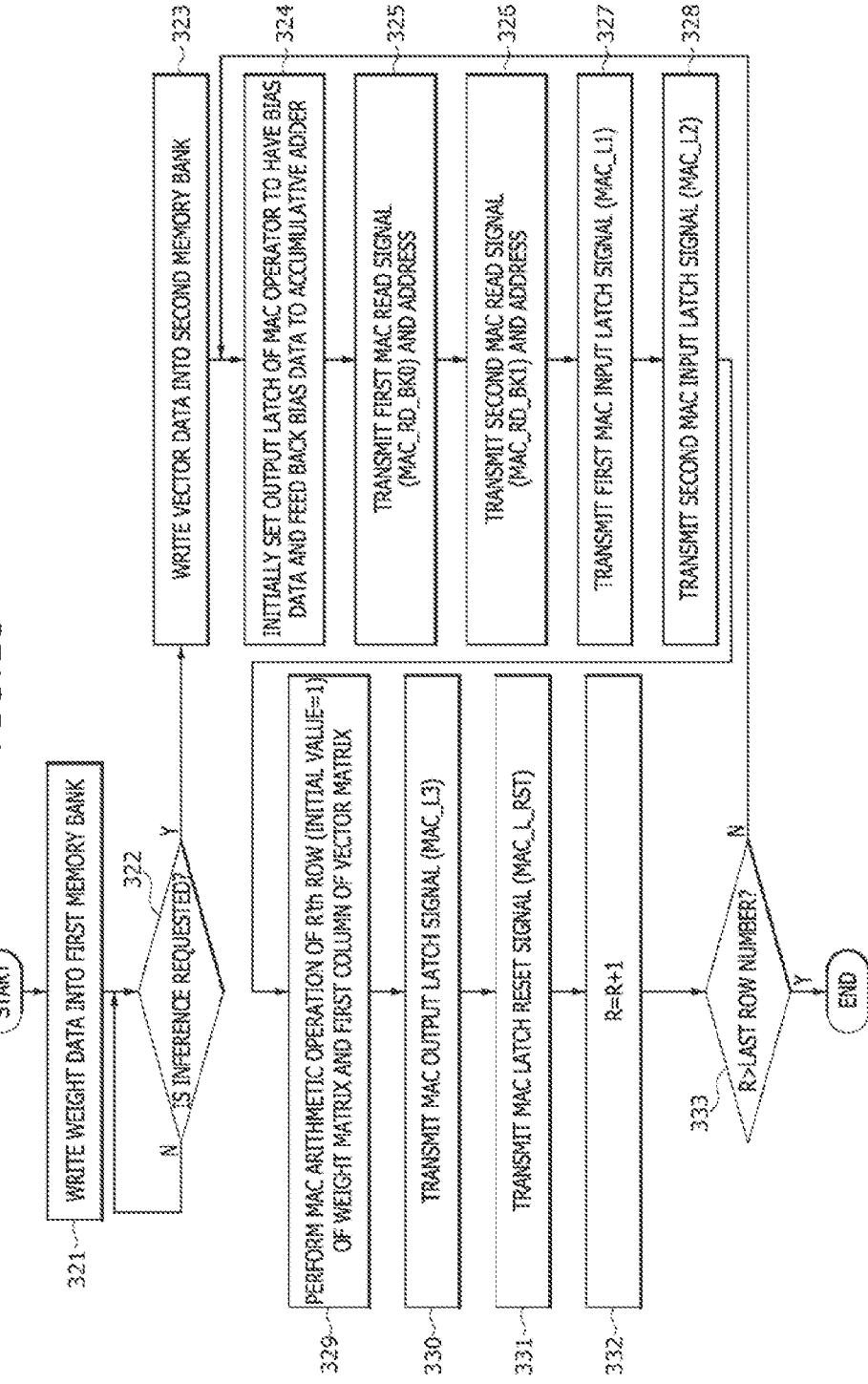
FIG. 15 is a flowchart illustrating processes of the MAC arithmetic operation illustrated in FIG. 14 in a PIM system according to a first embodiment of the present disclosure.
Figure 16:
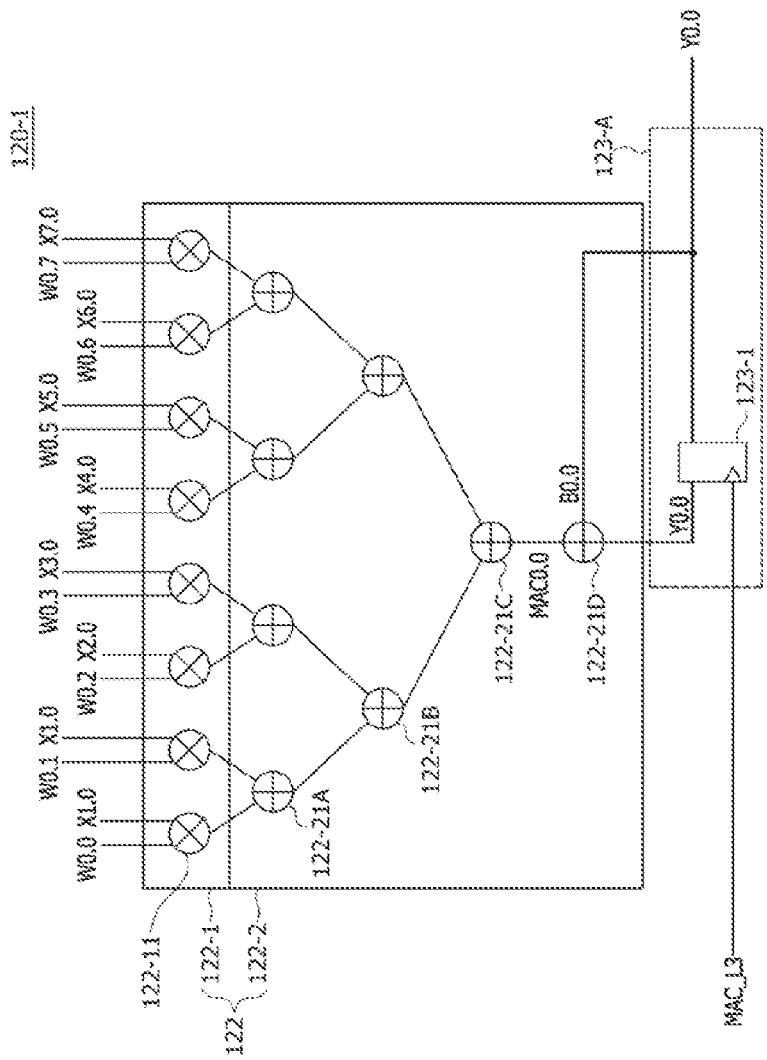
FIG. 16 illustrates an example of a configuration of a MAC operator for performing the MAC arithmetic operation of FIG. 14 in a PIM system according to a first embodiment of the present disclosure.

FIG. 15 is a flowchart illustrating processes of the MAC arithmetic operation described with reference to FIG. 14 in the PIM system 1-1 according to the first embodiment of the present disclosure. Moreover, FIG. 16 illustrates an example of a configuration of a MAC operator 120-1 for performing the MAC arithmetic operation of FIG. 14 in the PIM system 1-1 according to the first embodiment of the present disclosure. In FIG. 16, the same reference numerals or the same reference symbols as used in FIG. 4 denote the same elements, and the detailed descriptions of the same elements as indicated in the previous embodiment will be omitted hereinafter. Referring to FIG. 15, the first data (i.e., the weight data) may be written into the first memory bank 111 at a step 321 to perform the MAC arithmetic operation in the PIM device 100. Thus, the weight data may be stored in the first memory bank 111 of the PIM device 100. In the present embodiment, it may be assumed that the weight data are the elements W0.0, . . . , and W7.7 constituting the weight matrix of FIG. 14.

At a step 322, whether an inference is requested may be determined. An inference request signal may be transmitted from an external device located outside of the PIM system 1-1 to the PIM controller 200 of the PIM system 1-1. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 14. If the inference request signal is transmitted to the PIM controller 200 at the step 322, the PIM controller 200 may write the vector data transmitted with the inference request signal into the second memory bank 112 at a step 323. Accordingly, the vector data may be stored in the second memory bank 112 of the PIM device 100.

At a step 324, the output latch of the MAC operator may be initially set to have the bias data and the initially set bias data may be fed back to an accumulative adder of the MAC operator. This process is executed to perform the matrix adding calculation of the MAC result matrix and the bias matrix, which is described with reference to FIG. 14. In other words, the output latch 123-1 in the data output circuit 123-A of the MAC operator (120-1) is set to have the bias data. Because the matrix multiplying calculation is executed for the first row of the weight matrix, the output latch 123-1 may be initially set to have the element B0.0 located at a cross point of the first row and the first column of the bias matrix as the bias data. The output latch 123-1 may output the bias data B0.0, and the bias data B0.0 outputted from the output latch 123-1 may be inputted to the accumulative adder 122-21D of the addition logic circuit 122-2, as illustrated in FIG. 16.

In an embodiment, in order to output the bias data B0.0 out of the output latch 123-1 and to feed back the bias data B0.0 to the accumulative adder 122-21D, the MAC command generator 240 of the PIM controller 200 may transmit the MAC output latch signal MAC_L3 to the MAC operator 120-1 of the PIM device 100. When a subsequent MAC arithmetic operation is performed, the accumulative adder 122-21D of the MAC operator 120-1 may add the MAC result data MAC0.0 outputted from the adder 122-21C disposed at the last stage to the bias data B0.0 which is fed back from the output latch 123-1 to generate the biased result data Y0.0 and may output the biased result data Y0.0 to the output latch 123-1. The biased result data Y0.0 may be outputted from the output latch 123-1 in synchronization with the MAC output latch signal MAC_L3 transmitted in a subsequent process.

In a step 325, the MAC command generator 240 of the PIM controller 200 may generate and transmit the first MAC read signal MAC_RD_BK0 to the PIM device 100. In addition, the address generator 250 of the PIM controller 200 may generate and transmit the bank selection signal BS and the row/column address ADDR_R/ADDR_C to the PIM device 100. The step 325 may be executed in the same way as described with reference to FIG. 7. In a step 326, the MAC command generator 240 of the PIM controller 200 may generate and transmit the second MAC read signal MAC_RD_BK1 to the PIM device 100. In addition, the address generator 250 of the PIM controller 200 may generate and transmit the bank selection signal BS for selecting the second memory bank 112 and the row/column address ADDR_R/ADDR_C to the PIM device 100. The step 326 may be executed in the same way as described with reference to FIG. 8.

At a step 327, the MAC command generator 240 of the PIM controller 200 may generate and transmit the first MAC input latch signal MAC_1 to the PIM device 100. The step 327 may be executed in the same way as described with reference to FIG. 9. The first MAC input latch signal MAC_1 may control the input latch operation of the first data for the MAC operator 120 of the PIM device 100. The input latch operation of the first data may be performed in the same way as described with reference to FIG. 11. At a step 328, the MAC command generator 240 of the PIM controller 200 may generate and transmit the second MAC input latch signal MAC_L2 to the PIM device 100. The step 328 may be executed in the same way as described with reference to FIG. 10. The second MAC input latch signal MAC_L2 may control the input latch operation of the second data for the MAC operator 120 of the PIM device 100. The input latch operation of the second data may be performed in the same way as described with reference to FIG. 11.

At a step 329, the MAC circuit 122 of the MAC operator 120 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time.

Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may include the four adders 122-21A disposed at the first stage, the two adders 122-21B disposed at the second stage, the adder 122-21C disposed at the third stage, and the accumulative adder 122-21D, as illustrated in FIG. 16. The accumulative adder 122-21D may add output data of the adder 122-21C to feedback data fed back from the output latch 123-1 to output the result of the adding calculation. The output data of the adder 122-21C may be the matrix multiplying result MAC0.0, which corresponds to the result of the matrix multiplying calculation of the first row of the weight matrix and the first column of the vector matrix. The accumulative adder 122-21D may add the output data MAC0.0 of the adder 122-21C to the bias data B0.0 fed back from the output latch 123-1 to output the result of the adding calculation. The output data Y0.0 of the accumulative adder 122-21D may be inputted to the output latch 123 disposed in a data output circuit 123-A of the MAC operator 120-1.

At a step 330, the MAC command generator 240 of the PIM controller 200 may generate and transmit the MAC output latch signal MAC_L3 to the PIM device 100. The step 330 may be executed in the same way as described with reference to FIG. 12. The MAC output latch signal MAC_L3 may control the output latch operation of the MAC result data MAC0.0, which is performed by the MAC operator 120-1 of the PIM device 100. The biased result data Y0.0 transmitted from the MAC circuit 122 of the MAC operator 120 to the output latch 123-1 may be outputted from the output latch 123-1 in synchronization with the MAC output latch signal MAC_L3. The biased result data Y0.0 outputted from the output latch 123 may be inputted to the transfer gate 123-2.

At a step 331, the MAC command generator 240 of the PIM controller 200 may generate and transmit the MAC latch reset signal MAC_L_RST to the PIM device 100. The step 331 may be executed in the same way as described with reference to FIG. 13. The MAC latch reset signal MAC_L_RST may control an output operation of the biased result data Y0.0 generated by the MAC operator 120 and a reset operation of the output latch 123-1 included in the MAC operator 120. The transfer gate 123-2 receiving the biased result data Y0.0 from the output latch 123-1 of the data output circuit 123-A included in the MAC operator 120 may be synchronized with the MAC latch reset signal MAC_L_RST to output the biased result data Y0.0. In an embodiment, the biased result data Y0.0 outputted from the MAC operator 120 may be stored into the first memory bank 111 or the second memory bank 112 through the first BIO line or the second BIO line in the PIM device 100.

At a step 332, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 332. At a step 333, whether the row number changed at the step 332 is greater than the row number of the last row (i.e., the eighth row of the current example) of the weight matrix may be determined. Because the row number of the weight matrix is changed to '2' at the step 332, a process of the MAC arithmetic operation may be fed back to the step 324.

If the process of the MAC arithmetic operation is fed back to the step 324 from the step 333, then the same processes as described with reference to the steps 324 to 331 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix and the bias data B0.0 in the output latch 123-1 initially set at the step 324 may be changed into the bias data B1.0. If the process of the MAC arithmetic operation is fed back to the step 324 at the step 333, the processes from the step 324 to the step 332 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 332, the MAC arithmetic operation may terminate because the row number of '9' is greater than the last row number of '8' at the step 333.

Figure 17:
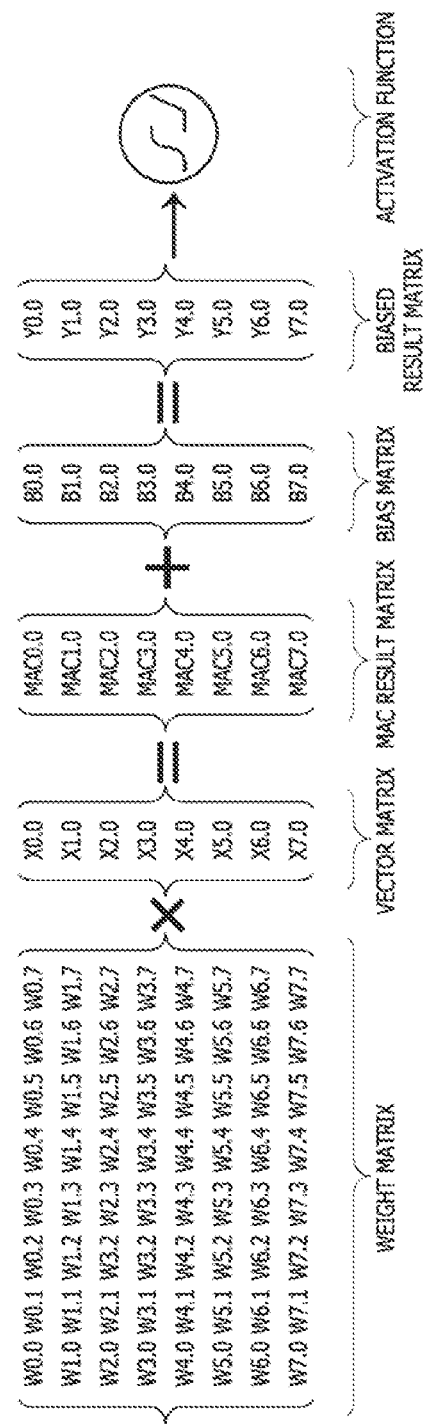
FIG. 17 illustrates yet another example of a MAC arithmetic operation performed in a PIM system according to a first embodiment of the present disclosure.

FIG. 17 illustrates yet another example of a MAC arithmetic operation performed in the PIM system 1-1 according to the first embodiment of the present disclosure. As illustrated in FIG. 17, the MAC arithmetic operation performed by the PIM system 1-1 may further include a process for applying the biased result matrix to an activation function. Specifically, as described with reference to FIG. 14, the PIM device 100 may execute the matrix multiplying calculation of the '8×8' weight matrix and the '8×1' vector matrix according to control of the PIM controller 200 to generate the MAC result matrix. In addition, the MAC result matrix may be added to the bias matrix to generate biased result matrix.

The biased result matrix may be applied to the activation function. The activation function means a function which is used to calculate a unique output value by comparing a MAC calculation value with a critical value in an MLP-type neural network. In an embodiment, the activation function may be a unipolar activation function which generates only positive output values or a bipolar activation function which generates negative output values as well as positive output values. In different embodiments, the activation function may include a sigmoid function, a hyperbolic tangent (Tanh) function, a rectified linear unit (ReLU) function, a leaky ReLU function, an identity function, and a maxout function.

Figure 18:
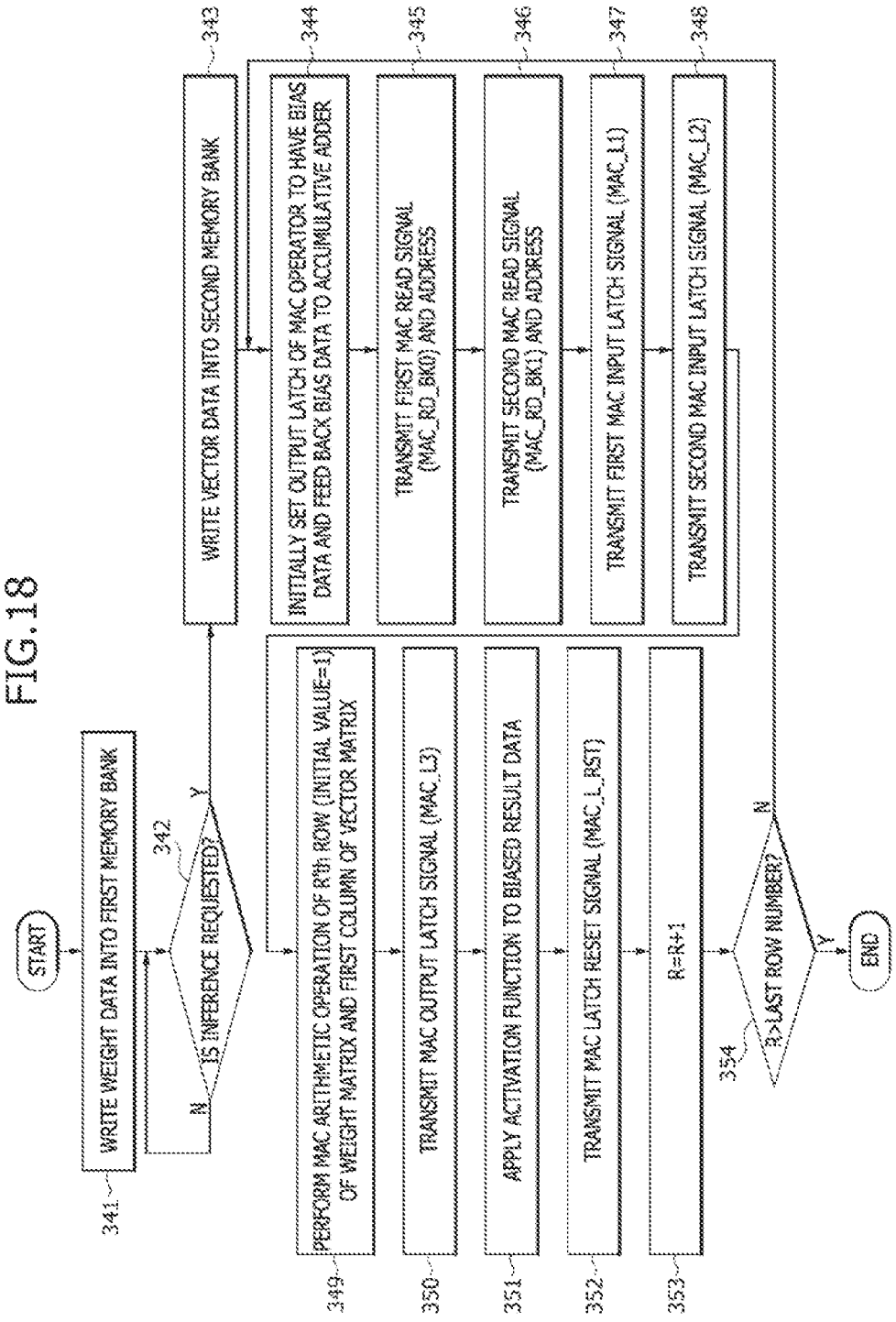
FIG. 18 is a flowchart illustrating processes of the MAC arithmetic operation illustrated in FIG. 17 in a PIM system according to a first embodiment of the present disclosure.
Figure 19:
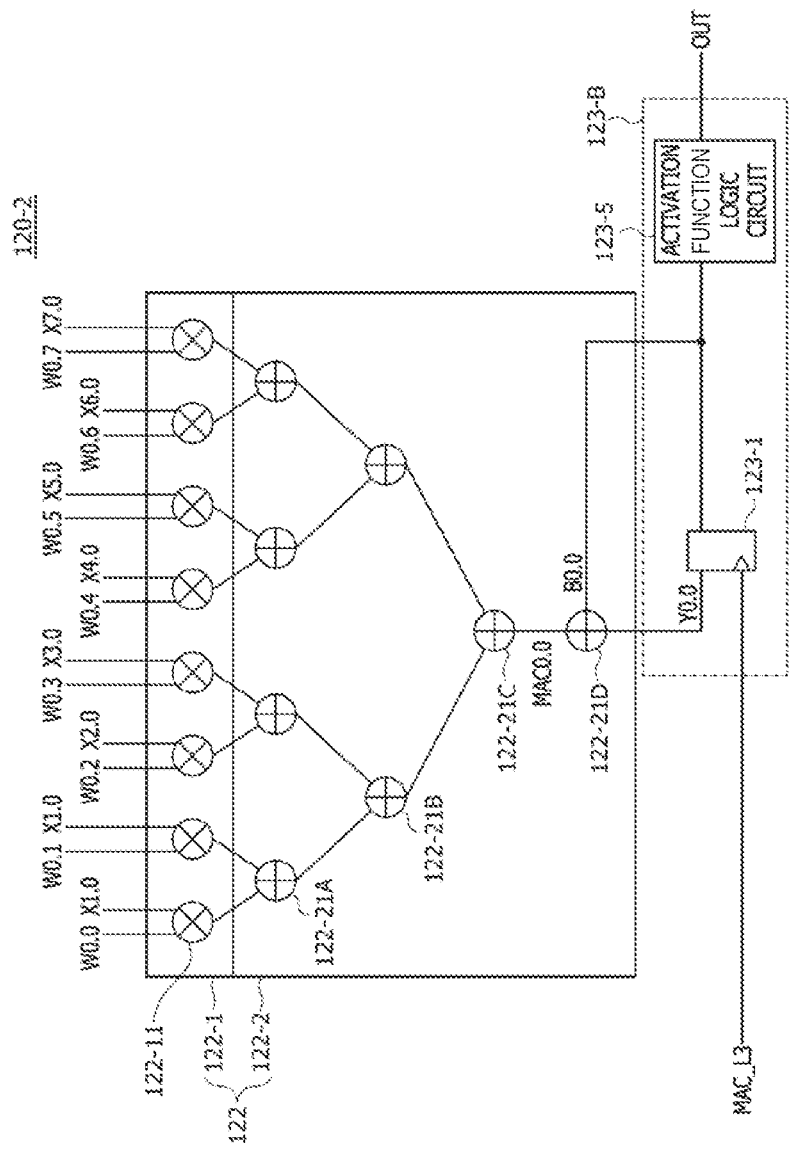
FIG. 19 illustrates an example of a configuration of a MAC operator for performing the MAC arithmetic operation of FIG. 17 in a PIM system according to a first embodiment of the present disclosure.

FIG. 18 is a flowchart illustrating processes of the MAC arithmetic operation described with reference to FIG. 17 in the PIM system 1-1 according to the first embodiment of the present disclosure. Moreover, FIG. 19 illustrates an example of a configuration of a MAC operator 120-2 for performing the MAC arithmetic operation of FIG. 17 in the PIM system 1-1 according to the first embodiment of the present disclosure. In FIG. 19, the same reference numerals or the same reference symbols as used in FIG. 4 denote the same elements, and the detailed descriptions of the same elements as mentioned in the previous embodiment will be omitted hereinafter. Referring to FIG. 18, the first data (i.e., the weight data) may be written into the first memory bank 111 at a step 341 to perform the MAC arithmetic operation in the PIM device 100. Thus, the weight data may be stored in the first memory bank 111 of the PIM device 100. In the present embodiment, it may be assumed that the weight data are the elements W0.0, . . . , and W7.7 constituting the weight matrix of FIG. 17.

At a step 342, whether an inference is requested may be determined. An inference request signal may be transmitted from an external device located outside of the PIM system 1-1 to the PIM controller 200 of the PIM system 1-1. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., the data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 17. If the inference request signal is transmitted to the PIM controller 200 at the step 342, then the PIM controller 200 may write the vector data transmitted with the inference request signal into the second memory bank 112 at a step 343. Accordingly, the vector data may be stored in the second memory bank 112 of the PIM device 100.

At a step 344, an output latch of a MAC operator may be initially set to have bias data and the initially set bias data may be fed back to an accumulative adder of the MAC operator. This process is executed to perform the matrix adding calculation of the MAC result matrix and the bias matrix, which is described with reference to FIG. 17. That is, as illustrated in FIG. 19, the output latch 123-1 of the MAC operator (120-2 of FIG. 19) may be initially set to have the bias data of the bias matrix. Because the matrix multiplying calculation is executed for the first row of the weight matrix, the element B0.0 located at first row and the first column of the bias matrix may be initially set as the bias data in the output latch 123-1. The output latch 123-1 may output the bias data B0.0, and the bias data B0.0 outputted from the output latch 123-1 may be inputted to the accumulative adder 122-21D of the MAC operator 120-2.

In an embodiment, in order to output the bias data B0.0 out of the output latch 123-1 and to feed back the bias data B0.0 to the accumulative adder 122-21D, the MAC command generator 240 of the PIM controller 200 may transmit the MAC output latch signal MAC_L3 to the MAC operator 120-2 of the PIM device 100. When a subsequent MAC arithmetic operation is performed, the accumulative adder 122-21D of the MAC operator 120-2 may add the MAC result data MAC0.0 outputted from the adder 122-21C disposed at the last stage to the bias data B0.0 which is fed back from the output latch 123-1 to generate the biased result data Y0.0 and may output the biased result data Y0.0 to the output latch 123-1. As illustrated in FIG. 19, the biased result data Y0.0 may be transmitted from the output latch 123-1 to an activation function logic circuit 123-5 disposed in a data output circuit 123-B of the MAC operator 120-2 in synchronization with the MAC output latch signal MAC_L3 transmitted in a subsequent process.

In a step 345, the MAC command generator 240 of the PIM controller 200 may generate and transmit the first MAC read signal MAC_RD_BK0 to the PIM device 100. In addition, the address generator 250 of the PIM controller 200 may generate and transmit the bank selection signal BS and the row/column address ADDR_R/ADDR_C to the PIM device 100. The step 345 may be executed in the same way as described with reference to FIG. 7. In a step 346, the MAC command generator 240 of the PIM controller 200 may generate and transmit the second MAC read signal MAC_RD_BK1 to the PIM device 100. In addition, the address generator 250 of the PIM controller 200 may generate and transmit the bank selection signal BS for selecting the second memory bank 112 and the row/column address ADDR_R/ADDR_C to the PIM device 100. The step 346 may be executed in the same way as described with reference to FIG. 8.

At a step 347, the MAC command generator 240 of the PIM controller 200 may generate and transmit the first MAC input latch signal MAC_1 to the PIM device 100. The step 347 may be executed in the same way as described with reference to FIG. 9. The first MAC input latch signal MAC_1 may control the input latch operation of the first data for the MAC operator 120 of the PIM device 100. The input latch operation of the first data may be performed in the same way as described with reference to FIG. 11. At a step 348, the MAC command generator 240 of the PIM controller 200 may generate and transmit the second MAC input latch signal MAC_L2 to the PIM device 100. The step 348 may be executed in the same way as described with reference to FIG. 10. The second MAC input latch signal MAC_L2 may control the input latch operation of the second data for the MAC operator 120 of the PIM device 100. The input latch operation of the second data may be performed in the same way as described with reference to FIG. 11.

At a step 349, the MAC circuit 122 of the MAC operator 120 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may include the four adders 122-21A disposed at the first stage, the two adders 122-21B disposed at the second stage, the adder 122-21C disposed at the third stage, and the accumulative adder 122-21D, as illustrated in FIG. 19. The accumulative adder 122-21D may add output data of the adder 122-21C to feedback data fed back from the output latch 123-1 to output the result of the adding calculation. The output data of the adder 122-21C may be the element MAC0.0 of the '8×1' MAC result matrix, which corresponds to the result of the matrix multiplying calculation of the first row of the weight matrix and the first column of the vector matrix. The accumulative adder 122-21D may add the output data MAC0.0 of the adder 122-21C to the bias data B0.0 fed back from the output latch 123-1 to output the result of the adding calculation. The output data Y0.0 of the accumulative adder 122-21D may be inputted to the output latch 123-1 disposed in the data output circuit 123-A of the MAC operator 120.

At a step 350, the MAC command generator 240 of the PIM controller 200 may generate and transmit the MAC output latch signal MAC_L3 to the PIM device 100. The step 350 may be executed in the same way as described with reference to FIG. 12. The MAC output latch signal MAC_L3 may control the output latch operation of the output latch 123-1 included in the MAC operator 120 of the PIM device 100. The biased result data Y0.0 transmitted from the MAC circuit 122 of the MAC operator 120 to the output latch 123-1 may be outputted from the output latch 123-1 in synchronization with the MAC output latch signal MAC_L3. The biased result data Y0.0 outputted from the output latch 123-1 may be inputted to the activation function logic circuit 123-5. At a step 351, the activation function logic circuit 123-5 may apply an activation function to the biased result data Y0.0 to generate a final output value, and the final output value may be inputted to the transfer gate (123-2 of FIG. 4). This, for example, is the final output value for the current of R which is incremented in step 354.

At a step 352, the MAC command generator 240 of the PIM controller 200 may generate and transmit the MAC latch reset signal MAC_L_RST to the PIM device 100. The step 352 may be executed in the same way as described with reference to FIG. 13. The MAC latch reset signal MAC_L_RST may control an output operation of the final output value generated by the MAC operator 120 and a reset operation of the output latch 123-1 included in the MAC operator 120. The transfer gate 123-2 receiving the final output value from the activation function logic circuit 123-5 of the data output circuit 123-B included in the MAC operator 120 may be synchronized with the MAC latch reset signal MAC_L_RST to output the final output value. In an embodiment, the final output value outputted from the MAC operator 120 may be stored into the first memory bank 111 or the second memory bank 112 through the first BIO line or the second BIO line in the PIM device 100.

At a step 353, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 353. At a step 354, whether the row number changed at the step 353 is greater than the row number of the last row (i.e., the eighth row) of the weight matrix may be determined. Because the row number of the weight matrix is changed to '2' at the step 353, a process of the MAC arithmetic operation may be fed back to the step 344.

If the process of the MAC arithmetic operation is fed back to the step 344 from the step 354, the same processes as described with reference to the steps 344 to 354 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix, and the bias data B0.0 in the output latch 123-1 initially set at the step 344 may be changed to the bias data B1.0. If the process of the MAC arithmetic operation is fed back to the step 344 from the step 354, the processes from the step 344 to the step 354 may be iteratively performed until the MAC arithmetic operation is performed for all of the rows of the weight matrix with the vector matrix. For an embodiment, a plurality of final output values, namely, one final output value for each incremented value of R, represents an 'N×1' final result matrix. If the MAC arithmetic operation for the eighth row of the weight matrix terminates and the row number of the weight matrix changes from '8' to '9' at the step 354, the MAC arithmetic operation may terminate because the row number of '9' is greater than the last row number of '8' at the step 354.

Figure 20:
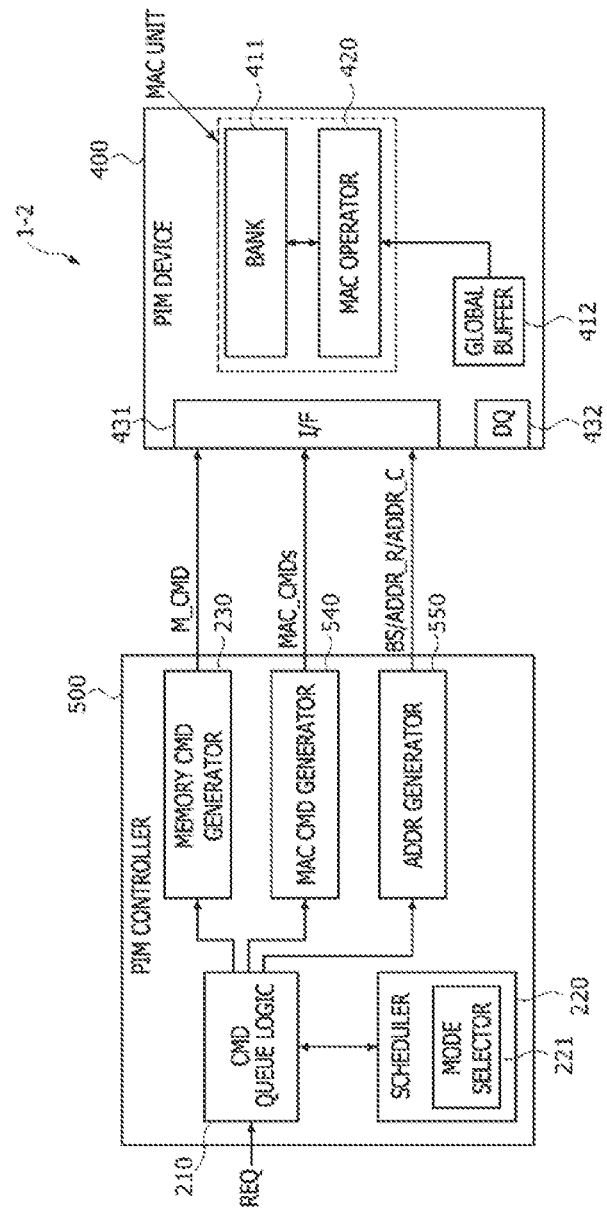
FIG. 20 is a block diagram illustrating a PIM system according to a second embodiment of the present disclosure.

FIG. 20 is a block diagram illustrating a PIM system 1-2 according to a second embodiment of the present disclosure. In FIG. 20, the same reference numerals or the same reference symbols as used in FIG. 2 denote the same elements. As illustrated in FIG. 20, the PIM system 1-2 may be configured to include a PIM device 400 and a PIM controller 500. The PIM device 400 may be configured to include a memory bank (BANK) 411 corresponding to a storage region, a global buffer 412, a MAC operator 420, an interface (I/F) 431, and a data input/output (I/O) pad 432.

For an embodiment, the MAC operator 420 represents a MAC operator circuit. The memory bank (BANK) 411 and the MAC operator 420 included in the PIM device 400 may constitute one MAC unit. In another embodiment, the PIM device 400 may include a plurality of MAC units. The memory bank (BANK) 411 may represent a memory region for storing data, for example, a DRAM device. The global buffer 412 may also represent a memory region for storing data, for example, a DRAM device or an SRAM device. The memory bank (BANK) 411 may be a component unit which is independently activated and may be configured to have the same data bus width as data I/O lines in the PIM device 400. In an embodiment, the memory bank 411 may operate through interleaving such that an active operation of the memory bank 411 is performed in parallel while another memory bank is selected. The memory bank 411 may include at least one cell array which includes memory unit cells located at cross points of a plurality of rows and a plurality of columns.

Although not shown in the drawings, a core circuit may be disposed adjacent to the memory bank 411. The core circuit may include X-decoders XDECs and Y-decoders/IO circuits YDEC/IOs. An X-decoder XDEC may also be referred to as a word line decoder or a row decoder. The X-decoder XDEC may receive a row address ADDR_R from the PIM controller 500 and may decode the row address ADDR_R to select and enable one of the rows (i.e., word lines) coupled to the selected memory bank. Each of the Y-decoders/IO circuits YDEC/IOs may include a Y-decoder YDEC and an I/O circuit IO. The Y-decoder YDEC may also be referred to as a bit line decoder or a column decoder. The Y-decoder YDEC may receive a column address ADD_C from the PIM controller 500 and may decode the column address ADD_C to select and enable at least one of the columns (i.e., bit lines) coupled to the selected memory bank. Each of the I/O circuits may include an I/O sense amplifier for sensing and amplifying a level of a read datum outputted from the corresponding memory bank during a read operation for the memory bank 411. In addition, the I/O circuit may include a write driver for driving a write datum during a write operation for the memory bank 411.

The MAC operator 420 of the PIM device 400 may have mostly the same configuration as the MAC operator 120 described with reference to FIG. 4. That is, the MAC operator 420 may be configured to include the data input circuit 121, the MAC circuit 122, and the data output circuit 123, as described with reference to FIG. 4. The data input circuit 121 may be configured to include the first input latch 121-1 and the second input latch 121-2. The MAC circuit 122 may be configured to include the multiplication logic circuit 122-1 and the addition logic circuit 122-2. The data output circuit 123 may be configured to include the output latch 123-1, the transfer gate 123-2, the delay circuit 123-3, and the inverter 123-4. In an embodiment, the first input latch 121-1, the second input latch 121-2, and the output latch 123-1 may be realized using flip-flops.

The MAC operator 420 may be different from the MAC operator 120 in that a MAC input latch signal MAC_L1 is simultaneously inputted to both of clock terminals of the first and second input latches 121-1 and 121-2. As indicated in the following descriptions, the weight data and the vector data may be simultaneously transmitted to the MAC operator 420 of the PIM device 400 included in the PIM system 1-2 according to the present embodiment. That is, the first data DA1 (i.e., the weight data) and the second data DA2 (i.e., the vector data) may be simultaneously inputted to both of the first input latch 121-1 and the second input latch 121-2 constituting the data input circuit 121, respectively. Accordingly, it may be unnecessary to apply an extra control signal to the clock terminals of the first and second input latches 121-1 and 121-2, and thus the MAC input latch signal MAC_1 may be simultaneously inputted to both of the clock terminals of the first and second input latches 121-1 and 121-2 included in the MAC operator 420.

In another embodiment, the MAC operator 420 may be realized to have the same configuration as the MAC operator 120-1 described with reference to FIG. 16 to perform the operation illustrated in FIG. 14. Even in such a case, the MAC operator 420 may have the same configuration as described with reference to FIG. 16 except that the MAC input latch signal MAC_L1 is simultaneously inputted to both of the clock terminals of the first and second input latches 121-1 and 121-2 constituting the data input circuit 121. In yet another embodiment, the MAC operator 420 may be realized to have the same configuration as the MAC operator 120-2 described with reference to FIG. 19 to perform the operation illustrated in FIG. 17. Even in such a case, the MAC operator 420 may have the same configuration as described with reference to FIG. 19 except that the MAC input latch signal MAC_L1 is simultaneously inputted to both of the clock terminals of the first and second input latches 121-1 and 121-2 constituting the data input circuit 121.

The interface 431 of the PIM device 400 may receive the memory command M_CMD, the MAC commands MAC_CMDs, the bank selection signal BS, and the row/column addresses ADDR_R/ADDR_C from the PIM controller 500. The interface 431 may output the memory command M_CMD, together with the bank selection signal BS and the row/column addresses ADDR_R/ADDR_C, to the memory bank 411. The interface 431 may output the MAC commands MAC_CMDs to the memory bank 411 and the MAC operator 420. In such a case, the interface 431 may output the bank selection signal BS and the row/column addresses ADDR_R/ADDR_C to the memory bank 411. The data I/O pad 432 of the PIM device 400 may function as a data communication terminal between a device external to the PIM device 400, the global buffer 412, and the MAC unit (which includes the memory bank 411 and the MAC operator 420) included in the PIM device 400. The external device to the PIM device 400 may correspond to the PIM controller 500 of the PIM system 1-2 or a host located outside the PIM system 1-2. Accordingly, data outputted from the host or the PIM controller 500 may be inputted into the PIM device 400 through the data I/O pad 432. In addition, data generated by the PIM device 400 may be transmitted to the external device to the PIM device 400 through the data I/O pad 432.

The PIM controller 500 may control operations of the PIM device 400. In an embodiment, the PIM controller 500 may control the PIM device 400 such that the PIM device 400 operates in the memory mode or the MAC mode. In the event that the PIM controller 500 controls the PIM device 500 such that the PIM device 400 operates in the memory mode, the PIM device 400 may perform a data read operation or a data write operation for the memory bank 411. In the event that the PIM controller 500 controls the PIM device 400 such that the PIM device 400 operates in the MAC mode, the PIM device 400 may perform the MAC arithmetic operation for the MAC operator 420. In the event that the PIM controller 500 controls the PIM device 400 such that the PIM device 400 operates in the MAC mode, the PIM device 400 may also perform the data read operation and the data write operation for the memory bank 411 and the global buffer 412 to execute the MAC arithmetic operation.

The PIM controller 500 may be configured to include the command queue logic 210, the scheduler 220, the memory command generator 230, a MAC command generator 540, and an address generator 550. The scheduler 220 may include the mode selector 221. The command queue logic 210 may receive the request REQ from an external device (e.g., a host of the PIM system 1-2) and store a command queue corresponding the request REQ in the command queue logic 210. The command queue stored in the command queue logic 210 may be transmitted to the memory command generator 230 or the MAC command generator 540 according to a sequence determined by the scheduler 220. The scheduler 220 may adjust a timing of the command queue when the command queue stored in the command queue logic 210 is outputted from the command queue logic 210. The scheduler 210 may include the mode selector 221 that generates a mode selection signal including information on whether command queue stored in the command queue logic 210 relates to the memory mode or the MAC mode. The memory command generator 230 may receive the command queue related to the memory mode of the PIM device 400 from the command queue logic 210 to generate and output the memory command M_CMD. The command queue logic 210, the scheduler 220, the mode selector 221, and the memory command generator 230 may have the same function as described with reference to FIG. 2.

The MAC command generator 540 may receive the command queue related to the MAC mode of the PIM device 400 from the command queue logic 210. The MAC command generator 540 may decode the command queue to generate and output the MAC commands MAC_CMDs. The MAC commands MAC_CMDs outputted from the MAC command generator 540 may be transmitted to the PIM device 400. The data read operation for the memory bank 411 of the PIM device 400 may be performed by the MAC commands MAC_CMDs outputted from the MAC command generator 540, and the MAC arithmetic operation of the MAC operator 420 may also be performed by the MAC commands MAC_CMDs outputted from the MAC command generator 540. The MAC commands MAC_CMDs and the MAC arithmetic operation of the PIM device 400 according to the MAC commands MAC_CMDs will be described in detail with reference to FIG. 21.

The address generator 550 may receive address information from the command queue logic 210. The address generator 550 may generate the bank selection signal BS for selecting a memory bank where, for example, the memory bank 411 represents multiple memory banks. The address generator 550 may transmit the bank selection signal BS to the PIM device 400. In addition, the address generator 550 may generate the row address ADDR_R and the column address ADDR_C for accessing a region (e.g., memory cells) in the memory bank 411 and may transmit the row address ADDR_R and the column address ADDR_C to the PIM device 400.

Figure 21:
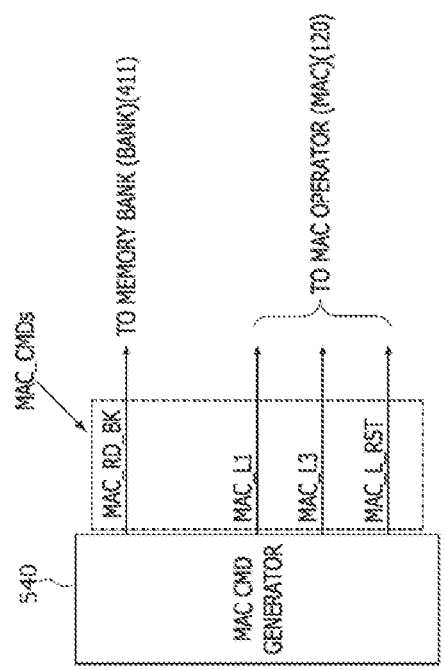
FIG. 21 illustrates MAC commands outputted from a MAC command generator of a PIM controller included in a PIM system according to a second embodiment of the present disclosure.

FIG. 21 illustrates the MAC commands MAC_CMDs outputted from the MAC command generator 540 included in the PIM system 1-2 according to the second embodiment of the present disclosure. As illustrated in FIG. 21, the MAC commands MAC_CMDs may include first to fourth MAC command signals. In an embodiment, the first MAC command signal may be a MAC read signal MAC_RD_BK, the second MAC command signal may be a MAC input latch signal MAC_L1, the third MAC command signal may be a MAC output latch signal MAC_L3, and the fourth MAC command signal may be a MAC latch reset signal MAC_L_RST.

The MAC read signal MAC_RD_BK may control an operation for reading the first data (e.g., the weight data) out of the memory bank 411 to transmit the first data to the MAC operator 420. The MAC input latch signal MAC_1 may control an input latch operation of the weight data transmitted from the first memory bank 411 to the MAC operator 420. The MAC output latch signal MAC_L3 may control an output latch operation of the MAC result data generated by the MAC operator 420. And, the MAC latch reset signal MAC_L_RST may control an output operation of the MAC result data generated by the MAC operator 420 and a reset operation of an output latch included in the MAC operator 420.

The PIM system 1-2 according to the present embodiment may also be configured to perform the deterministic MAC arithmetic operation. Thus, the MAC commands MAC_CMDs transmitted from the PIM controller 500 to the PIM device 400 may be sequentially generated with fixed time intervals. Accordingly, the PIM controller 500 does not require any extra end signals of various operations executed for the MAC arithmetic operation to generate the MAC commands MAC_CMDs for controlling the MAC arithmetic operation. In an embodiment, latencies of the various operations executed by MAC commands MAC_CMDs for controlling the MAC arithmetic operation may be set to have fixed values in order to perform the deterministic MAC arithmetic operation. In such a case, the MAC commands MAC_CMDs may be sequentially outputted from the PIM controller 500 with fixed time intervals corresponding to the fixed latencies.

Figure 22:
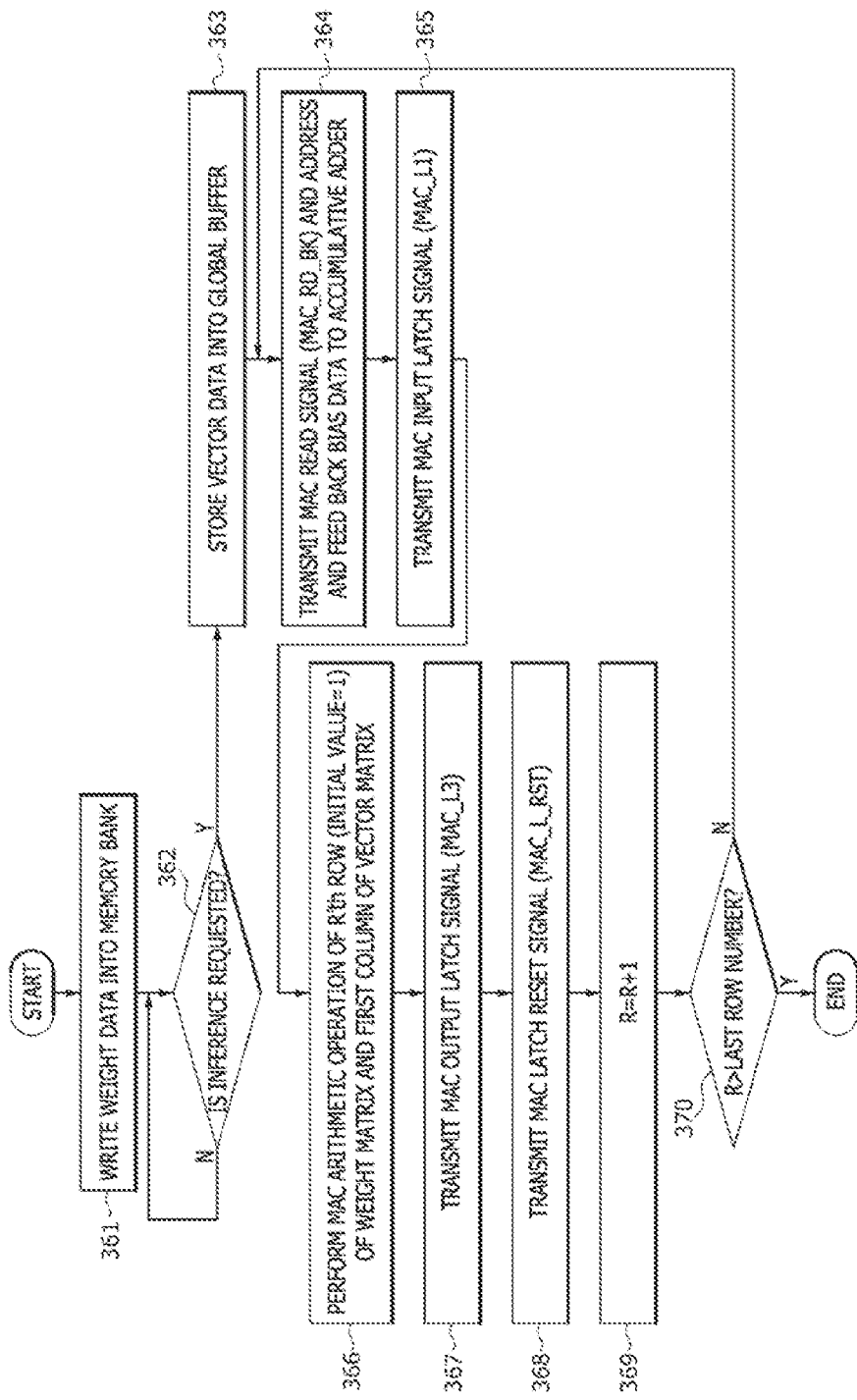
FIG. 22 is a flowchart illustrating processes of the MAC arithmetic operation illustrated in FIG. 5 in a PIM system according to a second embodiment of the present disclosure.

FIG. 22 is a flowchart illustrating processes of the MAC arithmetic operation described with reference to FIG. 5, which are performed in the PIM system 1-2 according to the second embodiment of the present disclosure. In addition, FIGS. 23 to 26 are block diagrams illustrating the processes of the MAC arithmetic operation illustrated in FIG. 5, which are performed in the PIM system 1-2 according to the second embodiment of the present disclosure. Referring to FIGS. 22 to 26, the first data (i.e., the weight data) may be written into the memory bank 411 at a step 361 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 5.

At a step 362, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 5. If the inference request signal is transmitted to the PIM controller 500 at the step 362, then the PIM controller 500 may write the vector data transmitted with the inference request signal into the global buffer 412 at a step 363. Accordingly, the vector data may be stored in the global buffer 412 of the PIM device 400.

Figure 23:
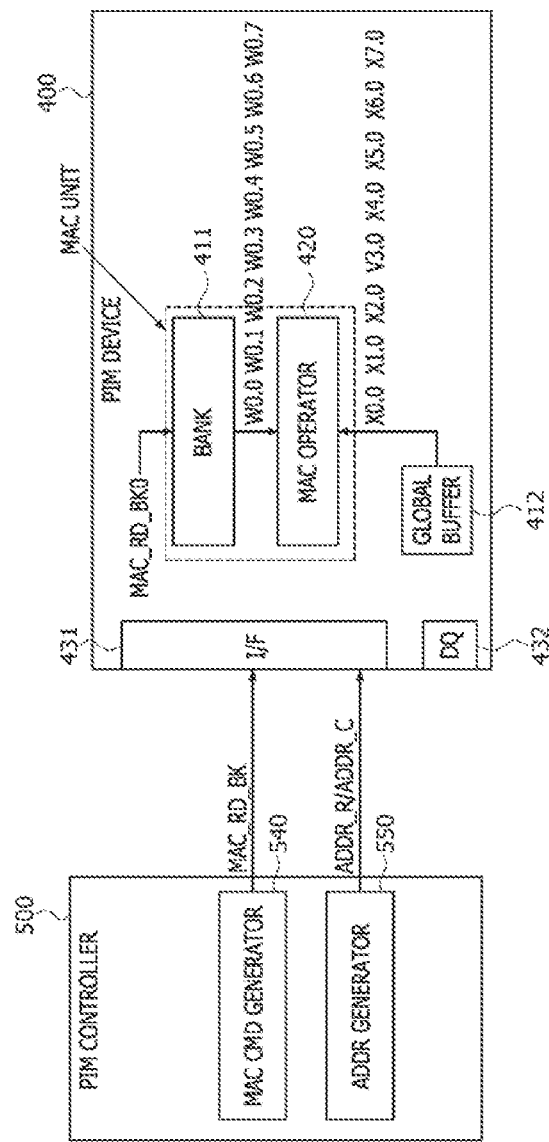
FIGS. 23 to 26 are block diagrams illustrating processes of the MAC arithmetic operation illustrated in FIG. 5 in a PIM system according to a second embodiment of the present disclosure.

At a step 364, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. Although not shown in the drawings, if a plurality of memory banks are disposed in the PIM device 400, the address generator 550 may transmit a bank selection signal for selecting the memory bank 411 among the plurality of memory banks as well as the row/column address ADDR_R/ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK outputted from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

Figure 24:
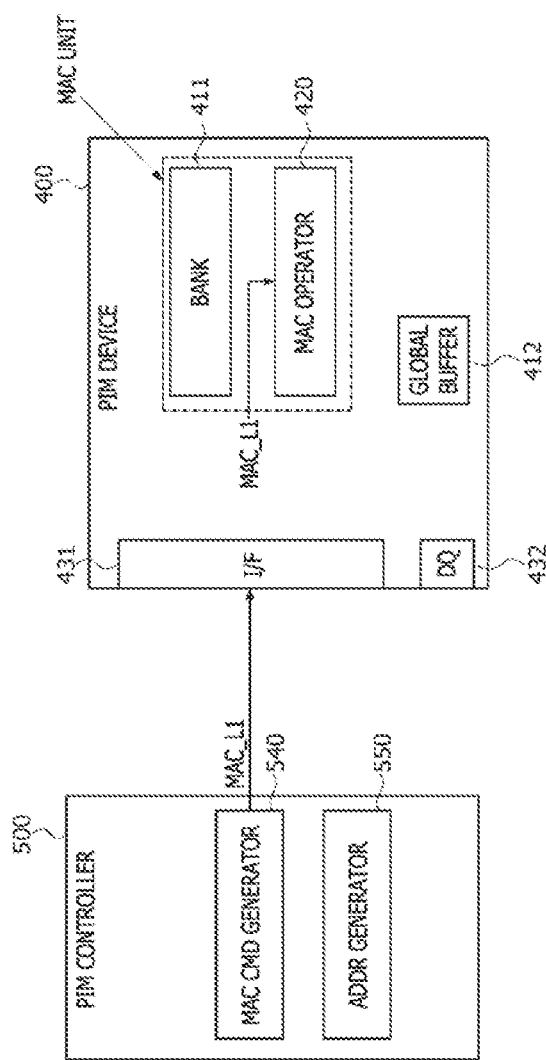

At a step 365, the MAC command generator 540 of the PIM controller 500 may generate and transmit the MAC input latch signal MAC_1 to the PIM device 400, as illustrated in FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be inputted to the first to eighth multipliers 122-11, respectively, and the elements X0.0, . . . , and X7.0 in the first column of the vector matrix may also be inputted to the first to eighth multipliers 122-11, respectively.

At a step 366, the MAC circuit 122 of the MAC operator 420 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, as described with reference to FIG. 4, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data from the multipliers 122-11 and may perform the adding calculation of the output data of the multipliers 122-11 to output the result data of the adding calculation. The output data of the addition logic circuit 122-2 may correspond to result data (i.e., MAC result data) of the MAC arithmetic operation of the first row included in the weight matrix and the column included in the vector matrix. Thus, the output data of the addition logic circuit 122-2 may correspond to the element MAC0.0 located at the first row of the '8×1' MAC result matrix having the eight elements of MAC0.0, . . . , and MAC7.0 illustrated in FIG. 5. The output data MAC0.0 of the addition logic circuit 122-2 may be inputted to the output latch 123-1 disposed in the data output circuit 123 of the MAC operator 420, as described with reference to FIG. 4.

Figure 25:
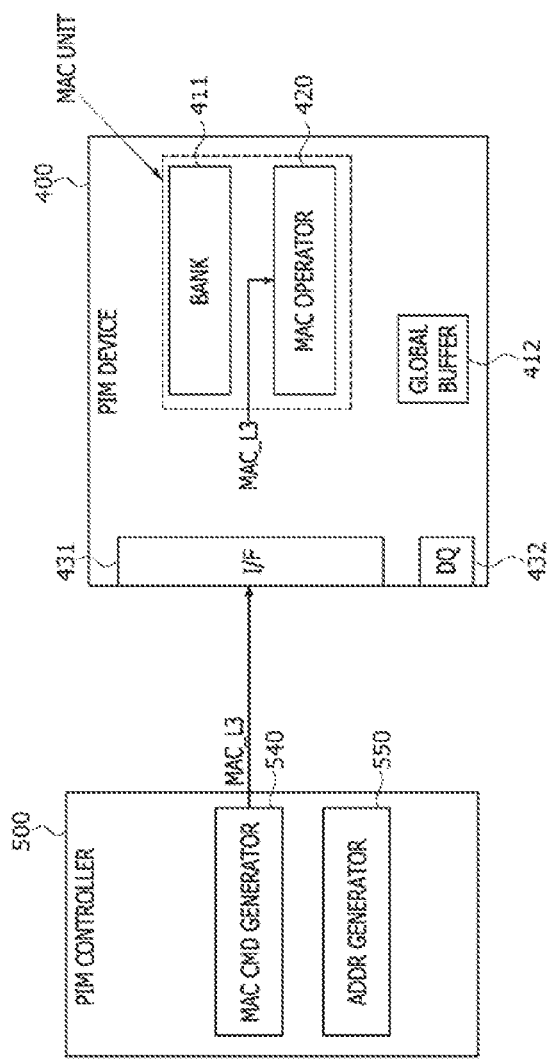

At a step 367, the MAC command generator 540 of the PIM controller 500 may generate and transmit the MAC output latch signal MAC_L3 to the PIM device 400, as illustrated in FIG. 25. The MAC output latch signal MAC_L3 may control the output latch operation of the MAC result data MAC0.0 performed by the MAC operator 420 of the PIM device 400. The MAC result data MAC0.0 transmitted from the MAC circuit 122 of the MAC operator 420 to the output latch 123-1 may be outputted from the output latch 123-1 by the output latch operation performed in synchronization with the MAC output latch signal MAC_L3, as described with reference to FIG. 4. The MAC result data MAC0.0 outputted from the output latch 123-1 may be inputted to the transfer gate 123-2 of the data output circuit 123.

Figure 26:
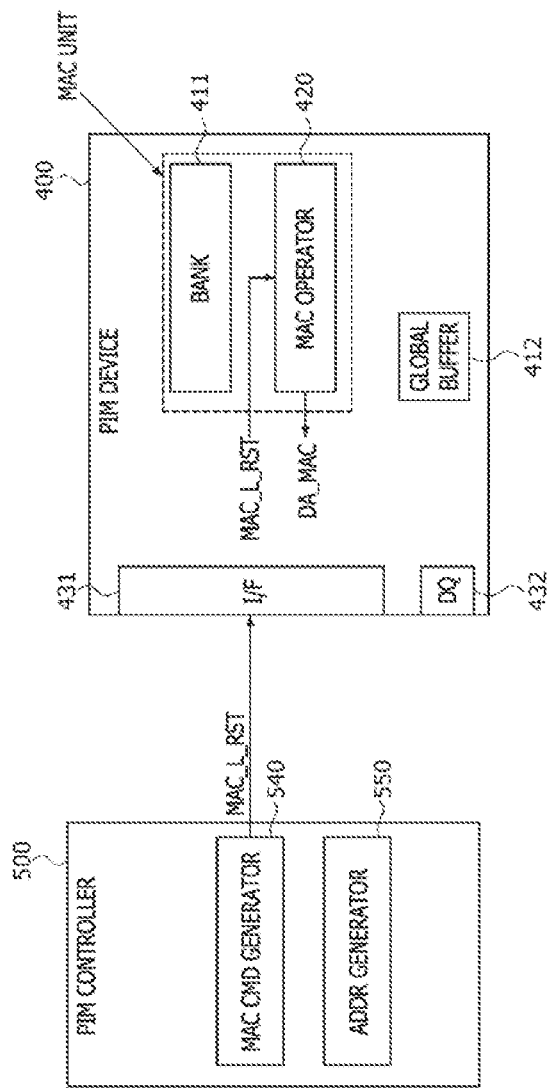

At a step 368, the MAC command generator 540 of the PIM controller 500 may generate and transmit the MAC latch reset signal MAC_L_RST to the PIM device 400, as illustrated in FIG. 26. The MAC latch reset signal MAC_L_RST may control an output operation of the MAC result data MAC0.0 generated by the MAC operator 420 and a reset operation of the output latch 123-1 included in the MAC operator 420. As described with reference to FIG. 4, the transfer gate 123-2 receiving the MAC result data MAC0.0 from the output latch 123-1 of the MAC operator 420 may be synchronized with the MAC latch reset signal MAC_L_RST to output the MAC result data MAC0.0. In an embodiment, the MAC result data MAC0.0 outputted from the MAC operator 420 may be stored into the memory bank 411 through the BIO line in the PIM device 400.

At a step 369, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 369. At a step 370, whether the row number changed at the step 369 is greater than the row number of the last row (i.e., the eighth row) of the weight matrix may be determined. Because the row number of the weight matrix is changed to '2' at the step 370, a process of the MAC arithmetic operation may be fed back to the step 364.

If the process of the MAC arithmetic operation is fed back to the step 364 from the step 370, the same processes as described with reference to the steps 364 to 370 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 364 from the step 370, the processes from the step 364 to the step 370 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 369, the MAC arithmetic operation may terminate because the row number of '9' is greater than the last row number of '8' at the step 370.

Figure 27:
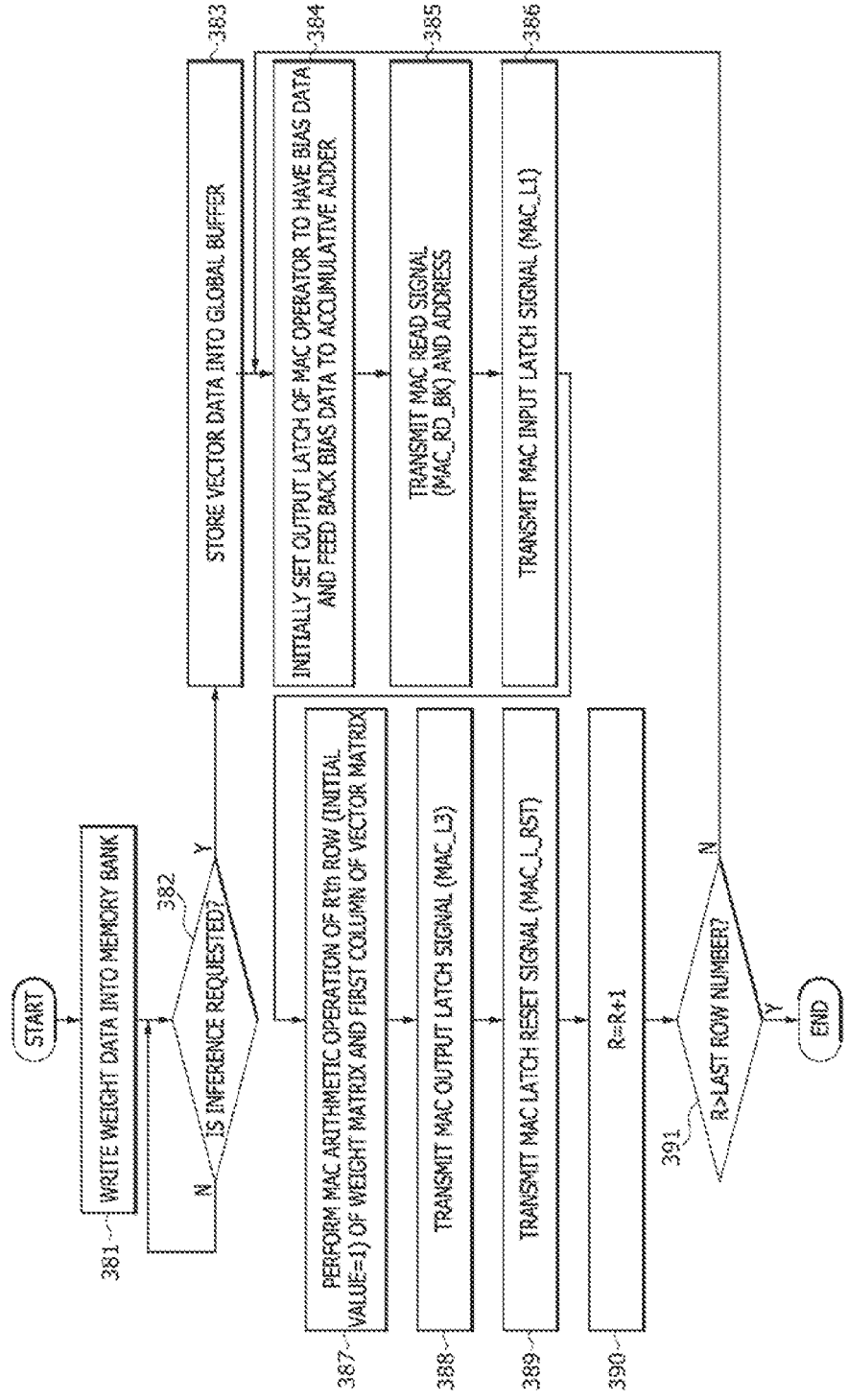
FIG. 27 is a flowchart illustrating processes of the MAC arithmetic operation illustrated in FIG. 14 in a PIM system according to a second embodiment of the present disclosure.

FIG. 27 is a flowchart illustrating processes of the MAC arithmetic operation described with reference to FIG. 14, which are performed in the PIM system 1-2 according to the second embodiment of the present disclosure. In order to perform the MAC arithmetic operation according to the present embodiment, the MAC operator 420 of the PIM device 400 may have the same configuration as the MAC operator 120-1 illustrated in FIG. 16. Referring to FIGS. 20 and 27, the first data (i.e., the weight data) may be written into the memory bank 411 at a step 381 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 14.

At a step 382, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 14. If the inference request signal is transmitted to the PIM controller 500 at the step 382, then the PIM controller 500 may write the vector data transmitted with the inference request signal into the global buffer 412 at a step 383. Accordingly, the vector data may be stored in the global buffer 412 of the PIM device 400.

At a step 384, an output latch of a MAC operator 420 may be initially set to have bias data and the initially set bias data may be fed back to an accumulative adder of the MAC operator 420. This process is executed to perform the matrix adding calculation of the MAC result matrix and the bias matrix, which is described with reference to FIG. 14. That is, as illustrated in FIG. 16, the output latch 123-1 of the data output circuit 123-A included in the MAC operator 420 may be initially set to have the bias data of the bias matrix.

Because the matrix multiplying calculation is executed for the first row of the weight matrix, the element B0.0 located at first row of the bias matrix may be initially set as the bias data in the output latch 123-1. The output latch 123-1 may output the bias data B0.0, and the bias data B0.0 outputted from the output latch 123-1 may be inputted to the accumulative adder 122-21D of the addition logic circuit 122-2 included in the MAC operator 420.

In an embodiment, in order to output the bias data B0.0 out of the output latch 123-1 and to feed back the bias data B0.0 to the accumulative adder 122-21D, the MAC command generator 540 of the PIM controller 500 may transmit the MAC output latch signal MAC_L3 to the MAC operator 420 of the PIM device 400. When a subsequent MAC arithmetic operation is performed, the accumulative adder 122-21D of the MAC operator 420 may add the MAC result data MAC0.0 outputted from the adder 122-21C disposed at the last stage to the bias data B0.0 which is fed back from the output latch 123-1 to generate the biased result data Y0.0 and may output the biased result data Y0.0 to the output latch 123-1. The biased result data Y0.0 may be outputted from the output latch 123-1 in synchronization with the MAC output latch signal MAC_L3 transmitted in a subsequent process.

At a step 385, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK outputted from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

At a step 386, the MAC command generator 540 of the PIM controller 500 may generate and transmit the MAC input latch signal MAC_1 to the PIM device 400, as illustrated in FIG. 24. The MAC input latch signal MAC_1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be inputted to the first to eighth multipliers 122-11, respectively, and the elements X0.0, . . . , and X7.0 in the first column of the vector matrix may also be inputted to the first to eighth multipliers 122-11, respectively.

At a step 387, the MAC circuit 122 of the MAC operator 420 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data of the multipliers 122-11 and may perform the adding calculation of the output data of the multipliers 122-11 to output the result data of the adding calculation to the accumulative adder 122-21D. The output data of the adder 122-21C included in the addition logic circuit 122-2 may correspond to result data (i.e., MAC result data) of the MAC arithmetic operation of the first row included in the weight matrix and the column included in the vector matrix. The accumulative adder 122-21D may add the output data MAC0.0 of the adder 122-21C to the bias data B0.0 fed back from the output latch 123-1 and may output the result data of the adding calculation. The output data (i.e., the biased result data Y0.0) of the accumulative adder 122-21D may be inputted to the output latch 123-1 disposed in the data output circuit 123-A of the MAC operator 420.

At a step 388, the MAC command generator 540 of the PIM controller 500 may generate and transmit the MAC output latch signal MAC_L3 to the PIM device 400, as described with reference to FIG. 25. The MAC output latch signal MAC_L3 may control the output latch operation for the output latch 123-1 of the MAC operator 420 included in the PIM device 400. The output latch 123-1 of the MAC operator 420 may output the biased result data Y0.0 according to the output latch operation performed in synchronization with the MAC output latch signal MAC_L3. The biased result data Y0.0 outputted from the output latch 123-1 may be inputted to the transfer gate 123-2 of the data output circuit 123-A.

At a step 389, the MAC command generator 540 of the PIM controller 500 may generate and transmit the MAC latch reset signal MAC_L_RST to the PIM device 400, as illustrated in FIG. 26. The MAC latch reset signal MAC_L_RST may control an output operation of the biased result data Y0.0 generated by the MAC operator 420 and a reset operation of the output latch 123-1 included in the MAC operator 420. The transfer gate 123-2 receiving the biased result data Y0.0 from the output latch 123-1 of the MAC operator 420 may be synchronized with the MAC latch reset signal MAC_L_RST to output the biased result data Y0.0. In an embodiment, the biased result data Y0.0 outputted from the MAC operator 120 may be stored into the memory bank 411 through the BIO line in the PIM device 400.

At a step 390, the row number 'R' of the weight matrix for which the MAC arithmetic operation is performed may be increased by '1'. Because the MAC arithmetic operation for the first row among the first to eight rows of the weight matrix has been performed at the previous steps, the row number of the weight matrix may change from '1' to '2' at the step 390. At a step 391, whether the row number changed at the step 390 is greater than the row number of the last row (i.e., the eighth row) of the weight matrix may be determined. Because the row number of the weight matrix is changed to '2' at the step 390, a process of the MAC arithmetic operation may be fed back to the step 384.

If the process of the MAC arithmetic operation is fed back to the step 384 at the step 391, the same processes as described with reference to the steps 384 to 391 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 384 at the step 391, then the processes from the step 384 to the step 390 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 390, then the MAC arithmetic operation may terminate because the row number of '9' is greater than the last row number of '8' at the step 391.

Figure 28:
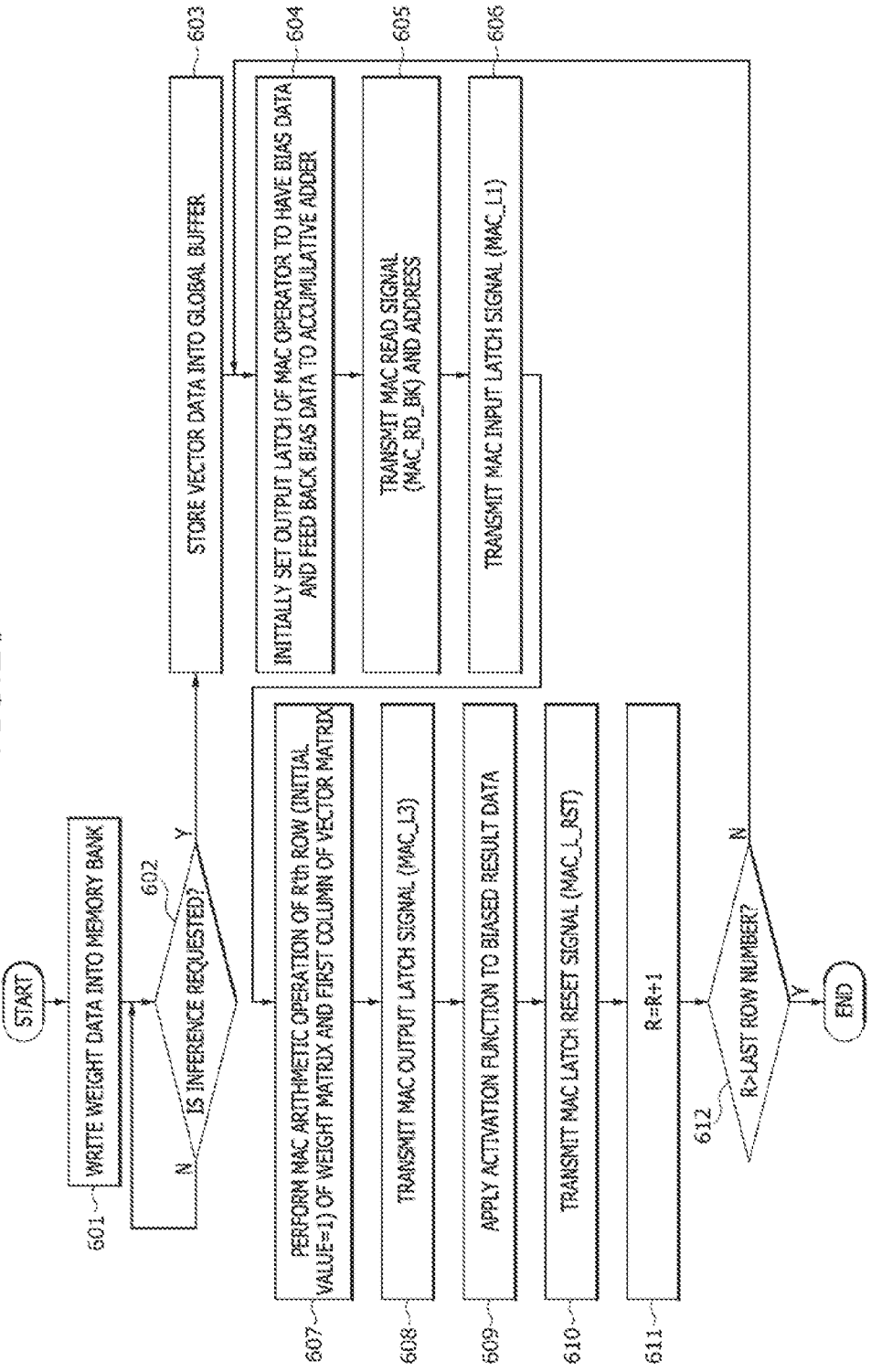
FIG. 28 is a flowchart illustrating processes of the MAC arithmetic operation illustrated in FIG. 17 in a PIM system according to a second embodiment of the present disclosure.

FIG. 28 is a flowchart illustrating processes of the MAC arithmetic operation described with reference to FIG. 17, which are performed in the PIM system 1-2 according to the second embodiment of the present disclosure. In order to perform the MAC arithmetic operation according to the present embodiment, the MAC operator 420 of the PIM device 400 may have the same configuration as the MAC operator 120-2 illustrated in FIG. 19. Referring to FIGS. 19 and 28, the first data (i.e., the weight data) may be written into the memory bank 411 at a step 601 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 17.

At a step 602, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 17. If the inference request signal is transmitted to the PIM controller 500 at the step 602, then the PIM controller 500 may write the vector data transmitted with the inference request signal into the global buffer 412 at a step 603. Accordingly, the vector data may be stored in the global buffer 412 of the PIM device 400.

At a step 604, an output latch of a MAC operator 420 may be initially set to have bias data and the initially set bias data may be fed back to an accumulative adder of the MAC operator 420. This process is executed to perform the matrix adding calculation of the MAC result matrix and the bias matrix, which is described with reference to FIG. 17. That is, as described with reference to FIG. 19, the output latch 123-1 of the data output circuit 123-B included in the MAC operator 420 may be initially set to have the bias data of the bias matrix. Because the matrix multiplying calculation is executed for the first row of the weight matrix, the element B0.0 located at first row of the bias matrix may be initially set as the bias data in the output latch 123-1. The output latch 123-1 may output the bias data B0.0, and the bias data B0.0 outputted from the output latch 123-1 may be inputted to the accumulative adder 122-21D of the addition logic circuit 122-2 included in the MAC operator 420.

In an embodiment, in order to output the bias data B0.0 out of the output latch 123-1 and to feed back the bias data B0.0 to the accumulative adder 122-21D, the MAC command generator 540 of the PIM controller 500 may transmit the MAC output latch signal MAC_L3 to the MAC operator 420 of the PIM device 400. When a subsequent MAC arithmetic operation is performed, the accumulative adder 122-21D of the MAC operator 420 may add the MAC result data MAC0.0 outputted from the adder 122-21C disposed at the last stage of the addition logic circuit 122-2 to the bias data B0.0 which is fed back from the output latch 123-1 to generate the biased result data Y0.0 and may output the biased result data Y0.0 to the output latch 123-1. The biased result data Y0.0 may be outputted from the output latch 123-1 in synchronization with the MAC output latch signal MAC_L3 transmitted in a subsequent process.

At a step 605, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK outputted from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

At a step 606, the MAC command generator 540 of the PIM controller 500 may generate and transmit the MAC input latch signal MAC_L1 to the PIM device 400, as described with reference to FIG. 24. The MAC input latch signal MAC_1 may control the input latch operation of the weight data and the vector data for the MAC operator 420 of the PIM device 400. The elements W0.0, ..., and W0.7 in the first row of the weight matrix and the elements X0.0, ..., and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, ..., and W0.7 in the first row of the weight matrix may be inputted to the first to eighth multipliers 122-11, respectively, and the elements X0.0, ..., and X7.0 in the first column of the vector matrix may also be inputted to the first to eighth multipliers 122-11, respectively.

At a step 607, the MAC circuit 122 of the MAC operator 420 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data of the multipliers 122-11 and may perform the adding calculation of the output data of the multipliers 122-11 to output the result data of the adding calculation to the accumulative adder 122-21D. The output data of the adder 122-21C included in the addition logic circuit 122-2 may correspond to result data (i.e., the MAC result data MAC0.0) of the MAC arithmetic operation of the first row included in the weight matrix and the column included in the vector matrix. The accumulative adder 122-21D may add the output data MAC0.0 of the adder 122-21C to the bias data B0.0 fed back from the output latch 123-1 and may output the result data of the adding calculation. The output data (i.e., the biased result data Y0.0) of the accumulative adder 122-21D may be inputted to the output latch 123-1 disposed in the data output circuit 123-A of the MAC operator 420.

At a step 608, the MAC command generator 540 of the PIM controller 500 may generate and transmit the MAC output latch signal MAC_L3 to the PIM device 400, as described with reference to FIG. 25. The MAC output latch signal MAC_L3 may control the output latch operation for the output latch 123-1 of the MAC operator 420 included in the PIM device 400. The output latch 123-1 of the MAC operator 420 may output the biased result data Y0.0 according to the output latch operation performed in synchronization with the MAC output latch signal MAC_L3. The biased result data Y0.0 outputted from the output latch 123-1 may be inputted to the activation function logic circuit 123-5, which is illustrated in FIG. 19. At a step 610, the activation function logic circuit 123-5 may apply an activation function to the biased result data Y0.0 to generate a final output value, and the final output value may be inputted to the transfer gate (123-2 of FIG. 4).

At a step 610, the MAC command generator 540 of the PIM controller 500 may generate and transmit the MAC latch reset signal MAC_L_RST to the PIM device 400, as described with reference to FIG. 26. The MAC latch reset signal MAC_L_RST may control an output operation of the final output value generated by the MAC operator 420 and a reset operation of the output latch 123-1 included in the MAC operator 420. The transfer gate 123-2 receiving the final output value from the activation function logic circuit 123-5 of the data output circuit 123-B included in the MAC operator 420 may be synchronized with the MAC latch reset signal MAC_L_RST to output the final output value. In an embodiment, the final output value outputted from the MAC operator 420 may be stored into the memory bank 411 through the BIO line in the PIM device 400.

At a step 611, the row number 'R' of the weight matrix for which the MAC arithmetic operation is performed may be increased by '1'. Because the MAC arithmetic operation for the first row among the first to eight rows of the weight matrix has been performed at the previous steps, the row number of the weight matrix may change from '1' to '2' at the step 611. At a step 612, whether the row number changed at the step 611 is greater than the row number of the last row (i.e., the eighth row) of the weight matrix may be determined. Because the row number of the weight matrix is changed to '2' at the step 611, a process of the MAC arithmetic operation may be fed back to the step 604.

If the process of the MAC arithmetic operation is fed back to the step 604 from the step 612, the same processes as described with reference to the steps 604 to 612 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix to generate the MAC result data (corresponding to the element MAC1.0 located in the second row of the MAC result matrix) and the bias data (corresponding to the element B1.0 located in the second row of the bias matrix). If the process of the MAC arithmetic operation is fed back to the step 604 from the step 612, the processes from the step 604 to the step 612 may be iteratively performed until the MAC arithmetic operation is performed for all of the rows (i.e., first to eighth rows) of the weight matrix with the vector matrix. If the MAC arithmetic operation for the eighth row of the weight matrix terminates and the row number of the weight matrix changes from '8' to '9' at the step 611, the MAC arithmetic operation may terminate because the row number of '9' is greater than the last row number of '8' at the step 612.

Figure 29:
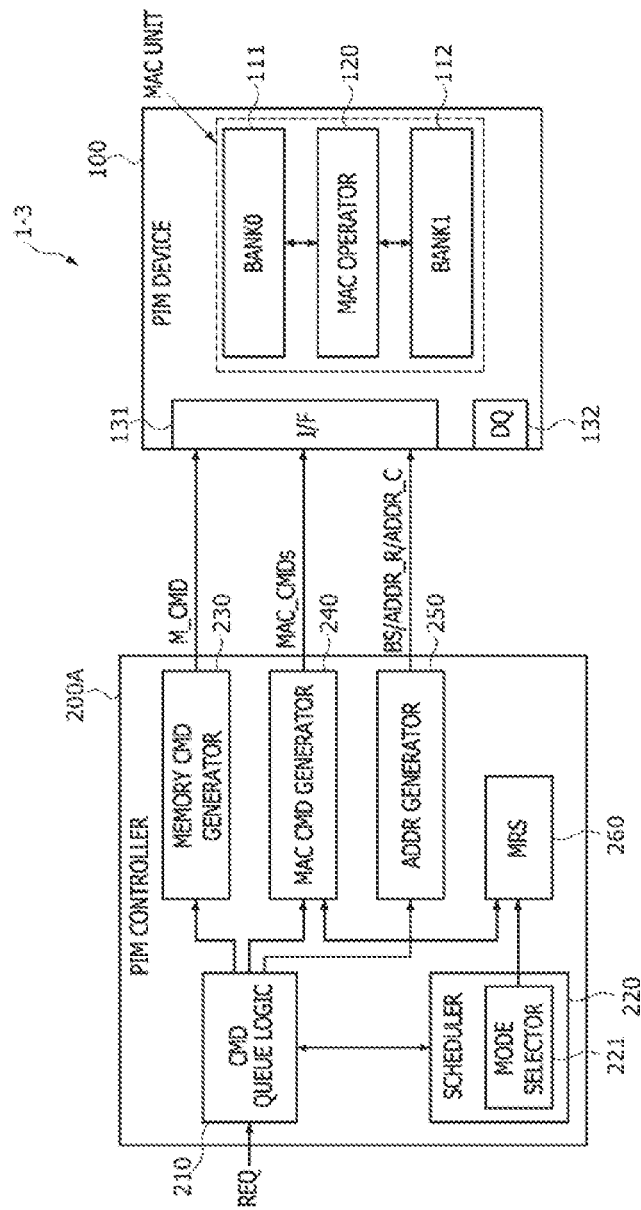
FIG. 29 is a block diagram illustrating a PIM system according to yet another embodiment of the present disclosure.

FIG. 29 is a block diagram illustrating a PIM system 1-3 according to a third embodiment of the present disclosure. As illustrated in FIG. 29, the PIM system 1-3 may have substantially the same configuration as the PIM system 1-1 illustrated in FIG. 2 except that a PIM controller 200A of the PIM system 1-3 further includes a mode register set (MRS) 260 as compared with the PIM controller 200 of the PIM system 1-1. Thus, the same explanation as described with reference to FIG. 2 will be omitted hereinafter. The mode register set 260 in the PIM controller 200A may receive an MRS signal instructing arrangement of various signals necessary for the MAC arithmetic operation of the PIM system 1-3. In an embodiment, the mode register set 260 may receive the MRS signal from the mode selector 221 included in the scheduler 220. However, in another embodiment, the MRS signal may be provided by an extra logic circuit other than the mode selector 221. The mode register set 260 receiving the MRS signal may transmit the MRS signal to the MAC command generator 240. For an embodiment, the MRS 260 represents a MRS circuit.

In an embodiment, the MRS signal may include timing information on when the MAC commands MAC_CMDs are generated. In such a case, the deterministic operation of the PIM system 1-3 may be performed by the MRS signal provided by the MRS 260. In another embodiment, the MRS signal may include information on the timing related to an interval between the MAC modes or information on a mode change between the MAC mode and the memory mode. In an embodiment, generation of the MRS signal in the MRS 260 may be executed before the vector data are stored in the second memory bank 112 of the PIM device 100 by the inference request signal transmitted from an external device to the PIM controller 200A. Alternatively, the generation of the MRS signal in the MRS 260 may be executed after the vector data are stored in the second memory bank 112 of the PIM device 100 by the inference request signal transmitted from an external device to the PIM controller 200A.

Figure 30:
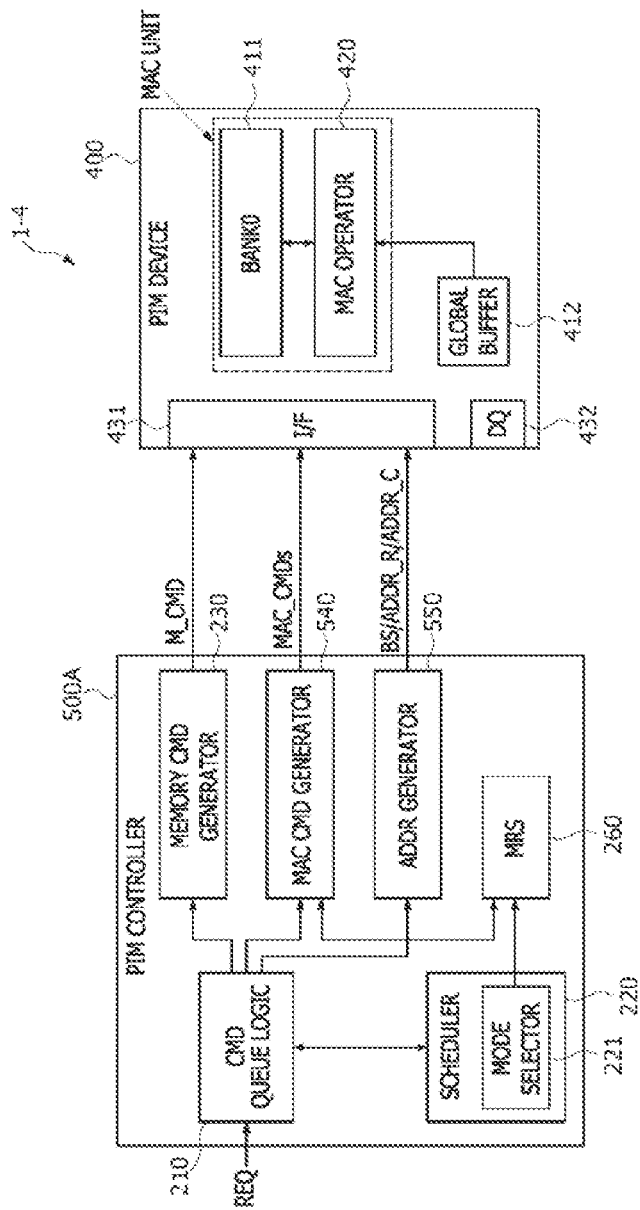
FIG. 30 is a block diagram illustrating a PIM system according to still another embodiment of the present disclosure.

FIG. 30 is a block diagram illustrating a PIM system 1-4 according to a fourth embodiment of the present disclosure. As illustrated in FIG. 30, the PIM system 1-4 may have substantially the same configuration as the PIM system 1-2 illustrated in FIG. 20 except that a PIM controller 500A of the PIM system 1-4 further includes the mode register set (MRS) 260 as compared with the PIM controller 500 of the PIM system 1-2. Thus, the same explanation as described with reference to FIG. 20 will be omitted hereinafter. The mode register set 260 in the PIM controller 500A may receive an MRS signal instructing arrangement of various signals necessary for the MAC arithmetic operation of the PIM system 1-4. In an embodiment, the mode register set 260 may receive the MRS signal from the mode selector 221 included in the scheduler 220. However, in another embodiment, the MRS signal may be provided by an extra logic circuit other than the mode selector 221. The mode register set 260 receiving the MRS signal may transmit the MRS signal to the MAC command generator 540.

In an embodiment, the MRS signal may include timing information on when the MAC commands MAC_CMDs are generated. In such a case, the deterministic operation of the PIM system 1-4 may be performed by the MRS signal provided by the MRS 260. In another embodiment, the MRS signal may include information on the timing related to an interval between the MAC modes or information on a mode change between the MAC mode and the memory mode. In an embodiment, generation of the MRS signal in the MRS 260 may be executed before the vector data are stored in the global buffer 412 of the PIM device 400 by the inference request signal transmitted from an external device to the PIM controller 500A. Alternatively, the generation of the MRS signal in the MRS 260 may be executed after the vector data are stored in the global buffer 412 of the PIM device 400 by the inference request signal transmitted from an external device to the PIM controller 500A.

Figure 31:
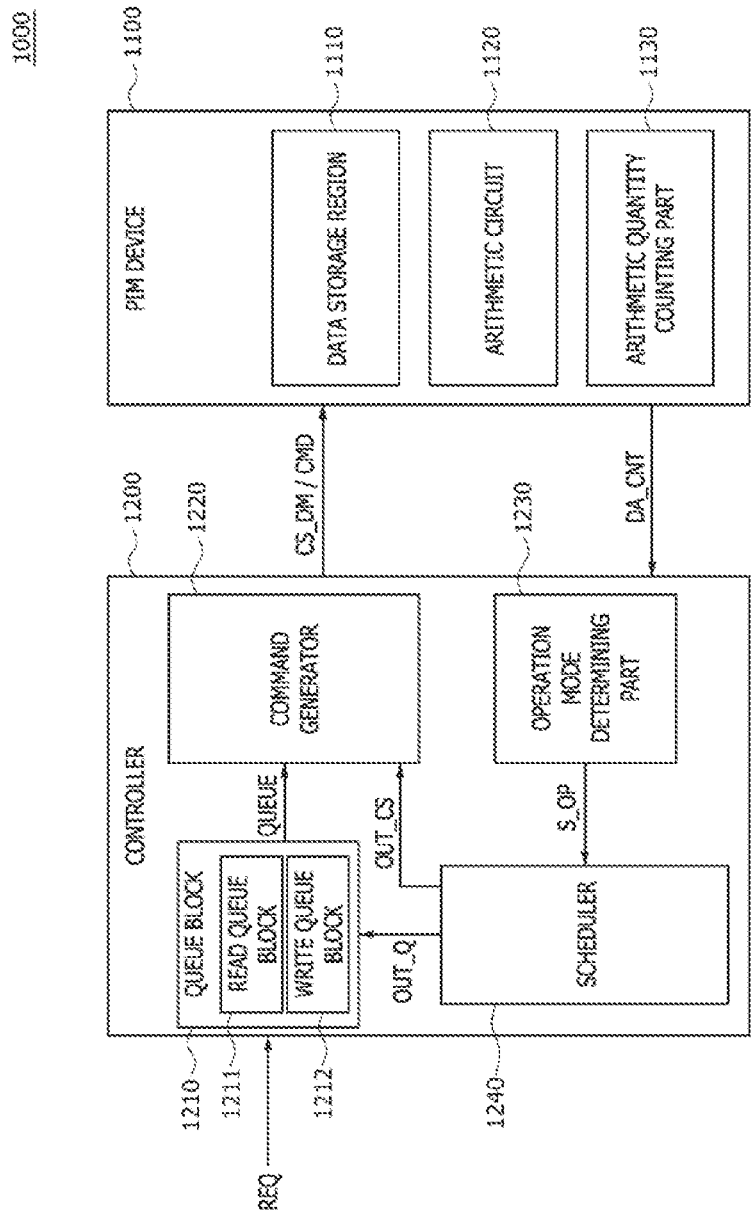
FIG. 31 is a block diagram illustrating a PIM system according to an embodiment of the present disclosure.

FIG. 31 is a block diagram illustrating a PIM system 1000 according to an embodiment of the present disclosure. Referring to FIG. 31, the PIM system 1000 may include a PIM device 1100 and a controller 1200 controlling operations of the PIM device 1100. The PIM device 1100 may be configured to have a memory function and an arithmetic function. The PIM device 1100 may include a data storage region 1110 having the memory function, an arithmetic circuit 1120 having the arithmetic function, and an arithmetic quantity counting part 1130. The data storage region 1110 may perform a memory access operation (also referred to as a 'memory operation') such as a data write operation or a data read operation in response to a command CMD outputted from the controller 1200. The data storage region 1110 may transmit arithmetic data to the arithmetic circuit 1120 for execution of an arithmetic operation of the PIM device 1100. The arithmetic circuit 1120 may perform the arithmetic operation that executes an arithmetic calculation for the arithmetic data outputted from the data storage region 1110 to generate arithmetic result data. In an embodiment, the arithmetic circuit 1120 may be a MAC circuit performing a multiplying calculation and an accumulating calculation. The arithmetic quantity counting part 1130 may count an arithmetic quantity of the arithmetic circuit 1120 to generate arithmetic quantity data DA_CNT. The arithmetic quantity counting part 1130 may store the arithmetic quantity data DA_CNT into the data storage region 1110 in response to an arithmetic quantity data move signal CS_DM outputted from the controller 1200. The arithmetic quantity data DA_CNT stored in the data storage region 1110 may be transmitted to the controller 1200 by the command CMD (e.g., a read command) outputted from the controller 1200.

The controller 1200 may transmit the arithmetic quantity data move signal CS_DM and the command CMD to the PIM device 1100. When the arithmetic quantity data move signal CS_DM is transmitted to the PIM device 1100, the PIM device 1100 may store the arithmetic quantity data DA_CNT generated by the arithmetic quantity counting part 1130 into the data storage region 1110 of the PIM device 1100. The command CMD outputted from the controller 1200 may include a write command, a read command, and an arithmetic command. When the write command is transmitted to the PIM device 1100, the PIM device 1100 may store write data outputted from the controller 1200 into the data storage region 1110. When the read command is transmitted to the PIM device 1100, the PIM device 1100 may read out read data stored in the data storage region 1110 and may output the read data. The read data outputted from the PIM device 1100 based on the read command may include the arithmetic quantity data DA_CNT stored in the data storage region 1110. When the arithmetic command is transmitted to the PIM device 1100, the PIM device 1100 may transmit the arithmetic data from the data storage region 1110 to the arithmetic circuit 1120 and may control the arithmetic circuit 1120 such that the arithmetic circuit 1120 performs the arithmetic operation for the arithmetic data to generate and output the arithmetic result data.

The controller 1200 may include a queue block 1210, a command generator 1220, an operation mode determining part 1230, and a scheduler 1240. The queue block 1210 may receive a request REQ from a host to store a queue corresponding to the request REQ. The queue block 1210 may output the queue in response to a queue output signal OUT_Q outputted from the scheduler 1240. The queue block 1210 may include a read queue block 1211 and a write queue block 1212. The read queue block 1211 may receive a read request from the host to store a read queue corresponding to the read request. The read queue block 1211 may also receive an arithmetic request from the host to store an arithmetic queue corresponding to the arithmetic request.

The write queue block 1212 may receive a write request from the host to store a write queue corresponding to the write request.

The command generator 1220 may generate and output the command CMD corresponding to the queue outputted from the queue block 1210. In an embodiment, when the read queue is transmitted from the read queue block 1211 of the queue block 1210 to the command generator 1220, the command generator 1220 may generate and output the read command to the PIM device 1100. In an embodiment, when the arithmetic queue is transmitted from the read queue block 1211 of the queue block 1210 to the command generator 1220, the command generator 1220 may generate and output the arithmetic command to the PIM device 1100. In an embodiment, when the write queue is transmitted from the write queue block 1212 of the queue block 1210 to the command generator 1220, the command generator 1220 may generate and output the write command to the PIM device 1100. The command generator 1220 may generate the arithmetic quantity data move signal CS_DM in response to an arithmetic quantity data request signal OUT_CS outputted from the scheduler 1240.

The operation mode determining part 1230 may receive the arithmetic quantity data DA_CNT from the PIM device 1100 to generate and output a control mode signal S_OP for determining a control mode of the controller 1200. The control mode signal S_OP outputted from the operation mode determining part 1230 may be inputted to the scheduler 1240. The operation mode determining part 1230 may detect a temperature of the PIM device 1100 based on the arithmetic quantity data DA_CNT and may compare a binary number corresponding to the detected temperature with a binary number corresponding to a predetermined temperature to generate a normal control mode signal or a slow control mode signal according to the comparison result. In an embodiment, when the binary number corresponding to the detected temperature is less than the binary number corresponding to the predetermined temperature (i.e., the temperature of the PIM device 1100 detected by using the arithmetic quantity data DA_CNT is lower than the predetermined temperature), the operation mode determining part 1230 may output the normal control mode signal as the control mode signal S_OP. In contrast, when the binary number corresponding to the detected temperature is equal to or greater than the binary number corresponding to the predetermined temperature (i.e., the temperature of the PIM device 1100 detected by using the arithmetic quantity data DA_CNT is the same as or higher than the predetermined temperature), the operation mode determining part 1230 may output the slow control mode signal as the control mode signal S_OP.

The scheduler 1240 may control or adjust a sequence of overall control operations performed in the controller 1200. In an embodiment, the scheduler 1240 may transmit the queue output signal OUT_Q to the queue block 1210. The read queue block 1211 of the queue block 1210 may transmit the read queue or the arithmetic queue to the command generator 1220 in response to the queue output signal OUT_Q outputted from the scheduler 1240. Thus, a time interval between the queues outputted from the queue block 1210 may depend on a time interval between the queue output signals OUT_Q generated by the scheduler 1240. An output sequence of the read queue and the arithmetic queue stored in the read queue block 1211 may be determined by the queue output signals OUT_Q. The write queue block 1212 of the queue block 1210 may also transmit the write queue to the command generator 1220 in response to the queue output signal OUT_Q outputted from the scheduler 1240. An output sequence of the write queues stored in the write queue block 1212 may also be determined by the queue output signals OUT_Q.

The scheduler 1240 may vary a time interval between the queue output signals OUT_Q outputted from the scheduler 1240 according to the operation mode of the PIM device 1100. In an embodiment, the scheduler 1240 may generate the queue output signals OUT_Q at a first time interval in a normal control mode, and the scheduler 1240 may generate the queue output signals OUT_Q at a second time interval in a slow control mode. The second time interval may be set to be longer than the first time interval. While the scheduler 1240 transmits the queue output signals OUT_Q to the queue block 1210 at the first time interval in the normal control mode, the queues outputted from the queue block 1210 may be transmitted to the command generator 1220 at the first time interval and the commands CMD outputted from the command generator 1220 may also be transmitted to the PIM device 1100 at the first time interval. While the scheduler 1240 transmits the queue output signals OUT_Q to the queue block 1210 at the second time interval in the slow control mode, the queues outputted from the queue block 1210 may be transmitted to the command generator 1220 at the second time interval and the commands CMD outputted from the command generator 1220 may also be transmitted to the PIM device 1100 at the second time interval. Thus, a time interval between operations of the PIM device 1100 performed by the commands CMD in the slow control mode may be longer than a time interval between operations of the PIM device 1100 performed by the commands CMD in the normal control mode.

Whether the scheduler 1240 operates in the normal control mode or the slow control mode may be determined by the control mode signal S_OP outputted from the operation mode determining part 1230. When the control mode signal S_OP transmitted from the operation mode determining part 1230 to the scheduler 1240 corresponds to the normal control mode signal, the scheduler 1240 may control the queue block 1210 such that the queue block 1210 outputs the queues at the first time interval according to the normal control mode. When the control mode signal S_OP transmitted from the operation mode determining part 1230 to the scheduler 1240 corresponds to the slow control mode signal, the scheduler 1240 may control the queue block 1210 such that the queue block 1210 outputs the queues at the second time interval according to the slow control mode.

The scheduler 1240 may generate the arithmetic quantity data request signal OUT_CS and may transmit the arithmetic quantity data request signal OUT_CS to the command generator 1220. The arithmetic quantity data request signal OUT_CS is generated by the scheduler 1240 in advance of receiving the arithmetic quantity data DA_CNT. That is, it may be necessary for the scheduler 1240 to generate the arithmetic quantity data request signal OUT_CS before the arithmetic quantity data DA_CNT is transmitted from the PIM device 1100 to the controller 1200. The command generator 1220 may transmit the arithmetic quantity data move signal CS_DM to the PIM device 1100 in response to the arithmetic quantity data request signal OUT_CS outputted from the scheduler 1240. The PIM device 1100 may store the arithmetic quantity data DA_CNT outputted from the arithmetic quantity counting part 1130 into the data storage region 1110 in response to the arithmetic quantity data move signal CS_DM. The arithmetic quantity data DA_CNT stored in the data storage region 1110 may be transmitted to the operation mode determining part 1230 of the controller 1200 by the read command outputted from the controller 1200.

Figure 32:
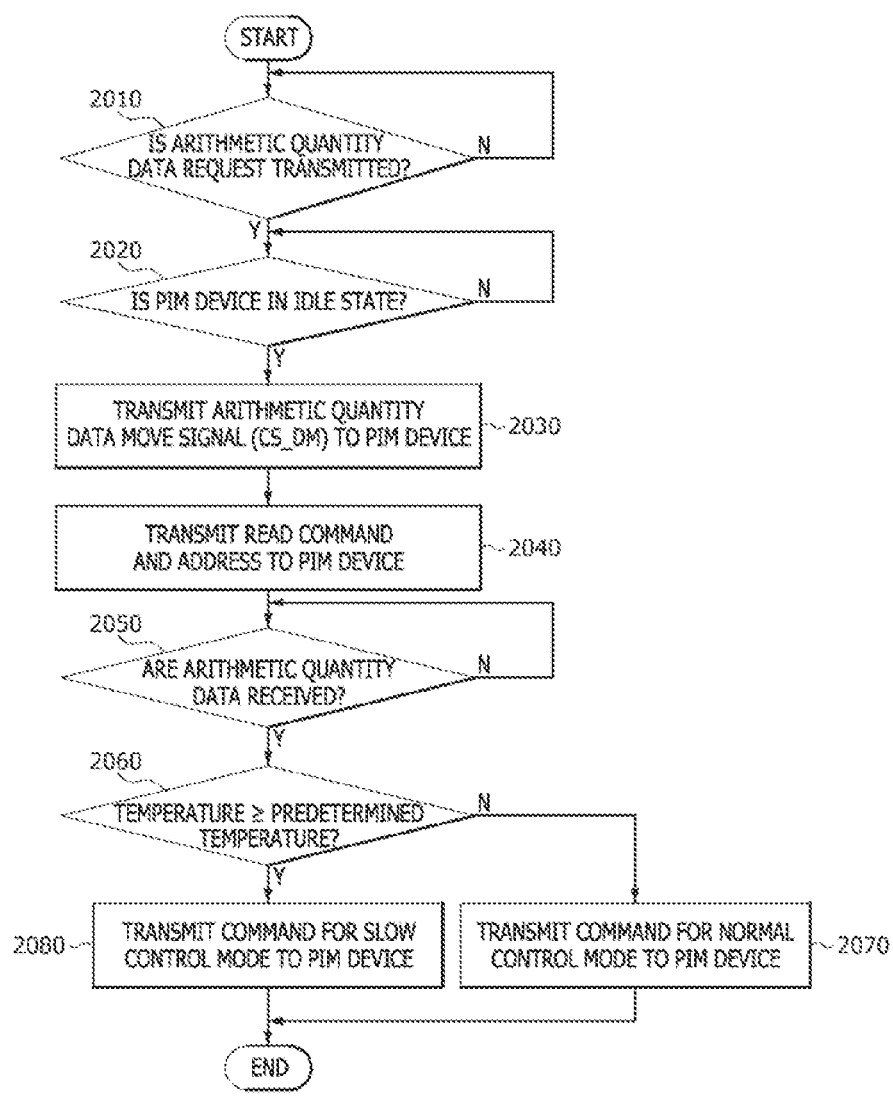
FIG. 32 is a flowchart illustrating a control operation of a controller included in the PIM system illustrated in FIG. 31.

FIG. 32 is a flowchart illustrating a control operation of the controller 1200 included in the PIM system 1000 illustrated in FIG. 31. Referring to FIGS. 31 and 32, the controller 1200 may determine whether an arithmetic quantity data request is transmitted from the host to the controller 1200 (see step 2010). When the arithmetic quantity data request is not transmitted to the controller 1200 at the step 2010, the controller 1200 may continuously check whether the arithmetic quantity data request is transmitted to the controller 1200 while the PIM device 1100 operates in a current control mode. When the arithmetic quantity data request is transmitted to the controller 1200 at the step 2010, the controller 1200 may determine whether the PIM device 1100 is in an idle state (see step 2020). When the PIM device 1100 is not in the idle state at the step 2020, the controller 1200 may maintain a standby state until a current operation of the PIM device 1100 terminates such that the PIM device 1100 is in the idle state.

When the current operation of the PIM device 1100 terminates and the PIM device 1100 is in the idle state, the controller 1200 may transmit the arithmetic quantity data move signal CS_DM to the PIM device 1100 (see step 2030). Specifically, the scheduler 1240 may transmit the arithmetic quantity data request signal OUT_CS to the command generator 1220, and the command generator 1220 may transmit the arithmetic quantity data move signal CS_DM to the PIM device 1100. As described with reference to FIG. 31, when the arithmetic quantity data move signal CS_DM is transmitted from the controller 1200 to the PIM device 1100, the PIM device 1100 may transmit the arithmetic quantity data DA_CNT from the arithmetic quantity counting part 1130 to the data storage region 1110. The controller 1200 may transmit the read command and the address to the PIM device 1100 (see step 2040). In such a case, the address transmitted from the controller 1200 to PIM device 1100 may be an address indicating a position at which the arithmetic quantity data DA_CNT are stored in the data storage region 1110.

At a step 2050, the controller 1200 may determine whether the arithmetic quantity data DA_CNT are inputted to the controller 1200. When the arithmetic quantity data DA_CNT are not inputted to the controller 1200 at the step 2050, the controller 1200 may maintain a standby state until the arithmetic quantity data DA_CNT are inputted to the controller 1200. When the arithmetic quantity data DA_CNT are inputted to the controller 1200 at the step 2050, the controller 1200 may determine whether the temperature of the PIM device 1100 is lower than the predetermined temperature (see step 2060). When the temperature of the PIM device 1100 is lower than the predetermined temperature at the step 2060, the controller 1200 may transmit the command CMD for the normal control mode to the PIM device 1100 (see step 2070). In such a case, as described with reference to FIG. 31, the operation mode determining part 1230 may transmit the control mode signal S_OP corresponding to the normal control mode signal to the scheduler 1240. The scheduler 1240 may transmit the queue output signals OUT_Q to the queue block 1210 at the first time interval (i.e., at a relatively short time interval) according to the normal control mode signal. Thus, the queues may be outputted from the queue block 1210 at the first time interval, and the commands CMD may also be outputted from the command generator 1220 at the first time interval.

When the temperature of the PIM device 1100 is the same as or higher than the predetermined temperature at the step 2060, the controller 1200 may transmit the command CMD for the slow control mode to the PIM device 1100 (see step 2080). In such a case, as described with reference to FIG. 31, the operation mode determining part 1230 may transmit the control mode signal S_OP corresponding to the slow control mode signal to the scheduler 1240. The scheduler 1240 may transmit the queue output signals OUT_Q to the queue block 1210 at the second time interval (i.e., at a relatively long time interval) according to the slow control mode signal. Thus, the queues may be outputted from the queue block 1210 at the second time interval, and the commands CMD may also be outputted from the command generator 1220 at the second time interval.

Figure 33:
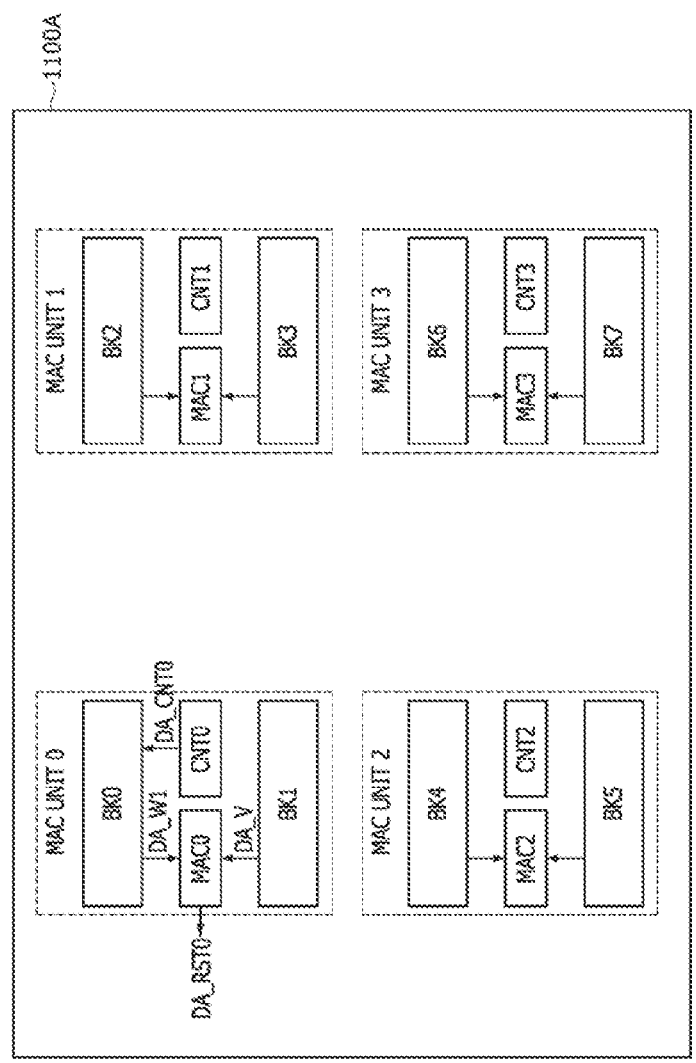
FIG. 33 is a block diagram illustrating an example of a PIM device included in the PIM system illustrated in FIG. 31.

FIG. 33 is a block diagram illustrating a PIM device 1100A corresponding to an example of the PIM device 1100 included in the PIM system 1000 illustrated in FIG. 31. Referring to FIG. 33, the PIM device 1100A may include a plurality of arithmetic units, for example, first to fourth arithmetic units MAC UNIT 0-MAC UNIT 3. Each of the first to fourth arithmetic units MAC UNIT 0-MAC UNIT 3 may include at least two memory banks BKs, one arithmetic operator MAC, and one arithmetic quantity counter CNT. For example, the first arithmetic unit MAC UNIT 0 may include a first memory bank BK0, a second memory bank BK1, a first arithmetic operator MAC0, and a first arithmetic quantity counter CNT0, and the second arithmetic unit MAC UNIT 1 may include a third memory bank BK2, a fourth memory bank BK3, a second arithmetic operator MAC1, and a second arithmetic quantity counter CNT1. Similarly, the third arithmetic unit MAC UNIT 2 may include a fifth memory bank BK4, a sixth memory bank BK5, a third arithmetic operator MAC2, and a third arithmetic quantity counter CNT2, and the fourth arithmetic unit MAC UNIT 3 may include a seventh memory bank BK6, an eighth memory bank BK7, a fourth arithmetic operator MAC3, and a fourth arithmetic quantity counter CNT3.

The first to eighth memory banks BK0-BK7 may constitute the data storage region 1110 of the PIM device 1100 illustrated in FIG. 31. The first to fourth arithmetic operators MAC0-MAC3 may constitute the arithmetic circuit 1120 of the PIM device 1100 illustrated in FIG. 31. The first to fourth arithmetic quantity counters CNT0-CNT3 may constitute the arithmetic quantity counting part 1130 of the PIM device 1100 illustrated in FIG. 31. In the first arithmetic unit MAC UNIT 0, the first arithmetic operator MAC0 may receive first weight data DA_W1 and vector data DA_V from respective ones of the first memory bank BK0 and the second memory bank BK1 to perform an arithmetic calculation for the first weight data DA_W1 and the vector data DA_V. The first arithmetic operator MAC0 may output first arithmetic result data DA_RST0 generated by the arithmetic calculation for the first weight data DA_W1 and the vector data DA_V. During this arithmetic operation, the first arithmetic quantity counter CNT0 may quantitatively count the operations performed by the first arithmetic unit MAC UNIT 0 to output the counted result as arithmetic quantity data DA_CNT0. The arithmetic quantity data DA_CNT0 generated by the first arithmetic quantity counter CNT0 may be stored into the first memory bank BK0. This operation of the first arithmetic unit MAC UNIT 0 may be equally applicable to each of the second to fourth arithmetic units MAC UNIT 1-MAC UNIT 3.

Figure 34:
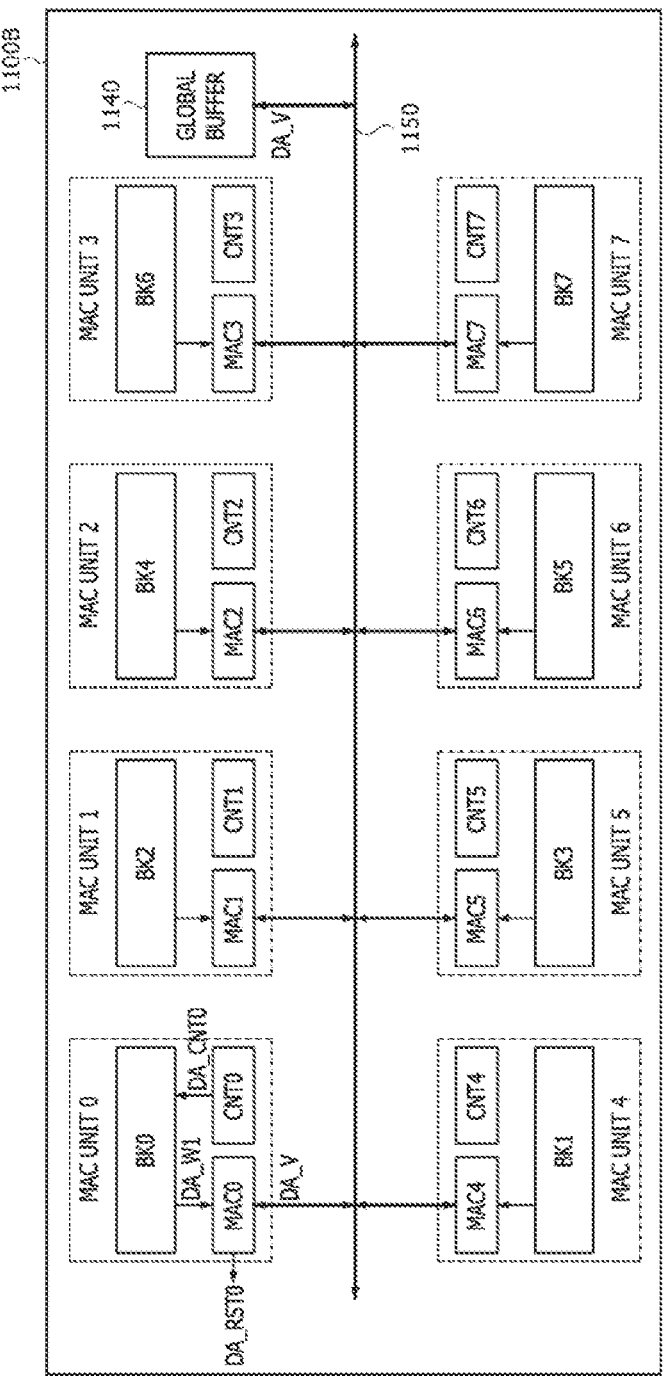
FIG. 34 is a schematic diagram illustrating another example of a PIM device included in the PIM system illustrated in FIG. 31.

FIG. 34 is a schematic diagram illustrating a PIM device 1100B corresponding to another example of the PIM device 1100 included in the PIM system 1000 illustrated in FIG. 31.

Referring to FIG. 34, the PIM device 1100B may include a plurality of arithmetic units (e.g., first to eighth arithmetic units MAC UNIT 0-MAC UNIT 7) and a global buffer 1140. Each of the first to eighth arithmetic units MAC UNIT 0-MAC UNIT 7 may include at least one memory bank BK, one arithmetic operator MAC, and one arithmetic quantity counter CNT. For example, the first arithmetic unit MAC UNIT 0 may include a first memory bank BK0, a first arithmetic operator MAC0, and a first arithmetic quantity counter CNT0, and the second arithmetic unit MAC UNIT 1 may include a second memory bank BK1, a second arithmetic operator MAC1, and a second arithmetic quantity counter CNT1. Each of the remaining third to eighth arithmetic units MAC UNIT 2-MAC UNIT 7 may also have the same configuration as the first or second arithmetic unit MAC UNIT 0 or MAC UNIT 1. The global buffer 1140 may provide each of the first to eighth arithmetic operators MAC0-MAC7 with vector data DA_V through a global I/O line 1150.

The first to eighth memory banks BK0-BK7 and the global buffer 1140 may constitute the data storage region 1110 of the PIM device 1100 illustrated in FIG. 31. The first to eighth arithmetic operators MAC0-MAC7 may constitute the arithmetic circuit 1120 of the PIM device 1100 illustrated in FIG. 31. The first to eighth arithmetic quantity counters CNT0-CNT7 may constitute the arithmetic quantity counting part 1130 of the PIM device 1100 illustrated in FIG. 31. In the first arithmetic unit MAC UNIT 0, the first arithmetic operator MAC0 may receive first weight data DA_W1 and vector data DA_V from respective ones of the first memory bank BK0 and the global buffer 1140 to perform an arithmetic calculation for the first weight data DA_W1 and the vector data DA_V. The first arithmetic operator MAC0 may output first arithmetic result data DA_RST0 generated by the arithmetic calculation for the first weight data DA_W1 and the vector data DA_V. During this arithmetic operation, the first arithmetic quantity counter CNT0 may quantitatively count the operations performed by the first arithmetic unit MAC UNIT 0 to output the counted result as arithmetic quantity data DA_CNT0. The arithmetic quantity data DA_CNT0 generated by the first arithmetic quantity counter CNT0 may be stored into the first memory bank BK0. This operation of the first arithmetic unit MAC UNIT 0 may be equally applicable to each of the second to eighth arithmetic units MAC UNIT 1-MAC UNIT 7.

Figure 35:
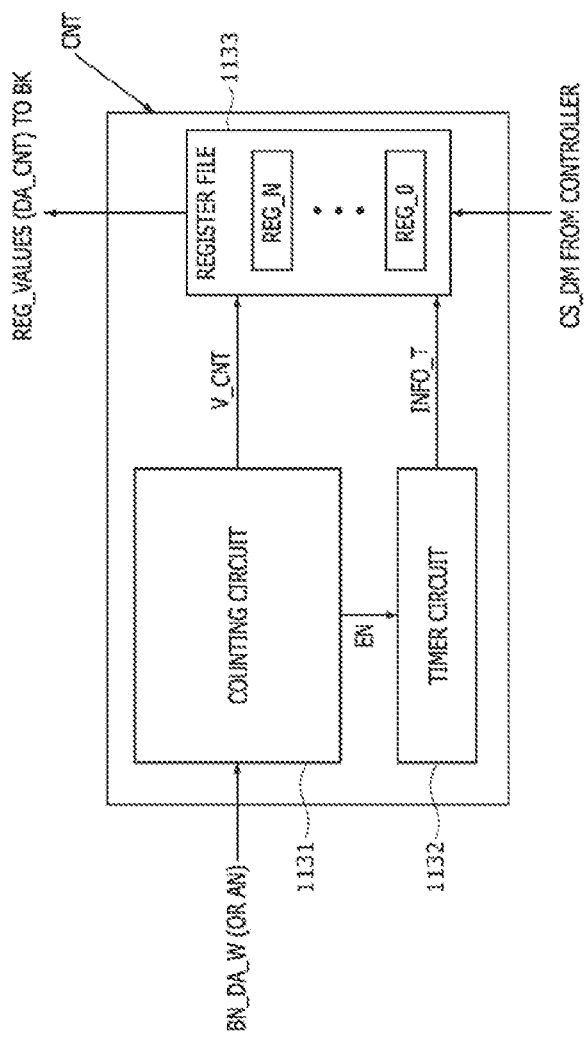
FIG. 35 is a block diagram illustrating an example of an arithmetic quantity counter of a PIM device included in a PIM system according to an embodiment of the present disclosure.

FIG. 35 is a block diagram illustrating an example of the arithmetic quantity counter CNT of the PIM device 1100 included in the PIM system 1000 according to an embodiment of the present disclosure. Each of the arithmetic quantity counters CNT0-CNT3 included in the PIM device 1100A illustrated in FIG. 33 may have the same configuration as the arithmetic quantity counter CNT illustrated in FIG. 35. In addition, each of the arithmetic quantity counters CNT0-CNT7 included in the PIM device 1100B illustrated in FIG. 34 may also have the same configuration as the arithmetic quantity counter CNT illustrated in FIG. 35.

Referring to FIG. 35, the arithmetic quantity counter CNT may include a counting circuit 1131, a timer circuit 1132, and a register file 1133. The counting circuit 1131 may receive a bit number signal BN_DA_W corresponding to the number of bits included in the weight data DA_W. The counting circuit 1131 may output a counted value V_CNT corresponding to the bit number signal BN_DA_W. The counted value V_CNT outputted from the counting circuit 1131 may be transmitted to the register file 1133. In an embodiment, the bit number signal BN_DA_W may be transmitted from the memory bank BK to the counting circuit 1131 of the arithmetic quantity counter CNT whenever the weight data are transmitted from the memory bank BK to the arithmetic operator MAC. In an embodiment, when the bit number signal BN_DA_W corresponds to '64', the counting circuit 1131 may output a binary number corresponding to '64' as the counted value V_CNT.

In another embodiment, the counting circuit 1131 may receive an arithmetic signal AN instead of the bit number signal BN_DA_W. The arithmetic signal AN may be transmitted from the arithmetic operator MAC to the counting circuit 1131 whenever the arithmetic operator MAC executes the arithmetic calculation. Whenever the arithmetic signal AN is inputted to the counting circuit 1131, the counting circuit 1131 may increase the counted value V_CNT by one to output the increased value of the counted value V_CNT. Thus, the counted value V_CNT outputted from the counting circuit 1131 may denote the accumulated number of times of the arithmetic calculation until a point in time when the counted value V_CNT is reset after the counted value V_CNT is previously reset.

The counted value V_CNT corresponding to the bit number signal BN_DA_W of the weight data used for the arithmetic operation may be proportional to the arithmetic quantity of the arithmetic unit MAC UNIT. Similarly, the counted value V_CNT denoting the accumulated number of times of the arithmetic calculation generated by accumulation of the arithmetic signal AN may also be proportional to the arithmetic quantity of the arithmetic unit MAC UNIT. As the arithmetic quantity of the arithmetic unit MAC UNIT increases, the temperature of the arithmetic unit MAC UNIT may also increase. That is, the temperature of the arithmetic unit MAC UNIT may be quantitatively analyzed by using the counted value V_CNT outputted from the counting circuit 1131.

The timer circuit 1132 may output and transmit time information INFO_T to the register file 1133 whenever an enablement signal EN is transmitted from the counting circuit 1131 to the timer circuit 1132. The enablement signal EN may be inputted to the timer circuit 1132 whenever the counted value V_CNT is outputted from the counting circuit 1131. Thus, the time information INFO_T outputted from the timer circuit 1132 may include information on a time when the counted value V_CNT is outputted from the counting circuit 1131.

The register file 1133 may store the counted value V_CNT outputted from the counting circuit 1131 and the time information INFO_T outputted from the timer circuit 1132 as a register value REG_VALUE. The register file 1133 may have a plurality of registers, for example, first to $(N+1)^{th}$ registers REG_0-REG_N. Each of the first to $(N+1)^{th}$ registers REG_0-REG_N may store one register value REG_VALUE. The one register value REG_VALUE may include the counted value V_CNT and the time information INFO_T. The register file 1133 may transmit the arithmetic quantity data DA_CNT corresponding to the register value stored in each of the registers REG_0-REG_N to the memory bank BK, in response to the arithmetic quantity data move signal CS_DM outputted from the controller 1200. The register file 1133 may initialize all of the registers REG_0-REG_N after transmitting all of the register values to the banks BK.

Figure 36:
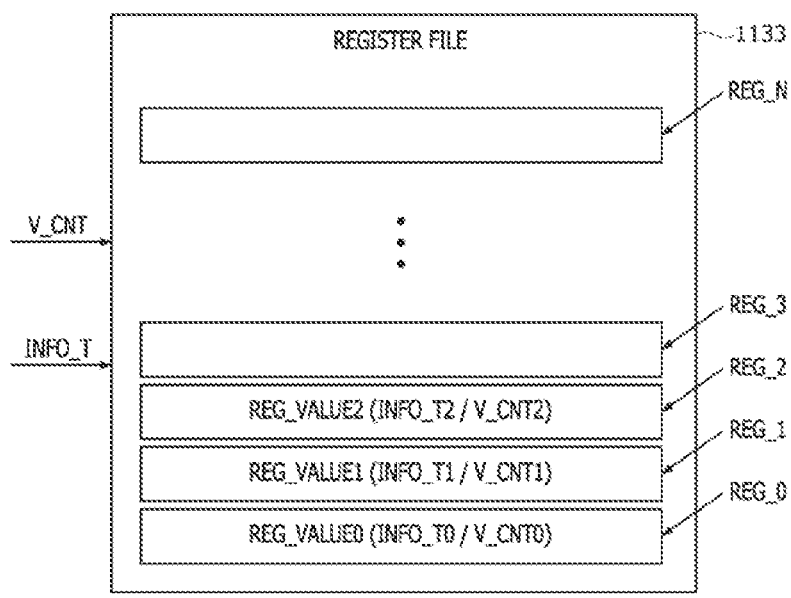
FIG. 36 is a block diagram illustrating an example of a register file included in the arithmetic quantity counter illustrated in FIG. 35.

FIG. 36 illustrates a configuration of the register file 1133 included in the arithmetic quantity counter CNT illustrated in FIG. 35. Referring to FIG. 36, the register file 1133 may include the first to $(N+1)^t$ registers REG_0-REG_N as mentioned previously. The counted values V_CNT and the time information INFO_T transmitted to the register file 1133 may be stored into the first to $(N+1)^{th}$ registers REG_0-REG_N of the register file 1133 in order of the first to $(N+1)^{th}$ registers REG_0-REG_N. As illustrated in FIG. 36, a first register value REG_VALUE0 including a first counted value V_CNT0 and first time information INFO_T0 may be stored into the first register REG_0. In an embodiment, low-order bits of the first register value REG_VALUE0 may represent the first counted value V_CNT0, and high-order bits of the first register value REG_VALUE0 may represent the first time information INFO_T0. Each of the second to $(N+1)^{th}$ registers REG_1-REG_N may have substantially same configuration as the first register REG_0. At a point in time when a certain time elapses from a point in time when the first register value REG_VALUE0 is stored into the first register REG_0, a second register value REG_VALUE1 including a second counted value V_CNT1 and second time information INFO_T1 may be stored into the second register REG_1. Similarly, at a point in time when a certain time elapses from a point in time when the second register value REG_VALUE2 is stored into the second register REG_1, a third register value REG_VALUE2 including a third counted value V_CNT2 and third time information INFO_T2 may be stored into the third register REG_2.

That the first, second, and third register values REG_VALUE0, REG_VALUE1, and REG_VALUE2 are stored in the register file 1133 may mean that the arithmetic quantity data move signal CS_DM is not transmitted to the register file 1133 while the first, second, and third register values REG_VALUE0, REG_VALUE1, and REG_VALUE2 are stored into the register file 1133. At this state, if the arithmetic quantity data move signal CS_DM is inputted to the register file 1133, the register file 1133 may output all of the first to third register values REG_VALUE0, REG_VALUE1, and REG_VALUE2 as the arithmetic quantity data DA_CNT and may initialize the first to third registers REG_0-REG_2. The arithmetic quantity data DA_CNT outputted from the register file 1133 may include information on the arithmetic quantity which is calculated after a point in time when previous arithmetic quantity data DA_CNT are generated. In addition, the arithmetic quantity data DA_CNT may also include the time information INFO_T on a point in time when the counted value V_CNT is generated. Thus, it may be possible to detect the arithmetic quantity of the arithmetic unit MAC UNIT according to the time based on the arithmetic quantity data DA_CNT outputted from the register file 1133.

Figure 37:
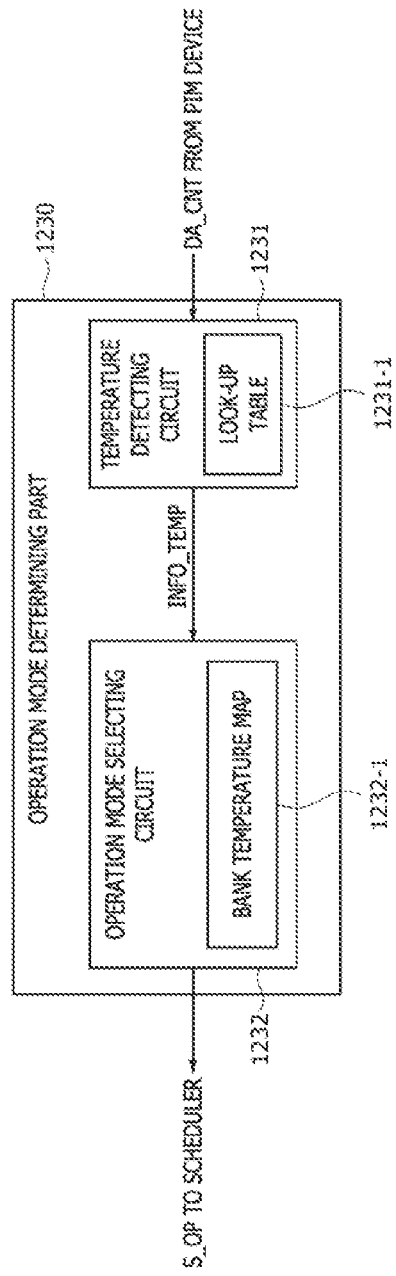
FIG. 37 is a block diagram illustrating an example of an operation mode determining part included in a controller of the PIM system illustrated in FIG. 31.

FIG. 37 is a block diagram illustrating a configuration of the operation mode determining part 1230 included in the controller 1200 of the PIM system 1000 illustrated in FIG. 31. Referring to FIG. 37, the operation mode determining part 1230 may receive the arithmetic quantity data DA_CNT from the PIM device 1100 to generate and output the control mode signal S_OP to the scheduler 1240. The operation mode determining part 1230 may include a temperature detecting circuit 1231 and an operation mode selecting circuit 1232. The temperature detecting circuit 1231 may detect the temperature of the PIM device 1100 based on the arithmetic quantity data DA_CNT outputted from the PIM device 1100. The temperature detecting circuit 1231 may output a temperature information signal INFO_TEMP including information on the detected temperature. The temperature information signal INFO_TEMP may be obtained by analyzing the counted value V_CNT and the time information INFO_T included in the arithmetic quantity data DA_CNT. In an embodiment, when a time interval between the arithmetic operations is relatively short, the temperature information signal INFO_TEMP corresponding to a relatively high temperature may be generated. In contrast, when a time interval between the arithmetic operations is relatively long, the temperature information signal INFO_TEMP corresponding to a relatively low temperature may be generated.

As described with reference to FIGS. 35 and 36, the arithmetic quantity data DA_CNT outputted from the PIM device 1100 may include the counted value V_CNT representing the arithmetic quantity of the PIM device 1100 and the time information INFO_T on a point in time when the counted value V_CNT is generated. The temperature of the PIM device 1100 may be proportional to the counted value V_CNT representing the arithmetic quantity of the PIM device 1100, and a variation rate of the temperature of the PIM device 1100 to the counted value V_CNT may vary according to a time interval between the arithmetic operations. The time information INFO_T may be used to compensate for the variation rate of the temperature of the PIM device 1100 to the time interval between the arithmetic operations. In an embodiment, the temperature detecting circuit 1231 may include a look-up table 1231-1. The look-up table 1231-1 may provide a temperature according to the counted value V_CNT and the time information INFO_T which are included in the arithmetic quantity data DA_CNT. The look-up table 1231-1 may be built up by actually measuring a temperature variation of the PIM device 1100 while the arithmetic operations are performed in the PIM device 1100 under various conditions. Input values of the look-up table 1231-1 may be set as the time interval between the arithmetic operations which is capable of being obtained based on the counted value V_CNT and the time information INFO_T which are included in the arithmetic quantity data DA_CNT. Output values of the look-up table 1231-1 may constitute the temperature information signal INFO_TEMP.

The operation mode selecting circuit 1232 may receive the temperature information signal INFO_TEMP from the temperature detecting circuit 1231 to generate and output the control mode signal S_OP to the scheduler 1240. In an embodiment, the operation mode selecting circuit 1232 may include a bank temperature map 1232-1. As described with reference to FIGS. 32 and 33, when the PIM device 1100 includes a plurality of memory banks, the bank temperature map 1232-1 may represent a temperature state of the plurality of memory banks in a map form. In an embodiment, when the temperature information signal INFO_TEMP for a first memory bank among the plurality of memory banks is transmitted from the temperature detecting circuit 1231 to the operation mode selecting circuit 1232, the temperature (for the first memory bank) in the bank temperature map 1232-1 may be updated into a temperature corresponding to the temperature information signal INFO_TEMP. The operation mode selecting circuit 1232 may compare the updated temperature (for the first memory bank) in the bank temperature map 1232-1 with the predetermined temperature to selectively output one of the normal control mode signal and the slow control mode signal as the control mode signal S_OP. When the updated temperature is the same as or higher than the predetermined temperature, the operation mode selecting circuit 1232 may output the slow control mode signal as the control mode signal S_OP. In contrast, when the updated temperature is lower than the predetermined temperature, the operation mode selecting circuit 1232 may output the normal control mode signal as the control mode signal S_OP.

Figure 38:
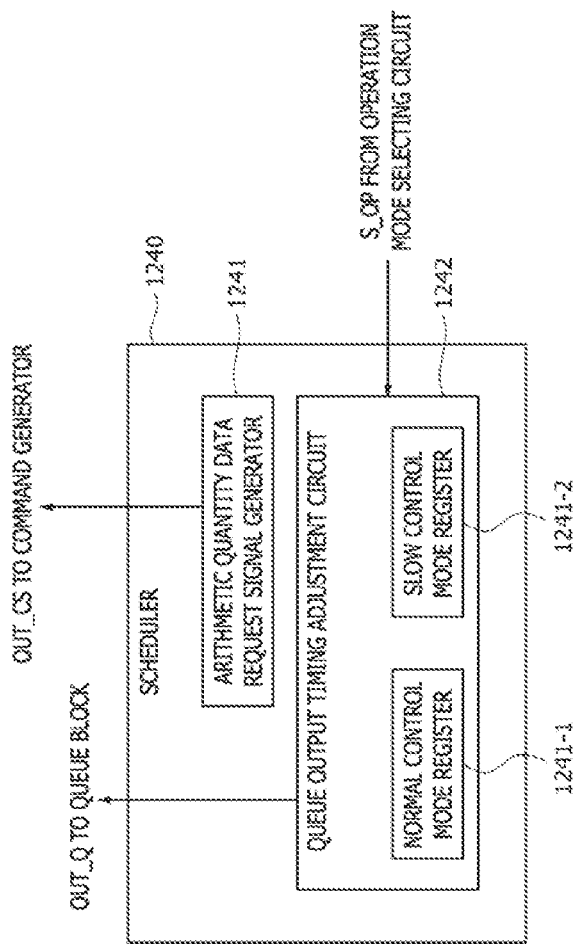
FIG. 38 is a block diagram illustrating an example of a scheduler included in a controller of the PIM system illustrated in FIG. 31.

FIG. 38 is a block diagram illustrating a configuration of the scheduler 1240 included in the controller 1200 of the PIM system 100 illustrated in FIG. 31. Referring to FIG. 38, the scheduler 1240 may include an arithmetic quantity data request signal generator 1241 and a queue output timing adjustment circuit 1242. The arithmetic quantity data request signal generator 1241 may generate and output the arithmetic quantity data request signal OUT_CS to the command generator (1220 of FIG. 31) in response to an arithmetic quantity data request outputted from a host. The queue output timing adjustment circuit 1242 may receive the control mode signal S_OP from the operation mode selecting circuit (1232 of FIG. 37) of the operation mode determining part (1230 of FIG. 37) to generate and output the queue output signal OUT_Q for the normal control mode or the slow control mode.

In an embodiment, the queue output timing adjustment circuit 1242 may include a normal control mode register 1241-1 and a slow control mode register 1241-2. The normal control mode register 1241-1 may be set to have set values for a scheduling operation of the scheduler 1240 performed in the normal control mode. In contrast, the slow control mode register 1241-2 may be set to have set values for a scheduling operation of the scheduler 1240 performed in the slow control mode. For example, when the normal control mode signal is transmitted from the operation mode determining part (1230 of FIG. 37) to the queue output timing adjustment circuit 1242, the queue output timing adjustment circuit 1242 may output the queue output signals OUT_Q at the first time interval which is set by the normal control mode register 1241-1. In contrast, when the slow control mode signal is transmitted from the operation mode determining part (1230 of FIG. 37) to the queue output timing adjustment circuit 1242, the queue output timing adjustment circuit 1242 may output the queue output signals OUT_Q at the second time interval which is set by the slow control mode register 1241-2. The second time interval may be set to be greater than the first time interval.

Figure 39:
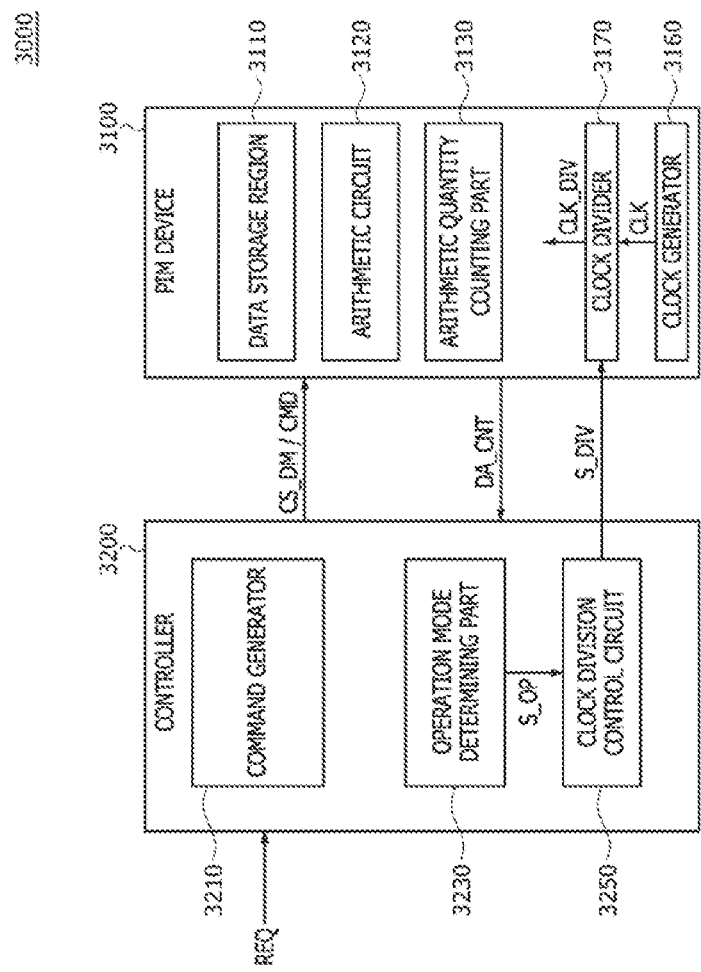
FIG. 39 is a block diagram illustrating a PIM system according to another embodiment of the present disclosure.

FIG. 39 is a block diagram illustrating a PIM system 3000 according to another embodiment of the present disclosure. Referring to FIG. 39, the PIM system 3000 may include a PIM device 3100 and a controller 3200 controlling operations of the PIM device 3100. The PIM device 3100 may include a data storage region 3110, an arithmetic circuit 3120, an arithmetic quantity counting part 3130, a clock generator 3160, and a clock divider 3170. The data storage region 3110, the arithmetic circuit 3120, and the arithmetic quantity counting part 3130 may be realized to have substantially the same configurations as the data storage region 1110, the arithmetic circuit 1120, and the arithmetic quantity counting part 1130 included in the PIM system 1000 described with reference to FIG. 31. Accordingly, the data storage region 3110, the arithmetic circuit 3120, and the arithmetic quantity counting part 3130 may perform substantially the same operations as the data storage region 1110, the arithmetic circuit 1120, and the arithmetic quantity counting part 1130.

The clock generator 3160 may be configured to supply a clock signal CLK (e.g., an internal clock signal) into the PIM device 3100. The clock signal CLK generated by the clock generator 3160 may be inputted to the clock divider 3170. The clock divider 3170 may divide a frequency of the clock signal CLK at a certain rate based on a division signal S_DIV outputted from the controller 3200 to generate and output a divided clock signal CLK_DIV. An access operation (also referred to as a 'memory access operation' or 'memory operation') to the data storage region 3110 and an arithmetic operation of the arithmetic circuit 3120 may be performed in synchronization with the divided clock signal CLK_DIV. A division rate of the clock divider 3170 for generating the divided clock signal CLK_DIV may be determined by the division signal S_DIV outputted from the controller 3200. In an embodiment, when the division signal S_DIV corresponding to 100% (i.e., once) is transmitted from the controller 3200 to the clock divider 3170, the clock divider 3170 may generate and output the divided clock signal CLK_DIV having the same frequency (i.e., the same cycle) as the clock signal CLK outputted from the clock generator 3160. Alternatively, when the division signal S_DIV corresponding to 50% (i.e., a half) is transmitted from the controller 3200 to the clock divider 3170, the clock divider 3170 may generate and output the divided clock signal CLK_DIV having a frequency which is half a frequency of the clock signal CLK outputted from the clock generator 3160. In such a case, the divided clock signal CLK_DIV may have a cycle which is twice a cycle of the clock signal CLK outputted from the clock generator 3160. That is, an operation speed (i.e., an access operation speed) of the data storage region 3110 and an operation speed (i.e., an arithmetic operation speed) of the arithmetic circuit 3120 may become lower by approximately a factor of two (i.e., cut in half).

The controller 3200 may include a command generator 3210, an operation mode determining part 3230, and a clock division control circuit 3250. The command generator 3210 may transmit an arithmetic quantity data move signal CS_DM and a command CMD to the PIM device 3100 in response to a request REQ outputted from a host (not shown). The command generator 3210 may perform the same operation as the command generator 1210 described with reference to FIG. 31. The operation mode determining part 3230 may receive arithmetic quantity data DA_CNT from the PIM device 3100. As described with reference to FIG. 37, the operation mode determining part 3230 may analyze the arithmetic quantity data DA_CNT to generate temperature information and may generate and output a control mode signal S_OP of the controller 3200 based on the temperature information. The control mode signal S_OP may be a normal control mode signal or a slow control mode signal. The control mode signal S_OP outputted from the operation mode determining part 3230 may be transmitted to the clock division control circuit 3250.

The clock division control circuit 3250 may generate and transmit the division signal S_DIV to the clock divider 3170 of the PIM device 3100 in response to the control mode signal S_OP outputted from the operation mode determining part 3230. In an embodiment, when the control mode signal S_OP corresponding to the normal control mode signal is inputted to the clock division control circuit 3250, the clock division control circuit 3250 may transmit the division signal S_DIV corresponding to a division rate of 100% (i.e., once) to the clock divider 3170 of the PIM device 3100. In such a case, the divided clock signal CLK_DIV outputted from the clock divider 3170 of the PIM device 3100 may have the same cycle as the clock signal CLK outputted from the clock generator 3160. When the control mode signal S_OP corresponding to the slow control mode signal is inputted to the clock division control circuit 3250, the clock division control circuit 3250 may transmit the division signal S_DIV corresponding to a division rate of one $M^{th}$ (i.e., 1/M times) to the clock divider 3170 of the PIM device 3100 (where, "M" is a real number which is greater than "1"). In such a case, the divided clock signal CLK_DIV outputted from the clock divider 3170 of the PIM device 3100 may have a cycle which is "M" times greater than a cycle of the clock signal CLK outputted from the clock generator 3160.

Figure 40:
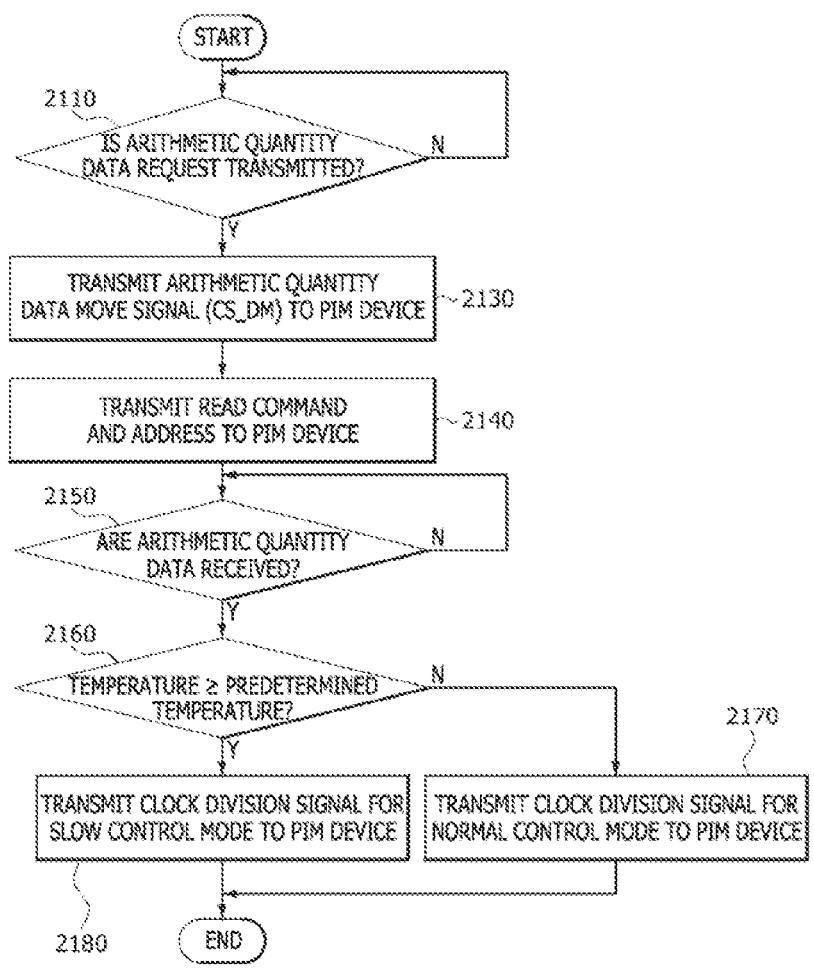
FIG. 40 is a flowchart illustrating a method of operating the PIM system illustrated in FIG. 39.

FIG. 40 is a flowchart illustrating a method of operating the PIM system 3000 illustrated in FIG. 39. Referring to FIGS. 39 and 40, the controller 3200 may determine whether an arithmetic quantity data request is transmitted from the host to the controller 3200 (see step 2110). When the arithmetic quantity data request is not transmitted to the controller 3200 at the step 2110, the controller 3200 may continuously check whether the arithmetic quantity data request is transmitted to the controller 3200 while the PIM device 3100 operates in a current control mode. When the arithmetic quantity data request is transmitted to the controller 3200 at the step 2110, the controller 3200 may transmit the arithmetic quantity data move signal CS_DM to the PIM device 3100 (see step 2130). When the arithmetic quantity data move signal CS_DM is transmitted from the controller 3200 to the PIM device 3100, the PIM device 3100 may transmit the arithmetic quantity data DA_CNT from the arithmetic quantity counting part 3130 to the data storage region 3110. The controller 3200 may transmit the read command and the address to the PIM device 3100 (see step 2140). In such a case, the address transmitted from the controller 3200 to PIM device 3100 may be an address indicating a position at which the arithmetic quantity data DA_CNT are stored in the data storage region 3110.

At a step 2150, the controller 3200 may determine whether the arithmetic quantity data DA_CNT are inputted to the controller 3200. When the arithmetic quantity data DA_CNT are not inputted to the controller 3200 at the step 2150, the controller 3200 may maintain a standby state until the arithmetic quantity data DA_CNT are inputted to the controller 3200. When the arithmetic quantity data DA_CNT are inputted to the controller 3200 at the step 2150, the controller 3200 may determine whether the temperature of the PIM device 3100 is lower than the predetermined temperature (see step 2160). When the temperature of the PIM device 3100 is lower than the predetermined temperature at the step 2160, the controller 3200 may transmit the division signal S_DIV (also, referred to as a clock division signal) for the normal control mode to the PIM device 3100 (see step 2170). In such a case, as described with reference to FIG. 39, the clock divider 3170 may generate the divided clock signal CLK_DIV having the same cycle as the clock signal CLK generated by the clock generator 3160. Thus, the operation speed of the PIM device 3100 may maintain a speed processed by the clock signal CLK. When the temperature of the PIM device 3100 is the same as or higher than the predetermined temperature at the step 2160, the controller 3200 may transmit the clock division signal S_DIV for the slow control mode to the PIM device 3100 (see step 2180). In such a case, as described with reference to FIG. 39, the clock divider 3170 may generate the divided clock signal CLK_DIV having a cycle which is greater than a cycle of the clock signal CLK generated by the clock generator 3160. Thus, the operation speed of the PIM device 3100 may become slower than a speed processed by the clock signal CLK.

Figure 41:
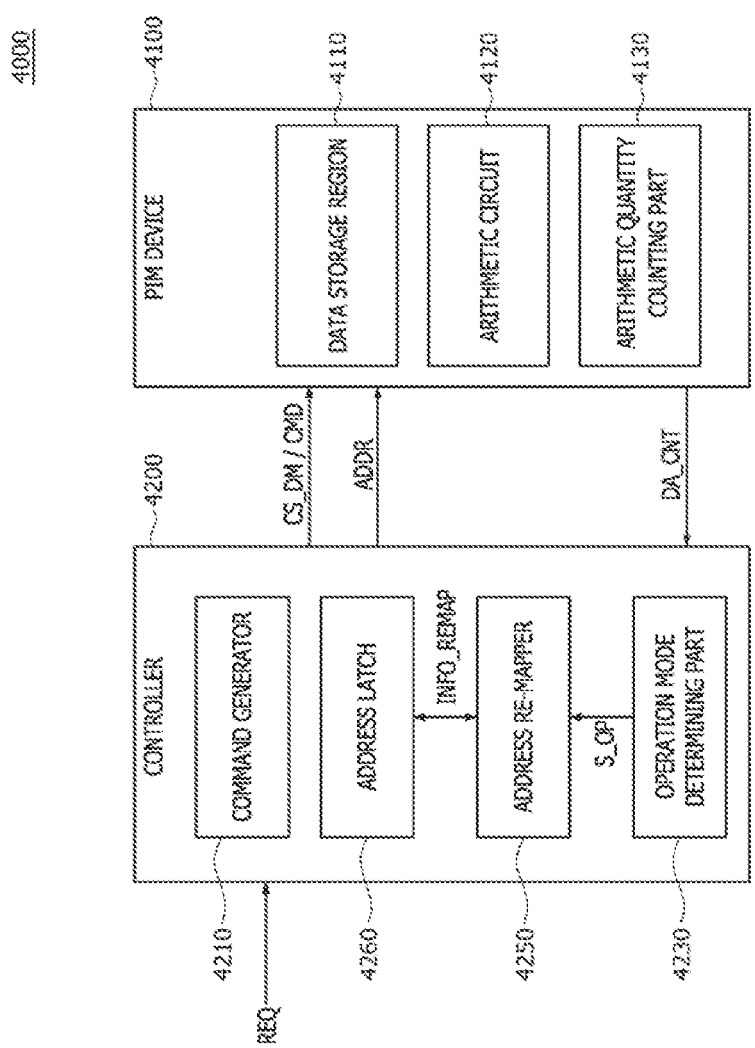
FIG. 41 is a block diagram illustrating a PIM system according to yet another embodiment of the present disclosure.

FIG. 41 is a block diagram illustrating a PIM system 4000 according to yet another embodiment of the present disclosure. Referring to FIG. 41, the PIM system 4000 may include a PIM device 4100 and a PIM controller 4200 for controlling operations of the PIM device 4100. The PIM device 4100 may be realized to have the same configuration as the PIM device 1100 described with reference to FIGS. 31 to 36. Thus, detailed descriptions of the PIM device 4100 will be omitted hereinafter to avoid duplicate explanation. The PIM controller 4200 of the PIM system 4000 may include a command generator 4210, an operation mode determining part 4230, an address re-mapper 4250, and an address latch 4260.

The command generator 4210 may transmit an arithmetic quantity data move signal CS_DM and a command CMD to the PIM device 4100 in response to a request REQ outputted from a host (not shown). The command generator 4210 may perform the same operation as the command generator 1220 described with reference to FIG. 31. The operation mode determining part 4230 may receive arithmetic quantity data DA_CNT from the PIM device 4100. As described with reference to FIG. 37, the operation mode determining part 4230 may analyze the arithmetic quantity data DA_CNT to generate temperature information and may generate and output a control mode signal S_OP of the controller 4200 based on the temperature information. The control mode signal S_OP may be a normal control mode signal or a slow control mode signal. The control mode signal S_OP outputted from the operation mode determining part 4230 may be transmitted to the address re-mapper 4250.

The address re-mapper 4250 may perform an address remapping operation in response to the control mode signal S_OP outputted from the operation mode determining part 4230. In an embodiment, when the operation mode determining part 4230 outputs the normal control mode signal as the control mode signal S_OP, the address re-mapper 4250 may skip a step of performing the address remapping operation. When the operation mode determining part 4230 outputs the slow control mode signal as the control mode signal S_OP, the address re-mapper 4250 may perform the address remapping operation for remapping an address of a first region having a relatively high temperature among regions of the PIM device 4100 into an address of a second region having a relatively low temperature among the regions of the PIM device 4100, thereby generating remapped address information INFO_REMAP. Using the address remapping operation, the PIM controller 4200 may control the PIM device 4100 such that data in the first region of the PIM device 4100 are copied into the second region of the PIM device 4100.

The address latch 4260 may decode address information provided by the request REQ outputted from the host to generate an address ADDR and may transmit the address ADDR to the PIM device 4100. The address latch 4260 may refer to the remapped address information INFO_REMAP in the address re-mapper 4250 before transmitting the address ADDR to the PIM device 4100. The address latch 4260 may transmit remapped address instead of the address ADDR to the PIM device 4100 when the address ADDR are remapped into another address different from the address ADDR. Thus, the access operation or the arithmetic operation of the PIM device 4100 may be performed for a low temperature region instead of a high temperature region.

Figure 42:
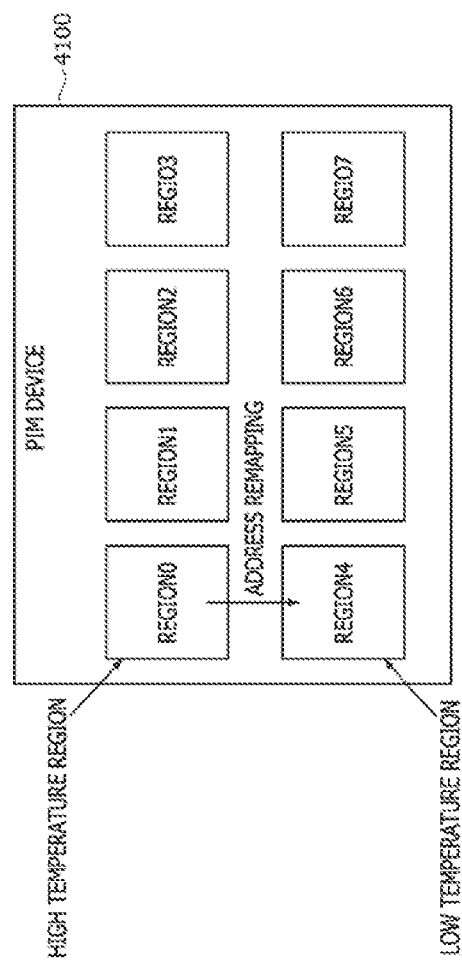
FIG. 42 is a block diagram illustrating an address remapping process of the PIM system illustrated in FIG. 41.

FIG. 42 illustrates an address remapping process of the PIM system 4000 illustrated in FIG. 41. Referring to FIG. 42, it may be assumed that the PIM device 4100 includes first to eighth regions REGION0-REGION7 which are physically distinguished from each other. In an embodiment, each of the first to eighth regions REGION0-REGION7 may correspond to one arithmetic unit (MAC UNIT) among the plurality of arithmetic units which are described with reference to FIGS. 33 and 34. Hereinafter, the address remapping process will be described in conjunction with a case for which a temperature of the first region REGION0 is set to be higher than the predetermined temperature and a temperature of the fifth region REGION4 is set to be lower than the predetermined temperature, based on the arithmetic quantity data DA_CNT outputted from the PIM device 4100. In such a case, the address re-mapper 4250 may remap an address of the first region REGION0 into an address of the fifth region REGION4. In addition, the controller 4200 may copy data stored in the first region REGION0 into the fifth region REGION4. Even though an arithmetic request for the first region REGION0 is transmitted from the host to the controller 4200, the arithmetic operation for the fifth region REGION4 having a relatively low temperature instead of the first region REGION having a relatively high temperature may be performed by the address remapping operation. Accordingly, it may be possible to suppress that the overall temperature of the PIM device 4100 rises.

Figure 43:
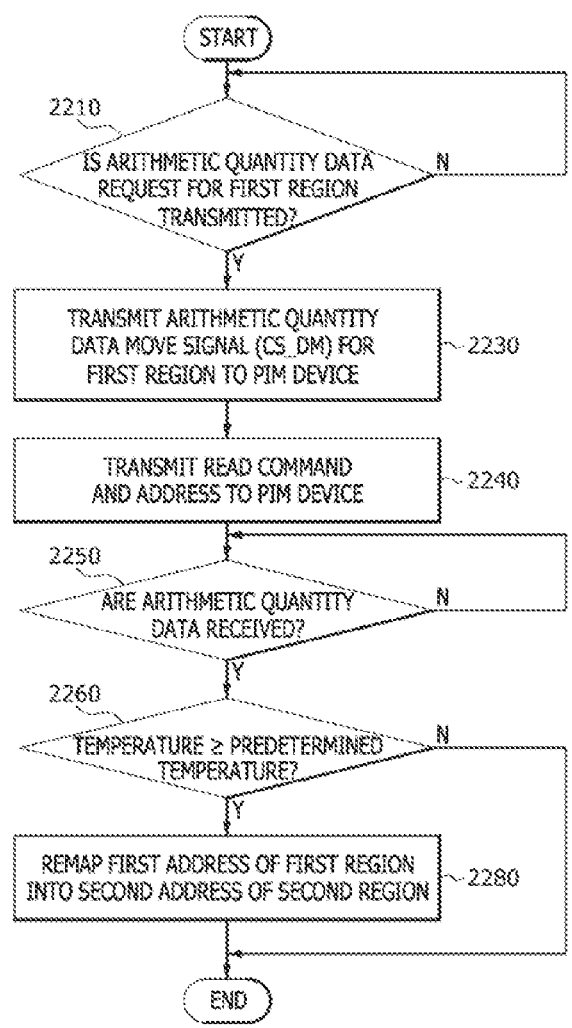
FIG. 43 is a flowchart illustrating a method of operating the PIM system illustrated in FIG. 41.

FIG. 43 is a flowchart illustrating a method of operating the PIM system 4000 illustrated in FIG. 41. Referring to FIGS. 41 and 43, the controller 4200 may determine whether an arithmetic quantity data request for a first region of the PIM device 4100 is transmitted from the host to the controller 4200 (see step 2210). When the arithmetic quantity data request for the first region is not transmitted to the controller 4200 at the step 2210, the controller 4200 may continuously check whether the arithmetic quantity data request for the first region is transmitted to the controller 4200 while the PIM device 4100 operates in a current control mode. When the arithmetic quantity data request for the first region is transmitted to the controller 4200 at the step 2210, the controller 4200 may transmit the arithmetic quantity data move signal CS_DM to the PIM device 4100 (see step 2230). When the arithmetic quantity data move signal CS_DM is transmitted from the controller 4200 to the PIM device 4100, the PIM device 4100 may transmit the arithmetic quantity data DA_CNT from the arithmetic quantity counting part 4130 to the data storage region 4110. The controller 4200 may transmit the read command and the address to the PIM device 4100 (see step 2240). In such a case, the address transmitted from the controller 4200 to PIM device 4100 may be an address indicating a position at which the arithmetic quantity data DA_CNT are stored in the data storage region 4110.

At a step 2250, the controller 4200 may determine whether the arithmetic quantity data DA_CNT are inputted to the controller 4200. When the arithmetic quantity data DA_CNT are not inputted to the controller 4200 at the step 2250, the controller 4200 may maintain a standby state until the arithmetic quantity data DA_CNT are inputted to the controller 4200. When the arithmetic quantity data DA_CNT are inputted to the controller 4200 at the step 2250, the controller 4200 may determine whether the temperature of the first region in the PIM device 4100 is lower than the predetermined temperature (see step 2260). When the temperature of the first region in the PIM device 4100 is lower than the predetermined temperature at the step 2260, the controller 3200 may maintain a current control mode. When the temperature of the first region in the PIM device 4100 is the same as or higher than the predetermined temperature at the step 2260, the controller 4200 may remap a first address of the first region into a second address of a second region in the PIM device 4100. The second region may correspond to one of relatively low temperature regions verified by the bank temperature map 1232-1 in the operation mode selecting circuit 1232, as described with reference to FIG. 37.

Figure 44:
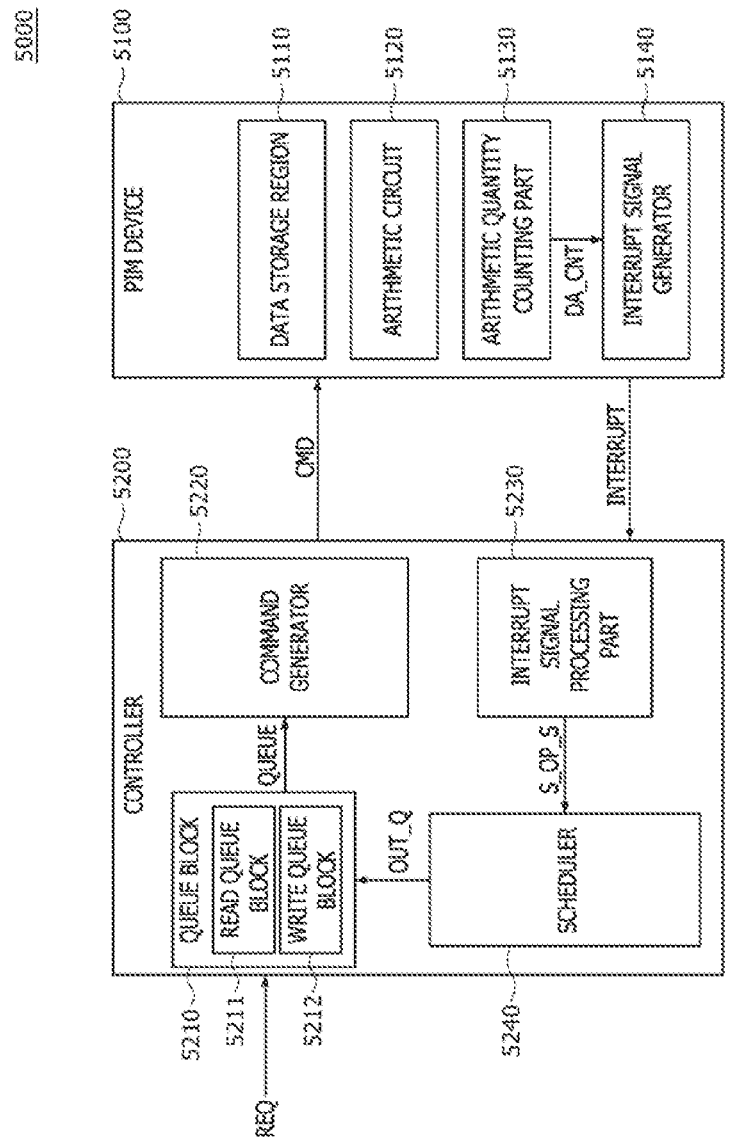
FIG. 44 is a block diagram illustrating a PIM system according to still another embodiment of the present disclosure.
Figure 45:
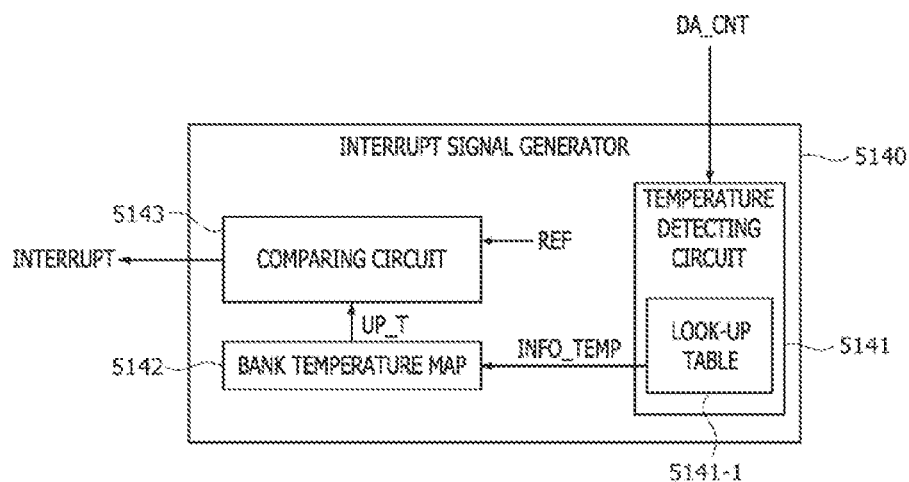
FIG. 45 is a block diagram illustrating an example of an interrupt signal generator included in a PIM device of the PIM system illustrated in FIG. 44.

FIG. 44 is a block diagram illustrating a PIM system 5000 according to still another embodiment of the present disclosure, and FIG. 45 is a block diagram illustrating a configuration of an interrupt signal generator 5140 included in the PIM device 5100 of the PIM system 5000 illustrated in FIG. 44. Referring to FIG. 44, the PIM system 5000 may include a PIM device 5100 and a controller 5200 controlling operations of the PIM device 5100. The PIM device 5100 may include a data storage region 5110, an arithmetic circuit 5120, an arithmetic quantity counting part 5130, and an interrupt signal generator 5140. The data storage region 5110, the arithmetic circuit 5120, and the arithmetic quantity counting part 5130 of the PIM device 5100 may be realized to have substantially the same configurations as the data storage region 1110, the arithmetic circuit 1120, and the arithmetic quantity counting part 1130 included in the PIM device 1100 described with reference to FIG. 31. Accordingly, the data storage region 5110, the arithmetic circuit 5120, and the arithmetic quantity counting part 5130 may perform substantially the same operations as the data storage region 1110, the arithmetic circuit 1120, and the arithmetic quantity counting part 1130. Only the difference between the arithmetic quantity counting part 1130 and the arithmetic quantity counting part 5130 is that the arithmetic quantity counting part 5130 transmits the arithmetic quantity data DA_CNT to the interrupt signal generator 5140 while the arithmetic quantity counting part 1130 transmits the arithmetic quantity data DA_CNT to the controller 1200. In an embodiment, the arithmetic quantity counting part 5130 may generate the arithmetic quantity data DA_CNT whenever the arithmetic operation is performed by the arithmetic circuit 5120. In another embodiment, the arithmetic quantity counting part 5130 may generate the arithmetic quantity data DA_CNT at a certain time interval. In yet another embodiment, the arithmetic quantity counting part 5130 may generate the arithmetic quantity data DA_CNT in response to a control signal outputted from the controller 5200.

The interrupt signal generator 5140 may receive the arithmetic quantity data DA_CNT from the arithmetic quantity counting part 5130 to generate and output an interrupt signal INTERRUPT. The interrupt signal INTERRUPT outputted from the interrupt signal generator 5140 may be transmitted to the controller 5200. As illustrated in FIG. 45, the interrupt signal generator 5140 may include a temperature detecting circuit 5141, a bank temperature map 5142, and a comparing circuit 5143. The temperature detecting circuit 5141 may analyze the arithmetic quantity data DA_CNT outputted from the arithmetic quantity counting part 5130 to detect a temperature. The detected temperature may be converted into a temperature information signal INFO_TEMP and the temperature information signal INFO_TEMP may be transmitted to the bank temperature map 5142. In order to perform a temperature detection operation with the analysis of the arithmetic quantity data DA_CNT, the temperature detecting circuit 5141 may include a look-up table 5141-1. The look-up table 5141-1 may have the same configuration as the look-up table 1231-1 described with reference to FIG. 37, and a temperature detection process using the look-up table 5141-1 may also be the same as the temperature detection process using the look-up table 1231-1 described with reference to FIG. 37.

When the PIM device 5100 includes a plurality of memory banks, the bank temperature map 5142 may represent a state of current temperatures of respective ones of the plurality of memory banks in a map form. In an embodiment, when the temperature information signal INFO_TEMP for a first bank among the plurality of memory banks is transmitted from the temperature detecting circuit 5141 to the bank temperature map 5142, a temperature of the first memory bank stored in the bank temperature map 5142 may be updated into a temperature corresponding to the temperature information signal INFO_TEMP.

The comparing circuit 5143 may receive an updated temperature UP_T of the first memory bank from the bank temperature map 5142. The comparing circuit 5143 may compare the updated temperature UP_T of the first memory bank with a reference temperature REF. When the updated temperature UP_T of the first memory bank is lower than a reference temperature REF, no interrupt signal INTERRUPT is generated by the comparing circuit 5143. In contrast, when the updated temperature UP_T of the first memory bank is the same as or higher than the reference temperature REF, the comparing circuit 5143 may generate the interrupt signal INTERRUPT.

Referring again to FIG. 44, the controller 5200 may include a queue block 5210, a command generator 5220, an interrupt signal processing part 5230, and a scheduler 5240. The queue block 5210 may include a read queue block 5211 and a write queue block 5212. The queue block 5210 may be realized to have the same configuration as the queue block 1210 described with reference to FIG. 31. That is, the queue block 5210 may perform the same operation as the queue block 1210 described with reference to FIG. 31. The command generator 5220 and the scheduler 5240 may also be realized to have the same configurations as the command generator 1220 and the scheduler 1240 described with reference to FIG. 31. Thus, the command generator 5220 and the scheduler 5240 may perform the same operations as the command generator 1220 and the scheduler 1240 described with reference to FIG. 31. Accordingly, detailed descriptions of the queue block 5210, the command generator 5220, and the scheduler 5240 will be omitted hereinafter to avoid duplicate explanation.

The interrupt signal processing part 5230 may generate a slow control mode signal S_OP_S in response to the interrupt signal INTERRUPT outputted from the interrupt signal generator 5140 of the PIM device 5100. As described with reference to FIG. 31, the scheduler 5240 may increase a time interval between points in time when the queue output signals OUT_Q are outputted, in response to the slow control mode signal S_OP_S. In such case, a time interval of queues outputted from the queue block 5210 and a time interval of commands CMD outputted from the command generator 5220 may also be increased.

Figure 46:
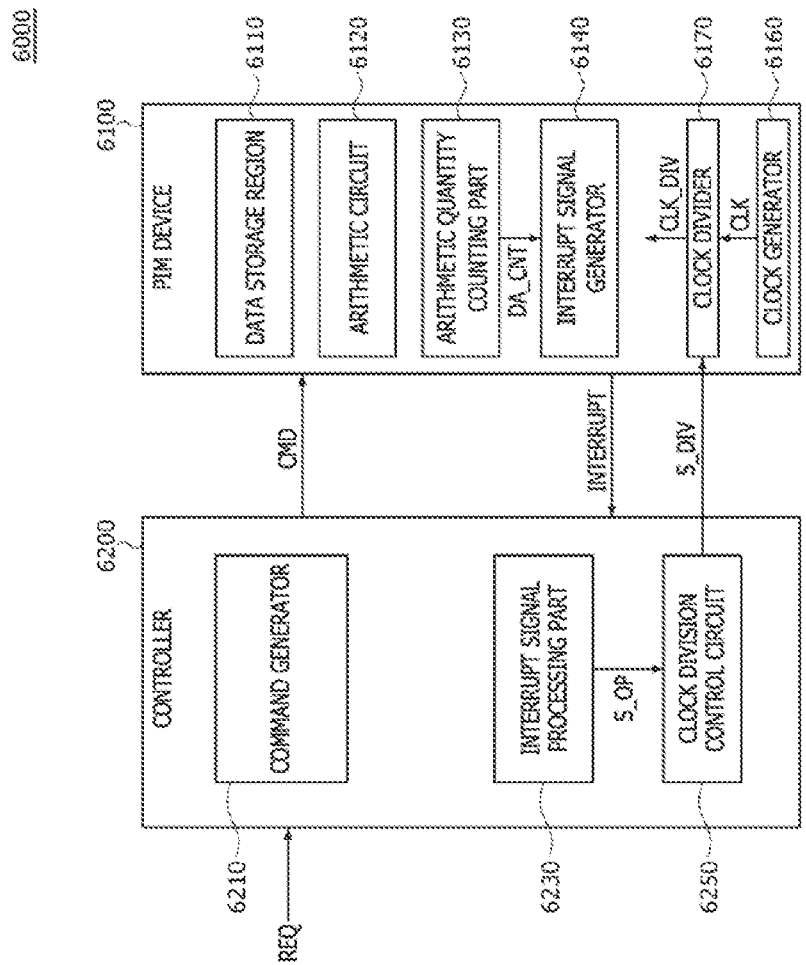
FIG. 46 is a block diagram illustrating a PIM system according to yet still another embodiment of the present disclosure.

FIG. 46 is a block diagram illustrating a PIM system 6000 according to yet still another embodiment of the present disclosure. Referring to FIG. 46, the PIM system 6000 may include a PIM device 6100 and a controller 6200 controlling operations of the PIM device 6100. The PIM device 6100 may include a data storage region 6110, an arithmetic circuit 6120, an arithmetic quantity counting part 6130, an interrupt signal generator 6140, a clock generator 6160, and a clock divider 6170. The data storage region 6110, the arithmetic circuit 6120, and the arithmetic quantity counting part 6130 of the PIM device 6100 may be realized to have substantially the same configurations as the data storage region 1110, the arithmetic circuit 1120, and the arithmetic quantity counting part 1130 included in the PIM device 1100 described with reference to FIG. 31. Accordingly, the data storage region 6110, the arithmetic circuit 6120, and the arithmetic quantity counting part 6130 may perform substantially the same operations as the data storage region 1110, the arithmetic circuit 1120, and the arithmetic quantity counting part 1130.

The interrupt signal generator 6140 may receive arithmetic quantity data DA_CNT from the arithmetic quantity counting part 6130 to generate and output an interrupt signal INTERRUPT. The interrupt signal INTERRUPT outputted from the interrupt signal generator 6140 may be transmitted to the controller 6200. The interrupt signal generator 6140 may have the same configuration as the interrupt signal generator 5140 described with reference to FIG. 45. Thus, the interrupt signal generator 6140 may analyze the arithmetic quantity data DA_CNT outputted from the arithmetic quantity counting part 6130 to detect a temperature. The interrupt signal generator 6140 may compare the detected temperature with a predetermined temperature and may generate the interrupt signal INTERRUPT when the detected temperature is the same as or higher than the predetermined temperature.

The clock generator 6160 may be configured to supply a clock signal CLK into the PIM device 6100. The clock signal CLK generated by the clock generator 6160 may be inputted to the clock divider 6170. The clock divider 6170 may divide a frequency of the clock signal CLK at a certain rate based on a division signal S_DIV outputted from the controller 6200 to generate and output a divided clock signal CLK_DIV. An access operation to the data storage region 6110 and an arithmetic operation of the arithmetic circuit 6120 may be performed in synchronization with the divided clock signal CLK_DIV. A division rate of the clock divider 6170 for generating the divided clock signal CLK_DIV may be determined by the division signal S_DIV outputted from the controller 6200.

The controller 6200 may include a command generator 6210, an interrupt signal processing part 6230, and a clock division control circuit 6250. The command generator 6210 may transmit a command CMD to the PIM device 6100 in response to a request REQ outputted from a host (not shown). The command generator 6210 may perform the same operation as the command generator 1210 described with reference to FIG. 31. The interrupt signal processing part 6230 may generate a slow control mode signal S_OP_S in response to the interrupt signal INTERRUPT outputted from the interrupt signal generator 6140 of the PIM device 6100. The slow control mode signal S_OP_S outputted from the interrupt signal processing part 6230 may be transmitted to the clock division control circuit 6250.

The clock division control circuit 6250 may generate and output a division signal S_DIV to the clock divider 6170 of the PIM device 6100 in response to the slow control mode signal S_OP_S outputted from the interrupt signal processing part 6230. When the slow control mode signal S_OP_S is transmitted from the interrupt signal processing part 6230 to the clock division control circuit 6250, the clock division control circuit 6250 may transmit the division signal S_DIV corresponding to a division rate of one $M^{th}$ (i.e., 1/M times) to the clock divider 6170 of the PIM device 6100 (where, "M" is a real number which is greater than "1"). In such a case, the divided clock signal CLK_DIV outputted from the clock divider 6170 of the PIM device 6100 may have a cycle which is "M" times longer than a cycle of the clock signal CLK outputted from the clock generator 6160.

Figure 47:
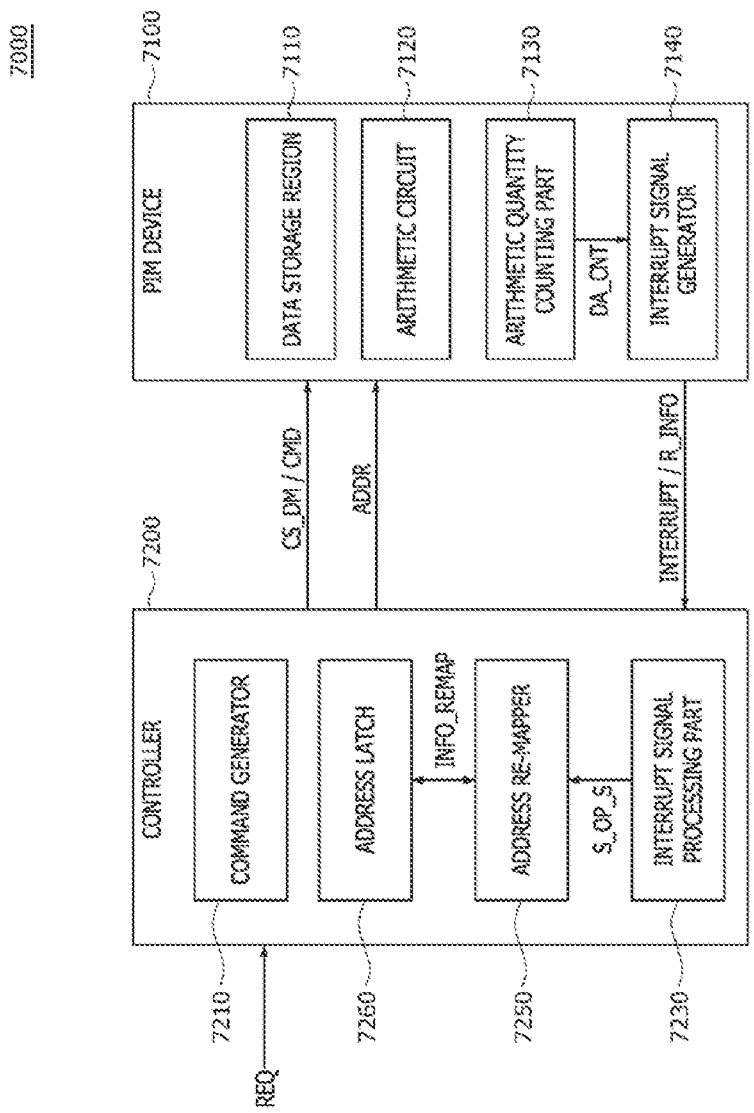
FIG. 47 is a block diagram illustrating a PIM system according to further another embodiment of the present disclosure.

FIG. 47 is a block diagram illustrating a PIM system 7000 according to still another embodiment of the present disclosure. Referring to FIG. 47, the PIM system 7000 may include a PIM device 7100 and a controller 7200 controlling operations of the PIM device 7100. In the PIM system 7000, the PIM device 7100 may have the same configuration as the PIM device 5100 of the PIM system 5000 described with reference to FIG. 44. Thus, detailed descriptions of a data storage region 7110, an arithmetic circuit 7120, an arithmetic quantity counting part 7130, and an interrupt signal generator 7140 constituting the PIM device 7100 will be omitted hereinafter to avoid duplicate explanation. The only difference between the interrupt signal generator 7140 and the interrupt signal generator 5140 is that the interrupt signal generator 7140 additionally generates a region information signal R_INFO including information on a region having arithmetic quantity data DA_CNT when the interrupt signal INTERRUPT is generated by the interrupt signal generator 7140.

The PIM controller 7200 of the PIM system 7000 may include a command generator 7210, an interrupt signal processing part 7230, an address re-mapper 7250, and an address latch 7260. The command generator 7210 may transmit a command CMD to the PIM device 7100 in response to a request REQ outputted from a host (not shown). The command generator 7210 may perform the same operation as the command generator 1220 described with reference to FIG. 31. The interrupt signal processing part 7230 may generate a slow control mode signal S_OP_S in response to the interrupt signal INTERRUPT outputted from the interrupt signal generator 7140 of the PIM device 7100. The slow control mode signal S_OP_S outputted from the interrupt signal processing part 7230 may be transmitted to the address re-mapper 7250.

The address re-mapper 7250 may perform an address remapping operation in response to the slow control mode signal S_OP_S outputted from the interrupt signal processing part 7230. The address re-mapper 7250 may perform the address remapping operation for remapping an address of a first region designated by the region information signal R_INFO into an address of a second region having a relatively low temperature among regions of the PIM device 7100, thereby generating remapped address information INFO_REMAP. Using the address remapping operation, the PIM controller 7200 may control the PIM device 7100 such that data in the first region of the PIM device 7100 are copied into the second region of the PIM device 7100.

The address latch 7260 may decode address information provided by the request REQ outputted from the host to generate an address ADDR and may transmit the address ADDR to the PIM device 7100. The address latch 7260 may refer to the remapped address information INFO_REMAP in the address re-mapper 7250 before transmitting the address ADDR to the PIM device 7100. The address latch 7260 may transmit remapped address instead of the address ADDR to the PIM device 7100 when the address ADDR are remapped into another address different from the address ADDR. Thus, the access operation or the arithmetic operation of the PIM device 7100 may be performed for a low temperature region instead of a high temperature region.

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A processing-in-memory (PIM) system comprising:
   a PIM device including a data storage region and an arithmetic circuit for performing an arithmetic operation for data outputted from the data storage region; and
   a controller configured to control the PIM device,
   wherein the PIM device includes a plurality of arithmetic quantity counters configured to count an arithmetic quantity of the arithmetic circuit to generate arithmetic quantity data, and
   wherein the PIM device is configured to transmit the arithmetic quantity data of the arithmetic circuit to the controller in response to a request of the controller.

2. The PIM system of claim 1, wherein the controller is configured to increase a time interval between commands transmitted from the controller to the PIM device when a value of the arithmetic quantity data is equal to or greater than a predetermined value.

3. The PIM system of claim 1, wherein the PIM device includes:
   a clock generator configured to generate an internal clock signal; and
   a clock divider configured to divide the internal clock signal at a rate determined by a division signal to generate and output a divided clock signal,
   wherein the controller is configured to output a division signal corresponding to a frequency division rate of (1/M) times the clock divider when a value of the arithmetic quantity data is equal to or greater than a predetermined value (where, "M" is a real number which is greater than "1").

4. The PIM system of claim 1, wherein the controller is configured to remap, when a value of the arithmetic quantity data of a first region in the PIM device is equal to or greater than a predetermined value, an address of the first region into an address of a second region having a temperature lower than a temperature of the first region.

5. The PIM system of claim 1,
   wherein the data storage region includes a plurality of memory banks;
   wherein the arithmetic circuit includes a plurality of arithmetic operators; and
   wherein a first arithmetic operator among the plurality of arithmetic operators is configured to receive first arithmetic data and second arithmetic data from first and second memory banks, respectively, among the plurality of memory banks and is configured to perform the arithmetic operation for the first arithmetic data and the second arithmetic data to generate and output arithmetic result data.

6. The PIM system of claim 5,
   wherein the first memory bank, the second memory bank, the first arithmetic operator, and a first arithmetic quantity counter among the plurality of arithmetic quantity counters constitute a first arithmetic unit.

7. The PIM system of claim 6, wherein the first arithmetic quantity counter includes:
   a counting circuit configured to output a counted value corresponding to the number of bits included in the first arithmetic data transmitted from the first memory bank to the first arithmetic operator; and
   a register file configured to store the counted value.

8. The PIM system of claim 7,
   wherein the first arithmetic quantity counter further includes a timer circuit which is configured to output time information on a point in time when the counted value is outputted from the counting circuit, in response to an enablement signal outputted from the counting circuit; and wherein the register file is configured to store a register value including the counted value and the time information.

9. The PIM system of claim 8, wherein the register file is configured to transmit and store the register value into the first memory bank in response to an arithmetic quantity data move signal outputted from the controller.

10. The PIM system of claim 6, wherein the first arithmetic quantity counter includes:
a counting circuit configured to output a counted value generated by counting the number of times the arithmetic operation is performed by the first arithmetic operator; and
a register file configured to store the counted value.

11. The PIM system of claim 10,
wherein the first arithmetic quantity counter further includes a timer circuit which is configured to output time information on a point in time when the counted value is outputted from the counting circuit, in response to an enablement signal outputted from the counting circuit; and
wherein the register file is configured to store a register value including the counted value and the time information.

12. The PIM system of claim 11, wherein the register file is configured to transmit and store the register value into the first memory bank in response to an arithmetic quantity data move signal outputted from the controller.

13. The PIM system of claim 1,
wherein the data storage region includes a plurality of memory banks and a global buffer;
wherein the arithmetic circuit includes a plurality of arithmetic operators; and
wherein a first arithmetic operator among the plurality of arithmetic operators is configured to receive first arithmetic data and second arithmetic data from a first memory bank among the plurality of memory banks and the global buffer, respectively, and is configured to perform the arithmetic operation for the first arithmetic data and the second arithmetic data to generate and output arithmetic result data.

14. The PIM system of claim 13,
wherein the PIM device further includes a plurality of arithmetic quantity counters; and
wherein the first memory bank, the first arithmetic operator, and a first arithmetic quantity counter among the plurality of arithmetic quantity counters constitute a first arithmetic unit.

15. The PIM system of claim 14, wherein the first arithmetic quantity counter includes:
a counting circuit configured to output a counted value corresponding to the number of bits included in the first arithmetic data transmitted from the first memory bank to the first arithmetic operator; and
a register file configured to store the counted value.

16. The PIM system of claim 15,
wherein the first arithmetic quantity counter further includes a timer circuit which is configured to output time information on a point in time when the counted value is outputted from the counting circuit, in response to an enablement signal outputted from the counting circuit; and
wherein the register file is configured to store a register value including the counted value and the time information.

17. The PIM system of claim 16, wherein the register file is configured to transmit and store the register value into the first memory bank in response to an arithmetic quantity data move signal outputted from the controller.

18. The PIM system of claim 14, wherein the first arithmetic quantity counter includes:
a counting circuit configured to output a counted value generated by counting the number of times the arithmetic operation is performed by the first arithmetic operator; and
a register file configured to store the counted value.

19. The PIM system of claim 18,
wherein the first arithmetic quantity counter further includes a timer circuit which is configured to output time information on a point in time when the counted value is outputted from the counting circuit, in response to an enablement signal outputted from the counting circuit; and
wherein the register file is configured to store a register value including the counted value and the time information.

20. The PIM system of claim 19, wherein the register file is configured to transmit and store the register value into the first memory bank in response to an arithmetic quantity data move signal outputted from the controller.

* * * * *